(12) United States Patent
Taniguchi et al.

(10) Patent No.: US 7,187,406 B2
(45) Date of Patent: *Mar. 6, 2007

(54) STILL VIDEO CAMERA HAVING PROTECTING FUNCTION

(75) Inventors: Nobuyuki Taniguchi, Nishinomiya (JP); Yoshihiro Tanaka, Osaka (JP); Dai Shintani, Izumi (JP); Katsuyuki Nanba, Sakai (JP)

(73) Assignee: Minolta Co., Ltd., Osaka (JP)

( * ) Notice: Subject to any disclaimer, the term of this patent is extended or adjusted under 35 U.S.C. 154(b) by 745 days.

This patent is subject to a terminal disclaimer.

(21) Appl. No.: 10/229,353

(22) Filed: Aug. 28, 2002

(65) Prior Publication Data

US 2003/0007080 A1    Jan. 9, 2003

Related U.S. Application Data

(60) Division of application No. 08/946,960, filed on Oct. 8, 1997, now Pat. No. 6,549,232, which is a continuation of application No. 08/533,381, filed on Sep. 25, 1995, now abandoned, and a continuation of application No. 07/731,855, filed on Jul. 16, 1991, now abandoned.

(51) Int. Cl.
    *H04N 5/76* (2006.01)
(52) U.S. Cl. .................. 348/231.3; 348/333.02
(58) Field of Classification Search ........... 348/231.3
    See application file for complete search history.

(56) References Cited

U.S. PATENT DOCUMENTS

| | | | |
|---|---|---|---|
| 4,044,386 A | 8/1977 | Satou et al. | 360/60 |
| 4,107,743 A | 8/1978 | Mestdagh | 360/60 |
| 4,679,101 A | 7/1987 | Tezuka | 360/60 |
| 4,764,823 A | 8/1988 | Baumeister | 360/60 |
| 5,018,017 A | 5/1991 | Sasaki et al. | 358/209 |
| 5,067,029 A | 11/1991 | Takahashi | 358/909 |
| 5,093,731 A | 3/1992 | Watanabe et al. | 358/335 |
| 5,166,839 A | 11/1992 | Yu | 360/60 |
| 5,181,196 A | 1/1993 | Matsueda | 369/48 |

FOREIGN PATENT DOCUMENTS

| | | |
|---|---|---|
| JP | 64-049485 A | 2/1989 |
| JP | 02-125586 A | 5/1990 |

*Primary Examiner*—Tuan Ho
(74) *Attorney, Agent, or Firm*—Sidley Austin LLP

(57) ABSTRACT

A still video camera or apparatus which eliminates possible erasure in error of a picture image to be maintained and wherein a picture image recorded in an internal memory can be reproduced readily. The camera comprises image pickup means, recording means for recording a picture image signal obtained by the image pickup means into a record medium which may be an internal memory or a removable IC card, manually operable means, protect signal recording means operable in response to an operation of the manually operable means for recording into the record medium a protect signal representative of inhibition of erasure of a picture image signal recorded in the record medium, and controlling means for inhibiting erasure of a picture image signal at a portion of the record medium corresponding to the thus recorded protect signal.

37 Claims, 37 Drawing Sheets

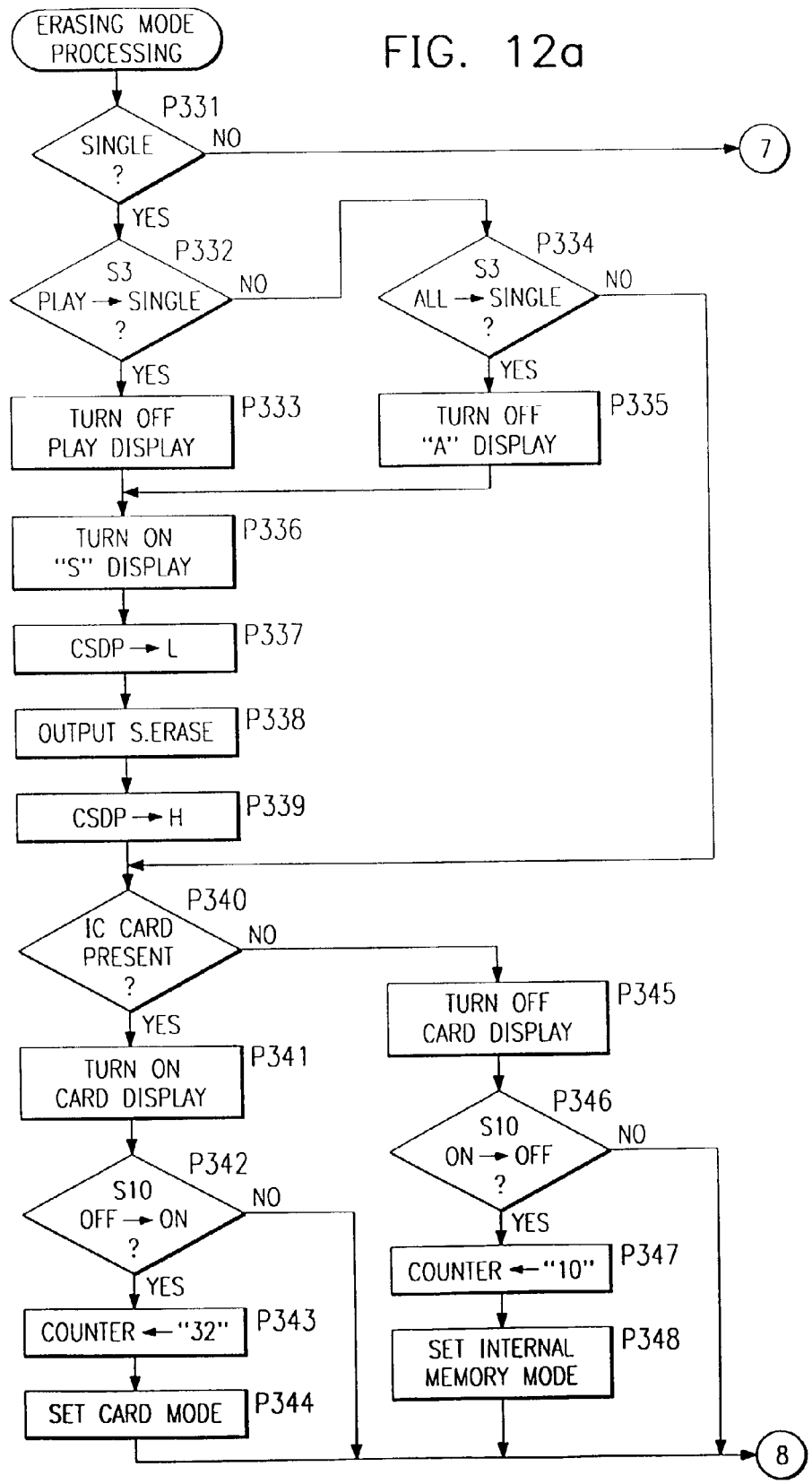

RECORDING MODE
(REC)

IC CARD

IC CARD
(END OF RECORD)

INTERNAL MEMORY

PROTECT MODE
(PROT.)

REPRODUCTION MODE
(PLAY)

ERASING MODE
(S.ERASE)

STILL VIDEO CAMERA HAVING PROTECTING FUNCTION

RELATED APPLICATION

This application is divisional of application Ser. No. 08/946,960, filed Oct. 8, 1997, U.S. Pat. No. 6,549,232, issued Apr. 15, 2003, which is a File Wrapper Continuation of application Ser. No. 08/533,381, filed Sep. 25, 1995 (abandoned), which is a Continuation-In-Part of application Ser. No. 07/731,855, filed Jul. 16, 1991 (abandoned), which is based on Japanese Patent Application Nos. 2-188115, 2-188116, 2-188117, and 2-188118 filed in Japan, the contents of which are hereby incorporated by reference.

BACKGROUND OF THE INVENTION

1. Field of the Invention

This invention relates to a still video camera wherein a still picture image is converted into an electric signal and recorded into an electronic record medium.

2. Description of the Prior Art

A still vide camera is already known wherein a still picture image is converted into an electric signal by means of a photoelectric transducer such as a CCD (charge coupled device) and recorded into a record medium such as a magnetic disk or an IC (integrated circuit) memory. A record medium of the type mentioned allows recording, reproduction and erasure of a picture image and can be used repetitively.

Some of still video cameras of the type mentioned are constructed such that a picture image is recorded into a record medium such as, for example, an IC card which is removably loaded in position in the camera. Such record medium will be removed, after picture images are recorded into the same, from the camera and loaded into another reproducing apparatus such as, for example, a CRT (cathode ray tube) display apparatus or a printer to reproduce such recorded picture images.

Also a still video camera has been proposed which includes, in addition to a removable record medium such as an IC card, an internal memory so that picture images can be recorded even if a record medium such as an IC card is not loaded in the camera.

Since a record medium of a still video camera allows erasure of a picture image recorded therein as described above, editing processing wherein an unnecessary picture image is erased from the record medium while recorded picture images are reproduced can also be performed readily. However, the possibility is high that a picture image which should be maintained may be erased in error upon editing.

Further, with such a conventional still video camera as described above, in order to reproduce a picture image recorded in the internal memory, a body of the camera must necessarily be connected to a CRT display apparatus or a printer, which is very inconvenient in operability.

SUMMARY OF THE INVENTION

It is an object of the present invention to provide a still video camera and a still video apparatus which eliminate possible erasure in error of a picture image to be maintained.

It is another object of the present invention to provide a still video camera and a still video apparatus wherein a picture image recorded in an internal memory can be reproduced readily.

In order to attain the objects, according to one aspect of the present invention, there is provided a still vide camera having functions of recording and erasing a picture image signal, which comprises image pickup means, recording means for recording a picture image signal obtained by the image pickup means into a predetermined portion of a record medium, manually operable means, protect signal recording means operable in response to an operation of the manually operable means for recording into the record medium a protect signal representative of inhibition of erasure of a picture image signal recorded at the predetermined portion of the record medium, and controlling means for inhibiting erasure of a picture image signal at a portion of the record medium corresponding to the thus recorded protect signal.

With the still video camera, when it is desired to maintain a picture image recorded in the record medium so that it may not be erased in error, the manually operable means will be manually operated. In response to such operation, a protect signal is recorded into the record medium corresponding to the picture image signal. Consequently, an attempt to erase such picture image signal from the record medium is ineffective due to inhibition of such erasure by the controlling means. Accordingly, the picture image signal will not be erased from the record medium in error.

According to another aspect of the present invention, there is provided a still vide apparatus having functions of recording and erasing a picture image signal, which comprises recording means for recording a picture image signal into a predetermined portion of a record medium, protect signal recording means for recording into the record medium a protect signal representative of inhibition of erasure of a picture image signal recorded at the predetermined portion of the record medium, and controlling means for inhibiting erasure of a picture image signal at a portion of the record medium corresponding to the thus recorded protect signal.

With the still video apparatus, in case a picture image signal which is tried to be erased from a record medium has a protect signal recorded corresponding thereto in the record medium, the controlling means inhibits erasure of such picture image signal in accordance with the protect signal. Accordingly, the picture image signal will not be erased in error.

According to a further aspect of the present invention, there is provided a still vide camera having functions of recording and erasing a picture image signal, which comprises image pickup means, recording means for recording a picture image signal obtained by the image pickup means into a predetermined portion of a record medium, manually operable means, protect signal recording means operable in response to an operation of the manually operable means for recording into the record medium a protect signal representative of inhibition of erasure of a picture image signal recorded at the predetermined portion of the record medium, means for instructing erasure of a picture image, means for reproducing a picture image, and controlling means for inhibiting reproduction of a picture image signal at a portion of the record medium corresponding to the protect signal recorded in the record medium in a condition wherein erasure of a picture image is instructed.

With the still video camera, when it is desired to maintain a picture image recorded in the record medium so that it may not be erased in error, the manually operable means will be manually operated. In response to such operation, a protect signal is recorded into the record medium corresponding to the picture image signal. Consequently, even if it is instructed to erase a picture image signal from the record medium, if the picture image signal has a protect signal recorded corresponding thereto in the record medium, the controlling means inhibits reproduction of the picture image signal in accordance with the protect signal. Accordingly, such picture image signal will not be erased in error.

According to a still further aspect of the present invention, there is provided a still vide apparatus having functions of recording and erasing a picture image signal, which comprises recording means for recording a picture image signal into a predetermined portion of a record medium, protect signal recording means for recording into the record medium a protect signal representative of inhibition of erasure of a picture image signal recorded at the predetermined portion of the record medium, means for instructing erasure of a picture image, means for reproducing a picture image, and controlling means for inhibiting reproduction of a picture image signal at a portion of the record medium corresponding to the protect signal recorded in the record medium in a condition wherein erasure of a picture image is instructed.

With the still video apparatus, even if it is instructed to erase a picture image signal from the record medium, if the picture image signal has a protect signal recorded corresponding thereto in the record medium, the controlling means inhibits reproduction of the picture image signal in accordance with the protect signal. Accordingly, such picture image signal will not be erased in error.

According to a yet further aspect of the present invention, there is provided a still vide camera having a function of recording a picture image signal, which comprises image pickup means, a first record medium built in the camera, recording means for recording a picture image signal obtained by the image pickup means into a predetermined portion of the first record medium, manually operable means, protect signal recording means operable in response to an operation of the manually operable means for recording into the first record medium a protect signal representative of inhibition of erasure of a picture image signal recorded at the predetermined portion of the first record medium, a loading section for removably loading a second record medium into the camera, detecting means for detecting loading of a second record medium into the camera, and transfer controlling means for transferring, when it is detected that a second record medium is loaded in the camera, from the first record medium to the second record medium a picture image signal at a portion of the first record medium corresponding to a protect signal recorded in the first record medium.

With the still video camera, when it is desired to maintain a picture image recorded in the first record medium so that it may not be erased in error, the manually operable means will be manually operated. In response to such operation, a protect signal is recorded into the first record medium corresponding to the picture image signal. Then, when a second record medium is recorded in position into the still video camera, a picture image signal at a portion of the first record medium corresponding to a protect signal recorded in the first record medium is transferred from the first record medium to the second record medium. Accordingly, a picture image signal recorded in the first record medium which is a built-in record medium of the still video camera can be reproduced readily making use of the second record medium.

A yet further aspect of the present invention, there is provided a still vide apparatus having a function of recording a picture image signal, which comprises a first record medium, recording means for recording a picture image signal into a predetermined portion of the first record medium, protect signal recording means for recording into the first record medium a protect signal representative of inhibition of erasure of a picture image signal recorded at the predetermined portion of the first record medium, a loading section for removably loading a second record medium into the apparatus, detecting means for detecting loading of a second record medium into the apparatus, and transfer controlling means for transferring, when it is detected that a second record medium is loaded in the apparatus, from the first record medium to the second record medium a picture image signal at a portion of the first record medium corresponding to a protect signal recorded in the first record medium.

With the still video apparatus, when it is desired to maintain a picture image signal recorded in the first record medium so that it may not be erased in error, a protect signal is recorded into the first record medium corresponding to the picture image signal by the protect signal recording means. Then, when a second record medium is recorded in position into the still video apparatus, a picture image signal at a portion of the first record medium corresponding to a protect signal recorded in the first record medium is transferred from the first record medium to the second record medium. Accordingly, a picture image signal recorded in the first record medium which is a built-in record medium of the still video apparatus can be reproduced readily making use of the second record medium.

A yet further aspect of the present invention, there is provided a still vide camera having a function of recording a picture image signal, which comprises image pickup means, a first record medium, recording means for recording a picture image signal obtained by the image pickup means into a predetermined portion of the record medium, a loading section for removably loading a second record medium into the camera, detecting means for detecting loading of a record medium into the camera, and transfer controlling means for transferring, when it is detected that a second record medium is loaded in the camera, a picture image signal recorded in the first record medium to the second record medium.

With the still video camera, when a second record medium is recorded in position into the still video camera, it is detected by the detecting means, and in response to such detection, a picture image signal recorded in the first record medium is transferred to the second record medium. Accordingly, a picture image signal recorded in the first record medium which is a built-in record medium of the still video camera can be reproduced readily making use of the second record medium.

According to a yet further aspect of the present invention, there is provided a still vide apparatus having a function of recording a picture image signal, which comprises a first record medium, recording means for recording a picture image signal into a predetermined portion of the first record medium, a loading section for removably loading a second record medium into the apparatus, detecting means for detecting loading of a record medium into the apparatus, and transfer controlling means for transferring, when it is detected that a second record medium is loaded in the apparatus, a picture image signal recorded in the first record medium to the second record medium.

With the still video apparatus, when a second record medium is recorded in position into the still video apparatus, it is detected by the detecting means, and in response to such detection, a picture image signal recorded in the first record medium is transferred to the second record medium. Accordingly, a picture image signal recorded in the first record medium which is a built-in record medium of the still video apparatus can be reproduced readily making use of the second record medium.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 10a to 10f are flow charts illustrating processing of the camera of FIG. 1 which is executed when a switch which operates upon depression of a release button to a first position is turned on;

FIGS. 12a to 12c are flow charts illustrating processing of the camera of FIG. 1 in an erasing mode;

DESCRIPTION OF THE PREFERRED EMBODIMENT

Figure 1:
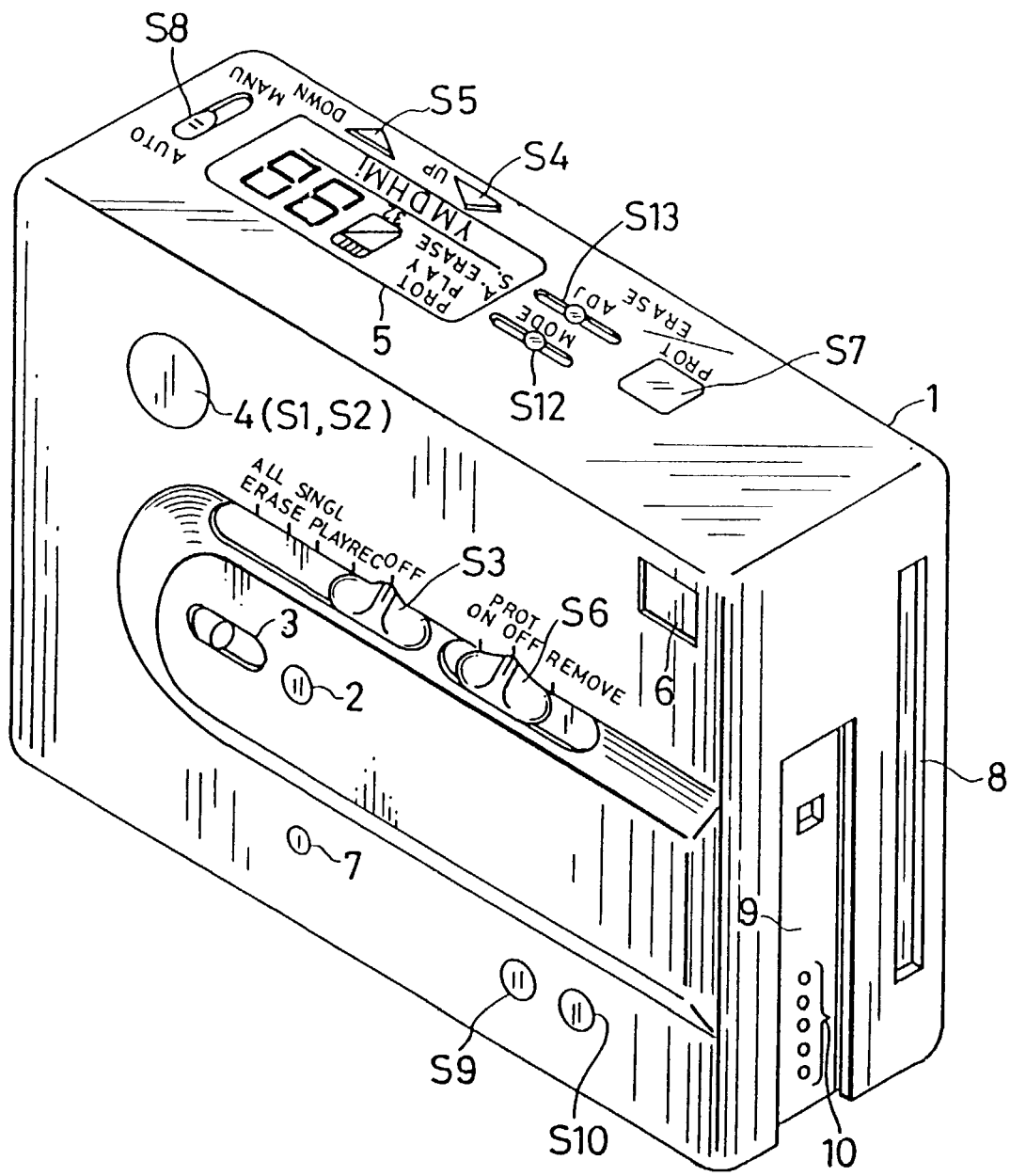
FIG. 1 is a perspective view showing an appearance of a still video camera to which the present invention is applied.

Referring first to FIG. 1, there is shown a still video camera to which the present invention is applied. The camera shown includes a camera body 1, a photographing lens 2, an opening/closing knob 3 for manually moving a lens protecting barrier not shown between open and closing positions for the photographing lens 2, and a shutter or release button 4. When the shutter button 4 is depressed to a first position, a switch S1 which will be hereinafter described is closed, but when the shutter button 4 is depressed to a second position deeper than the first position, another switch S2 which will also be hereinafter described is closed.

The camera further includes a display section 5 for displaying thereon a serial number of a frame of a recorded picture image, presence or absence of an IC card, a date or some other operating condition of the camera. The camera has a viewfinder window 6, a light projecting window 7 for macro photographing, an inlet port 8 through which an IC card into which a picture image is to be recorded is loaded in position into the camera, a connecting section 9 for receiving a flash apparatus thereon, and a plurality of connecting contacts 10 for establishing electric connection between the camera body 1 and a flash apparatus received on the connecting section 9.

The camera further includes various operating switches thereon. One of such switches is a mode change-over switch S3 of the slide type for changing over the camera among various functions or modes including:

OFF: Activation of the camera is inhibited.

REC: Recording mode in which recording of a picture image into an internal memory (not shown in FIG. 1) of the camera or an external record medium (not shown, hereinafter referred to as IC card) removably loaded in the camera is permitted.

PLAY: Playing or reproduction mode in which a picture image recorded in the internal memory or an IC card is reproduced so that a video signal is outputted. The recorded picture image may be reproduced on a video display apparatus not shown in response to such output video signal.

ERASE-ALL: All frame erasing mode in which all picture images recorded in the internal memory and an IC card are permitted to be erased.

ERASE-SINGL: Single frame erasing mode in which a photographed picture image for a frame recorded in the internal memory or an IC card is permitted to be erased. Also in the present mode, a picture image protected by a protecting function which will be hereinafter described is not erased.

The camera further includes a pair of access switches S4 and S5. The switch S4 functions, upon reproduction of a picture image, as a forward feeding switch for recorded picture images, but upon setting of a date, as a switch for incrementing a date, and a symbol "UP" is provided on the camera body 1 adjacent the switch S4. Meanwhile, the other access switch S5 functions, upon reproduction of a picture image, as a reverse feeding switch for recorded picture images, but upon setting of a date, as a switch for decrementing a date, and another symbol "DOWN" is provided on the camera body 1 adjacent the switch S5.

A protect switch S6 is provided to protect that one of picture images recorded in the internal memory or an IC card which is desired to be maintained so that it may not be erased in error. A symbol "PROT." is provided on the camera body 1 adjacent the protect switch S6. When the protect switch S6 is at its OFF position, the protecting function is not effective, but when the protect switch S6 is at its ON position, the protecting function is effective. When the protect switch S6 is at its further, cancelling position adjacent which a symbol "REMOVE" is provided on the camera body 1, a protected condition of a picture image which has been put into a protected condition once can be cancelled.

A protect/erasing operating switch S7 is provided to select an erasing operation or a protecting operation. In particular, if the switch S7 is turned on when the mode change-over switch S3 is at the ERASE-SINGL or ERASE-ALL position, then an erasing operation is performed, but if the switch S7 is turned on when the protect switch S6 is at the ON position, a protecting operation is performed.

A frame feeding change-over switch S8 is provided to select whether frame feeding upon reproduction of a recorded picture image is to be performed automatically or manually. If the switch S8 is set to its AUTO position for automatic frame feeding, then recorded picture images are automatically fed frame by frame and successively reproduced after lapse of each fixed interval of time irrespective of operation of the access switch S4 or S5. On the other hand, if the switch S8 is set to the other MANUAL position for manual frame feeding, then recorded picture images are fed frame by frame in response to each operation of the access switch S4 or S5.

A macro photographing switch S9 and a flashlight photographing setting switch S10 are also provided.

A date setting mode switch S12 is provided for setting a date. Each time the switch S12 is operated, a mode to be selected is changed over in a circulatory fashion in the order of Y (year)→M (month)→D (day)→H (hour)→M1 (minute)→Y (year).

A date setting switch S13 is provided for setting data in a mode selected by way of the switch S12.

Figure 2:
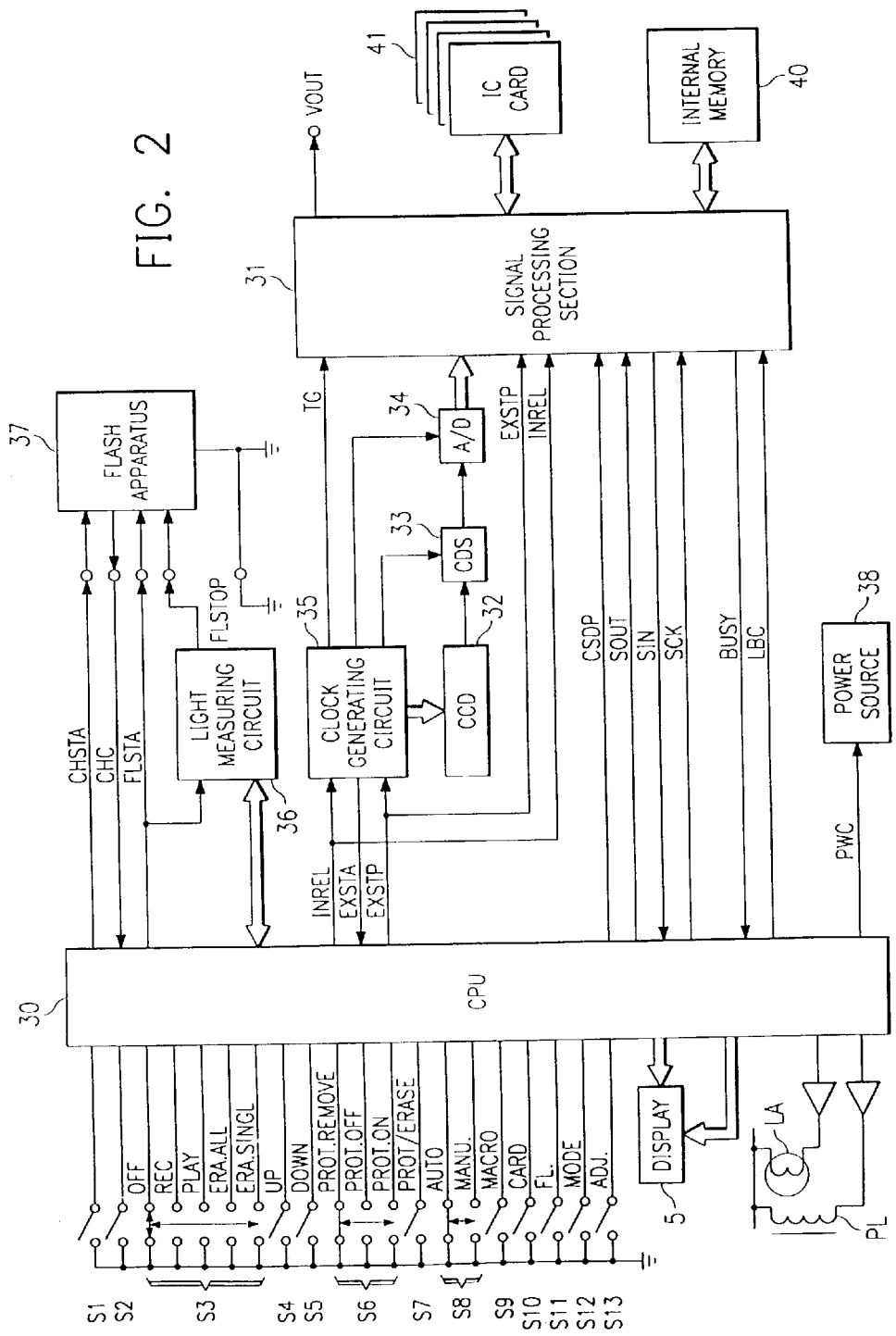
FIG. 2 is a block diagram of a controlling circuit of the camera of FIG. 1.

Referring now to FIG. 2, there is shown a controlling circuit of the camera of FIG. 1. The controlling circuit shown includes a CPU (central processing unit) 30 for controlling the entire camera, and a signal processing section 31 for executing recording and reproduction processing of a video signal. The signal processing section 31 will be hereinafter described. The controlling circuit further includes a solid state image pickup element 32 for converting a picture image introduced into the camera by way of the photographing lens 2 into a video signal. The solid state image pickup element 32 may be formed, for example, from a CCD (charge coupled device) and will be hereinafter referred to as CCD. The controlling circuit further includes a correlation dual sampling section 33 for correlation dual sampling a video signal received from the CCD 32, an analog to digital converter 34 for converting a video signal received from the correlation dual sampling section 33 into a digital signal, and a clock generating circuit 35 for clocking the CCD 32, sampling section 33 and analog to signal converter 34 to operate in a synchronized relationship to each other. The clock generating circuit 35 is controlled in accordance with control signals INREL and EXSTP received from the CPU 30. A light measuring circuit 36 measures a brightness of a subject and outputs a result of such measurement to the CPU 30. The light measuring circuit 36 also operates as a light adjusting circuit to control flashlight to be emitted from a flash apparatus 37. Thought not shown in FIG. 2, the flash apparatus 37 includes a light emitting section and a charge accumulating capacitor. A power source 38 is connected to the controlling circuit and is controlled in accordance with a control signal PWC received from the CPU 30. The display section 5 for displaying a serial number of a frame of a picture image and so forth thereon as described hereinabove is connected to the CPU 30. A lamp LA for the illumination upon macro photographing and a solenoid plunger PL for operating a shutter not shown of the camera are also connected to the CPU 30.

The controlling circuit further includes an internal memory 40 built in the camera and having a picture image recording capacity at least for one frame, for ten frames in the present embodiment. An IC card 41 is removaly loaded in position into the camera body 1 and, though not shown, includes a semiconductor memory such as an SRAM (static random access memory) having a picture image recording capacity for a plurality of frames, for 32 frames in the present embodiment.

The switches described hereinabove are also connected to the CPU 30. Again, the switch S1 is turned on when the shutter or release button 4 is depressed to the first position, and the switch S2 is turned on when the release button 4 is depressed to the deeper, second position. The switches S3 to S9 and S11 to S13 have individual operating portions provided on the camera body shown in FIG. 1 and individually have such functions as described hereinabove. An additional switch S10 is turned on when an IC card 41 is loaded in position into the camera body 1 by way of the inlet port 8, and outputs a signal representing that an IC card 41 has been loaded in position.

Various signals are transmitted over signal lines connected in and to the controlling circuit. Such signals include a signal CHSTA for instructing the flash apparatus 37 to start charging of the capacitor, a signal CHC indicative of completion of charging of the capacitor of the flash apparatus 37, a signal FLSTA for instructing the flash apparatus 37 to emit flashlight, and a signal FSTOP for instructing the flash apparatus 37 to stop emission of flashlight when the amount of flashlight detected by the light measuring circuit 36 reaches a predetermined level.

A shutter release starting signal INREL is delivered from the CPU 30 to the clock generating circuit 35. The clock generating circuit 35 delivers, in response to the shutter release starting signal INREL thus received, a signal EXSTA indicative of starting of exposure control to the CPU 30. An exposure control completion signal EXSTP indicative of completion of exposure control is also delivered from the CPU 30 to the clock generating circuit 35. Such shutter release starting signal INREL and exposure control completion signal EXSTP as described above are transmitted also to the signal processing circuit 31.

A signal CSDP for controlling transmission of a signal between the CPU 30 and the signal processing circuit 31 is delivered from the CPU 30 to the signal processing circuit 31. Data signals SOUT and SIN are transmitted as serial data from the CPU 30 to the signal processing section 31 and vice versa, respectively. A serial clock signal SCK is transmitted from the CPU 30 to the signal processing section 31. A signal BUSY representing that the signal processing section 31 is busy processing a signal is transmitted from the signal processing section 31 to the CPU 30. A signal LBC representing that macro photographing is to be performed is transmitted from the CPU 30 to the signal processing section 31 while a video signal VOUT is outputted from the signal processing section 31 as an output signal of the camera.

Figure 3:
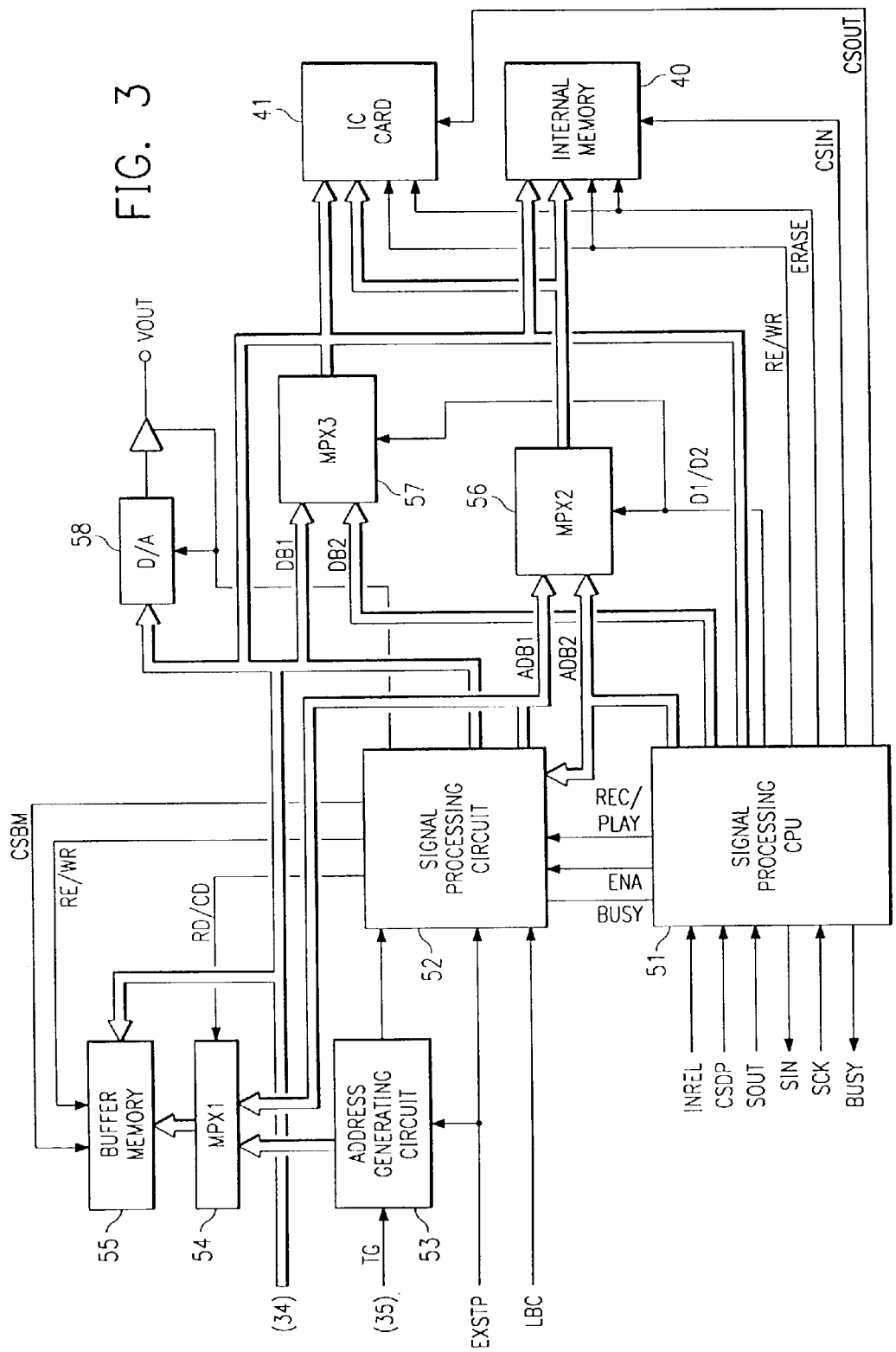
FIG. 3 is a block diagram showing details of a signal processing section of the controlling circuit shown in FIG. 2.

Referring now to FIG. 3, the signal processing section 31 is shown more in detail. The signal processing section 31 includes a signal processing CPU 51 for controlling the entire signal processing section 31, a signal processing circuit 52 for executing processing (including compression) of a video signal, and an address generating circuit 53 for receiving a clock signal TG from the clock generating circuit 35 and generating an address signal in response to such clock signal.

A multiplexer 54 is provided to select, in response to a signal RD/CD received from the signal processing circuit 52, either one of an address signal received from the address generating circuit 53, that is, an address signal transmitted over an address signal bus which is used when a video signal outputted from the CCD 32 is to be recorded into a buffer memory 55 and another address signal transmitted over another address signal bus which is used when the buffer memory 55 is to be used upon signal processing.

Another multiplexer 56 is provided to select, in response to a signal D1/D2 received from the signal processing CPU 51, either one of an address signal bus for an address signal ADB1 outputted from the signal processing circuit 52, that is, an address signal bus which is used upon recording or reproduction of a video signal into or from the video signal recording internal memory 40 and the IC card 41 and another address signal bus for another address signal ADB2 which is used when a data signal outputted from the signal processing CPU 51 other than a video signal, for example, a signal of a serial number of a frame or protect data is to be recorded into the internal memory 40 and the IC card 41.

A further multiplexer 57 is provided to select, in response to such signal D1/D2 outputted from the signal processing CPU 51 as mentioned above, either one of a video signal bus DB1 and a data signal bus DB2 for various signals other than a video signal, such as, for example, a serial frame number, protect data, erasing data (ERASE), protect cancelling data (REMOVE) or chronological data.

The signal processing section 31 further includes a digital to analog converter 58 for converting, upon outputting of a video signal, such video signal from a digital signal into an analog signal.

Various signals are transmitted over signal lines from the signal processing CPU 51. In particular, such signals include a signal ENA for enabling signal processing at the signal processing circuit 52, another signal REC/PLAY for controlling whether signal processing at the signal processing circuit 52 should be executed in a recording mode or a reproduction mode, a further signal RE/WR for controlling writing/reading of a video signal into or out of an IC card 41, a still further signal ERASE for controlling erasure of a video signal recorded in the IC card 41, a yet further signal CSOUT for controlling transmission of data from or to an IC card 41, and a yet further signal CSIN for controlling transmission of data from or to the internal memory 40.

Figure 4:
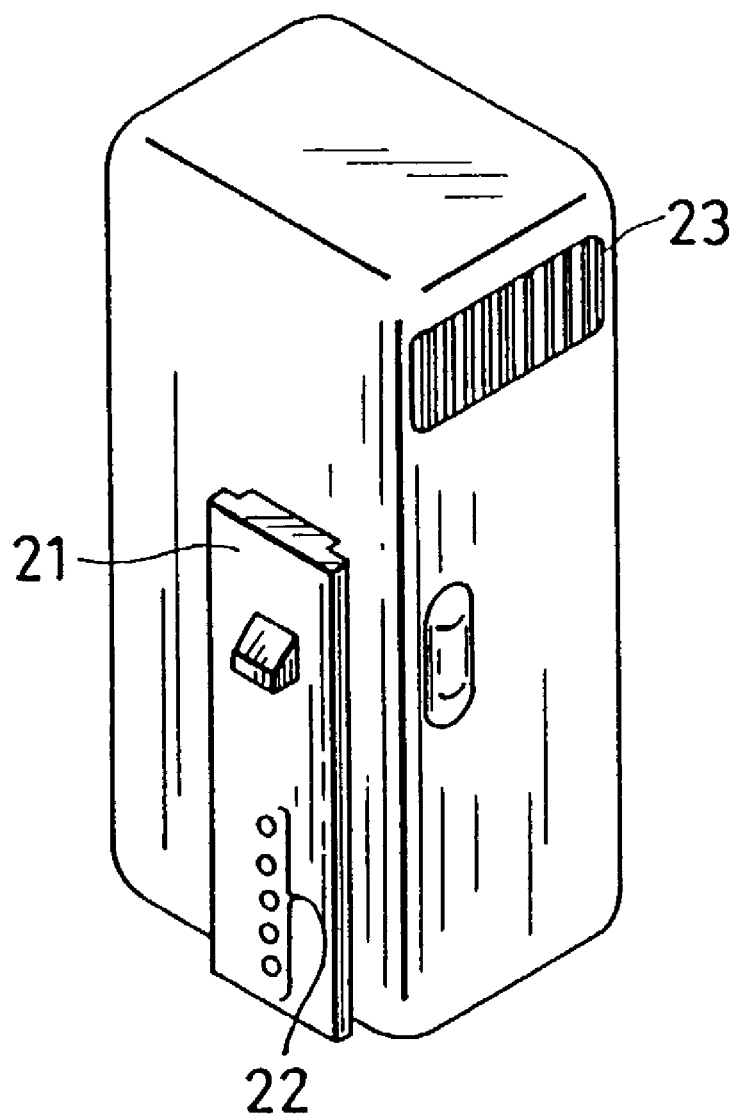
FIG. 4 is a perspective view showing an appearance of a flash apparatus for use with the camera shown in FIG. 1.

Referring now to FIG. 4, there is shown an appearance of a flash apparatus adapted to be removably mounted on the camera. The flash apparatus has a connecting section 21 for engaging with the flash apparatus connecting section 9 of the camera body 1. A plurality of connecting contacts 22 are provided on the connecting section 21 of the flash apparatus for contacting with the electric contacts 10 of the camera body 1. The flash apparatus further has a flashlight emitting section 23 from which flashlight is emitted.

Figure 5:
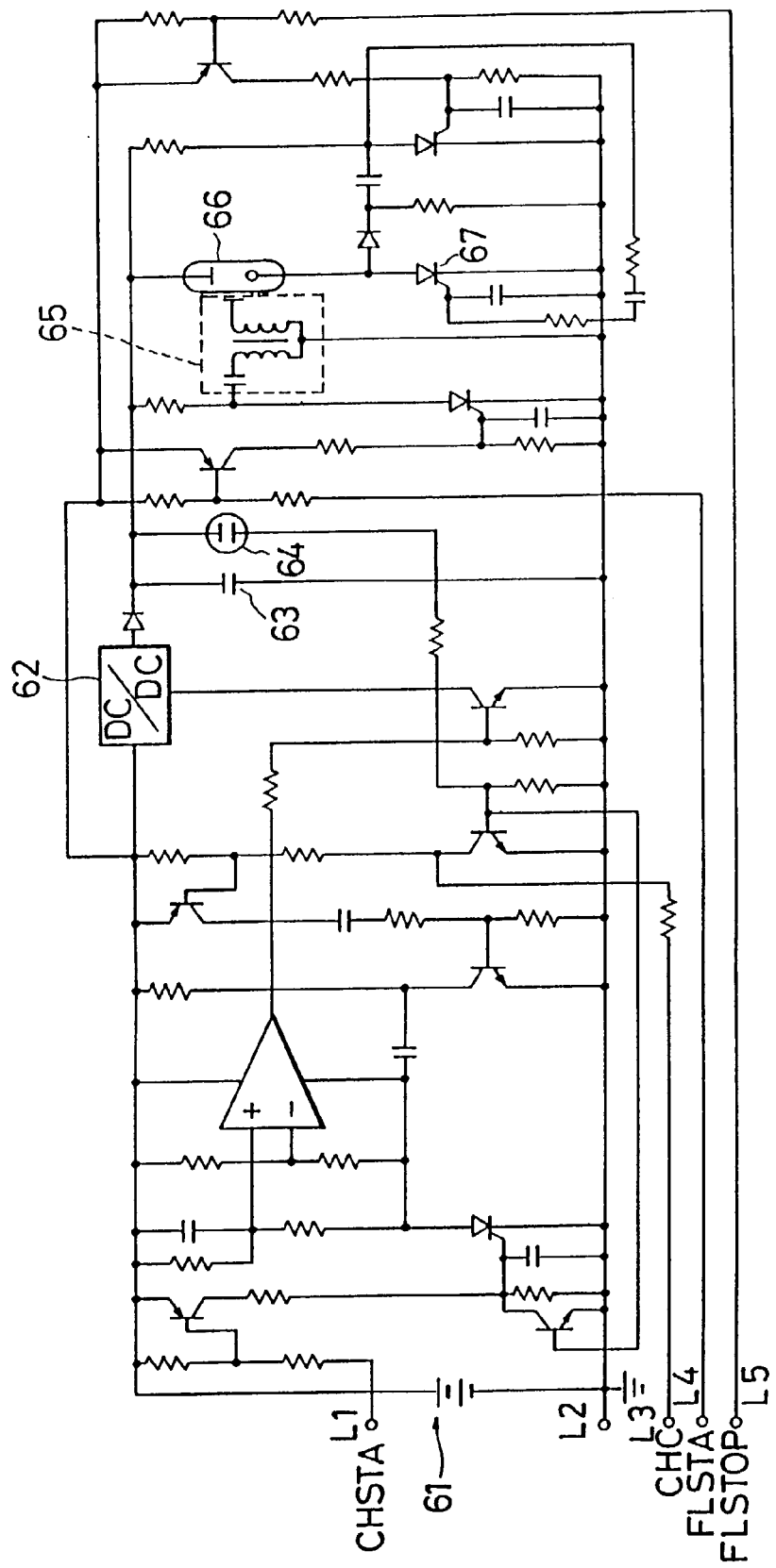
FIG. 5 is a circuit diagram of the flash apparatus of FIG. 4.

A circuit diagram of the flash apparatus is shown in FIG. 5. Since such flash circuit is of a well known type, description will be given only of an outline of construction and operation of the circuit. The flash circuit includes a power source battery 61, a boosting circuit 62 formed from a dc to dc converter, a charge accumulating main capacitor 63, a neon tube 64, a trigger circuit 65, a xenon discharge tube 66 and a thyristor 67.

In operation, when a signal CHSTA, which is supplied from the CPU 30 of the camera to a terminal L1 of the flash apparatus and represents an instruction of starting of charging, becomes high ("H"), the boosting circuit 62 starts its operation to boost the voltage of the battery 61 so that the main capacitor 63 is charged. When the terminal voltage of the main capacitor 63 reaches a predetermined level, a signal CHC, which is outputted from another terminal L3 of the flash apparatus, is changed to "H" to inform the CPU 30 of completion of charging. Then, when a signal FLSTA which is applied from the CPU 30 to a further terminal L4 of the flash apparatus becomes "H", the trigger circuit 65 operates so that the xenon discharge tube 66 starts emission of flashlight. The light measuring circuit 36 of the camera detects reflected light from a subject. When the detected light reaches a predetermined amount of light, then a light emission stopping signal FLSTP, which is applied to a still further terminal L5 of the flash apparatus, becomes "H" so that an inverse bias voltage is applied across the thyristor 67. As a result, emission of flashlight from the xenon discharge tube 66 is stopped.

Figure 6:
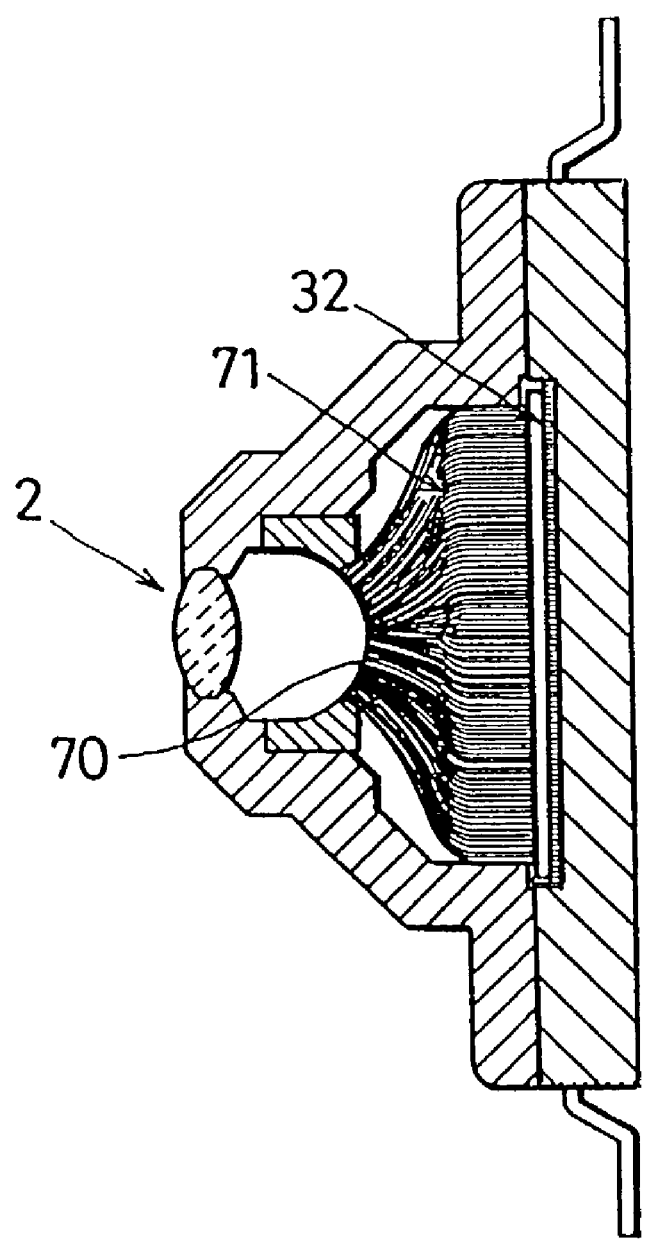
FIG. 6 is a sectional view showing an image pickup section of the camera of FIG. 1.

Referring now to FIG. 6, an image pickup section of the camera is shown in sectional view taken along a plane including an optical axis thereof. The image pickup section shown includes the photographing lens 2 in the form of a spherical lens having a focal length f and having a spherical image forming plane 70. The image pickup section further includes a large number of optical fibers 71 having incidence ends arranged along the spherical image forming plane 70 of the lens 2 while emergence ends of the optical fibers 71 are arranged in a plane proximate to a surface of the CCD 32. Where the optical fibers 71 used have a magnification factor of three times, an image of a size of the focal length f×3 can be formed on the CCD 32. Where optical fibers having a magnification factor of several times, the thickness or depth of the image pickup section can be reduced to a sum of a focal length of the lens and a dimension of the optical fiber section (for example, 3 mm) or so. Further, a combination with an IC card will achieve minimization of the overall thickness or depth of the camera.

It is to be noted that employment of a spherical lens will provide the following advantages. In particular, when an image of a body at an infinite distance is to be formed using a spherical lens, generally the image forming plane presents a spherical face concentric with the spherical lens due to spherical symmetry of the spherical lens. Accordingly, a spherical lens has similar values in aberration on and outside an optical axis thereof, and if generally good correction can be achieved for an aberration on the optical axis, then also the aberration outside the optical axis is corrected. Accordingly, while a spherical lens is a small and simple optical system comparing with ordinary lens systems, if suitable correction for an aberration is performed, then a bright lens which is low in reduction in amount of peripheral light and has a high image forming performance can be obtained.

Referring now to FIGS. 19a to 19l, there are shown examples of displays of the display section 5 of the camera described above. The display section 5 has several display elements including a display portion 5a for displaying a serial number of a frame of a picture image to be processed in any of recording, protect, reproduction and erasing modes, another display portion 5b for displaying a loaded condition of an IC card, a further display portion 5c for displaying a mode in setting of a date, that is, a year (Y), a month (M), a day (D), an hour (H) and a minute (Mi), a still further display portion 5d for displaying a protect mode (PROT.), a yet further display portion 5e for displaying a reproduction mode (PLAY), and a yet further display portion 5f for displaying a singe frame erasing mode (S. ERASE).

Figure 19A:
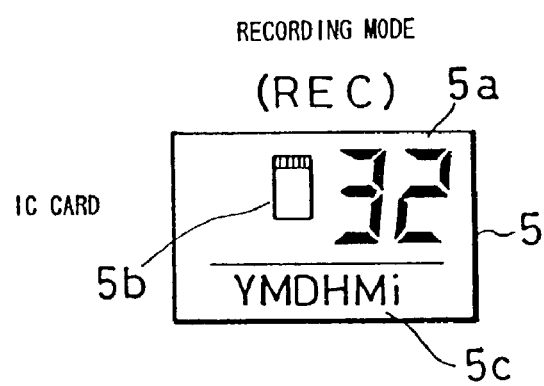
FIGS. 19a to 19l are illustrations showing exemplary displays of a display section of the camera of FIG. 1.
Figure 19B:
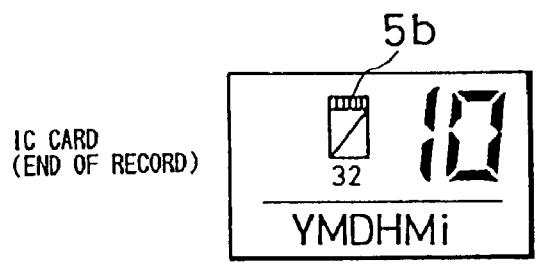
Figure 19C:
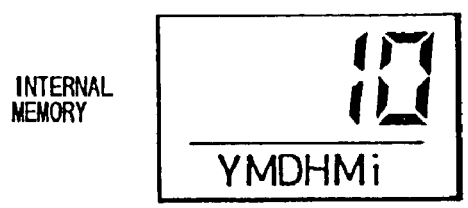

FIGS. 19a, 19b and 19c show different displays when the camera is a recording mode. In particular, the display in FIG. 19a represents that an IC card is loaded in position in the camera and an IC card mode which will be hereinafter described is set, and recording of picture images of up to 32 frames is possible. In FIG. 19b, it is indicated by an oblique line at the center of the display portion 5b that all frames of the IC card are in a recorded condition, and also it is indicated that recording of picture images of up to 10 frames into the internal memory is possible. In FIG. 19c, it is indicated that no IC card is loaded in position and an internal memory mode which will be hereinafter described is set, and recording of picture images of up to 10 frames is possible.

Figure 19D:
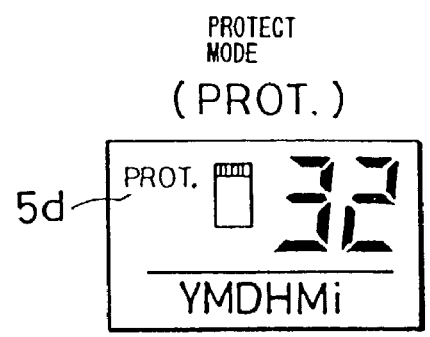
Figure 19E:
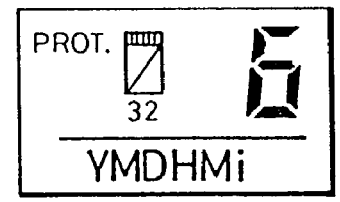
Figure 19F:
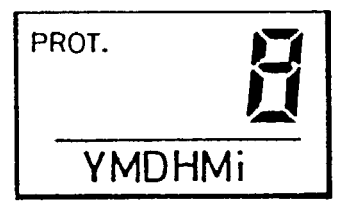
Figure 19G:
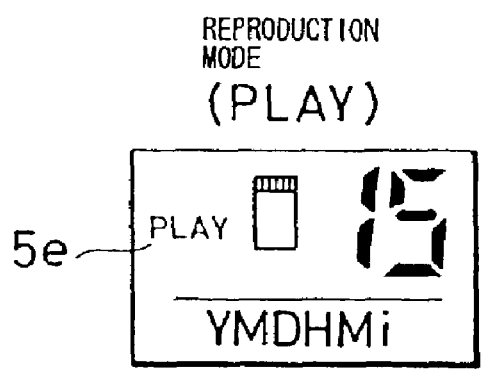
Figure 19J:
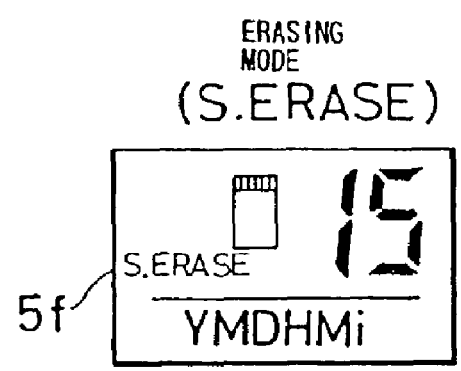
Figure 19H:
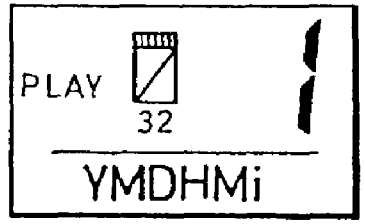
Figure 19K:
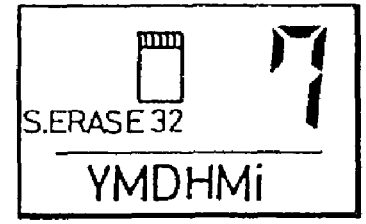
Figure 19I:
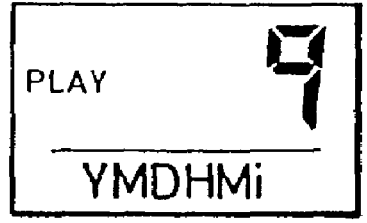
Figure 19L:
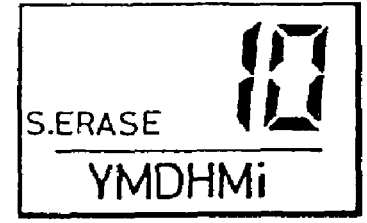

FIGS. 19d, 19e and 19f show different displays in a protect mode: FIGS. 19g, 19h and 19i show different displays in a reproduction mode; and FIGS. 19j, 19k and 19l show different displays in a single frame erasing mode, in which the display portion 5f is lit to provide a display of "S.ERASE". On the other hand, in the case of an all frame erasing mode, the display portion 5f is lit to provide another display of "A.ERASE".

Subsequently, controlling operation of the camera which is executed by the CPU 30 will be described with reference to the flow charts shown in FIGS. 7 to 17.

Figure 7:
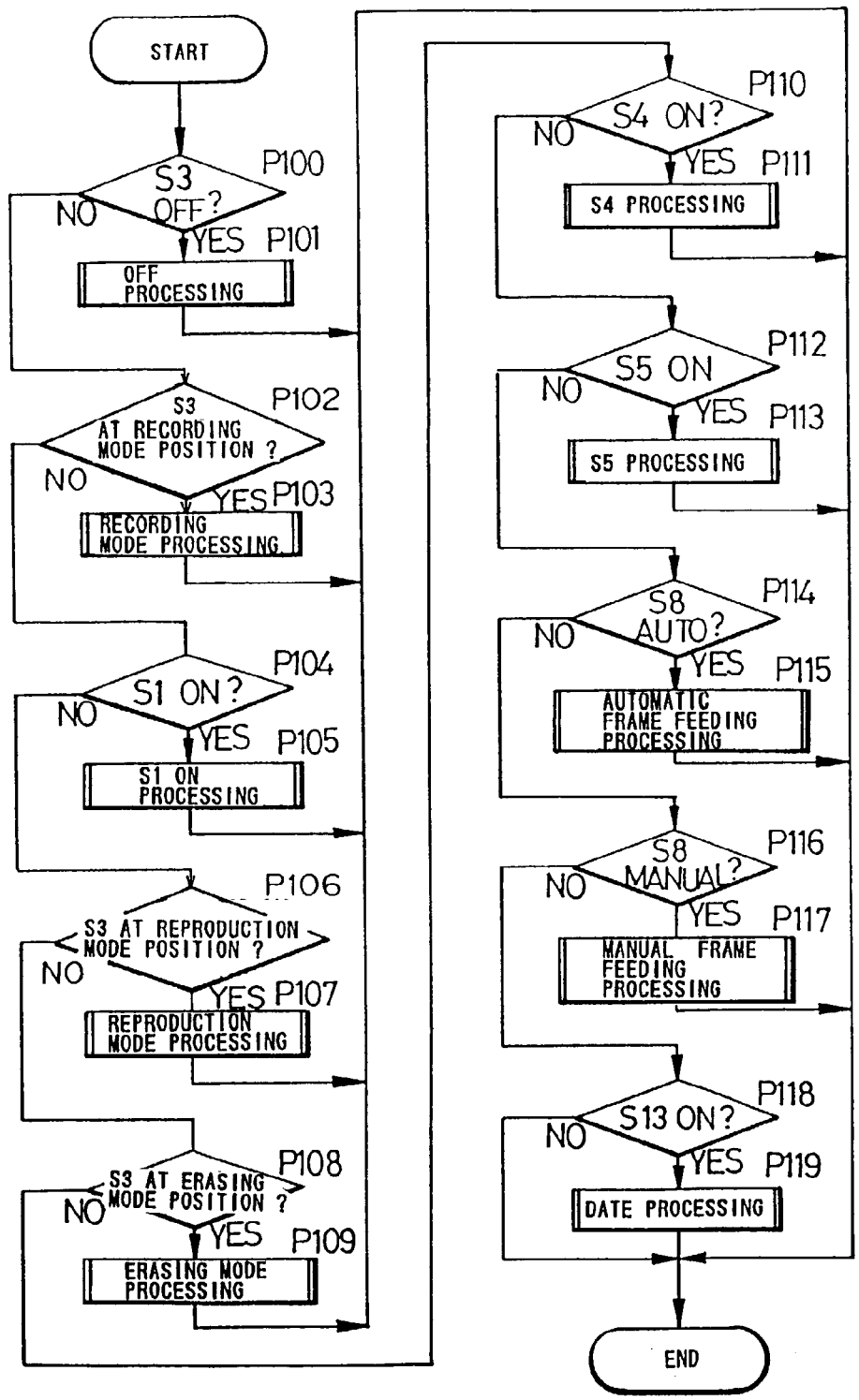
FIG. 7 is a flow chart illustrating general operation of the camera of FIG. 1.

FIG. 7 illustrates an outline of the entire control executed by the CPU 30. Referring to FIG. 7, according to the flow chart shown, the CPU 30 checks conditions of the various switches of the camera and then advances its control sequence to a processing routine corresponding to one of the switches in accordance with a result of such checking. In particular, after starting its controlling operation, the CPU 30 first checks, at step P100, whether or not the mode change-over switch S3 is at its OFF position, and in case the mode change-over switch S3 is at the OFF position, the CPU 30 advances its control sequence to step P101 at which a routine of "OFF PROCESSING" is executed. On the contrary, if the mode change-over switch S3 is not in the off position, then the control sequence advances to step P102, at which it is checked whether or not the mode change-over switch S3 is in the REC position so that the camera is set to a recording mode. In case the camera is in a recording mode, the control sequence advances to step P103, at which a routine for recording mode processing is executed. Otherwise, the CPU 30 subsequently checks, at step P104, a condition of the switch S1, which is turned on when the shutter release button 4 is depressed to the first position, and if the switch S1 is on, then the control sequence advances to step P105, at which a routine of "S1 ON PROCESSING" is executed. Otherwise, the CPU 30 subsequently checks, at step P106, whether or not the mode change-over switch S3 is in the PLAY position so that the camera is set to a reproduction mode, and if the camera is in a reproduction mode, then the control sequence advances to step P107, at which a routine for reproduction mode processing is executed. Otherwise. The CPU 30 subsequently checks, at step P108, whether or not the mode change-over switch S3 is in the ERASE position so that the camera is set to an erasing mode, and if the camera is in an erasing mode, then the control sequence advances to step P109, at which a routine for erasing mode processing is executed. Otherwise, the CPU 30 subsequently checks a condition of the access switch S4 (UP) at step P110, and if the access switch S4 is on, then a routine of "S4 PROCESSING" is subsequently executed at step P111. Otherwise, the CPU 30 subsequently checks a condition of the other access switch S5 (DOWN) at step P112, and if the access switch S5 is on, then a routine of "S5 PROCESSING" is executed at step P113. Otherwise, the CPU 30 subsequently checks at step P114 whether or not the frame feeding change-over switch S8 is at the AUTO position so that the camera is set to an automatic frame feeding mode, and in case the camera is in an automatic frame feeding mode, a routine for automatic mode processing is subsequently executed at step P115. Otherwise, the CPU 30 subsequently checks, at step P116, whether or not the frame feeding change over switch S8 is at the MANUAL position so that the camera is set to a manual frame feeding mode, and if the camera is in a manual frame feeding mode, then a routine for manual frame feeding processing is executed subsequently at step P117. Otherwise, the CPU 30 subsequently checks a condition of the date setting switch S13 at step P118, and if the date setting switch S13 is on, then a routine for date processing is executed subsequently at step P119.

Figure 8:
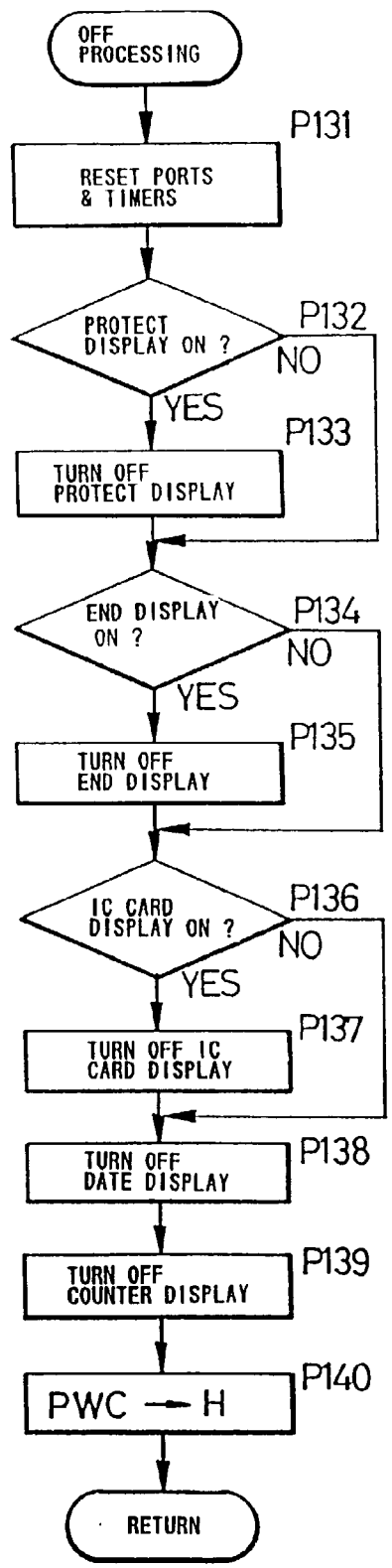
FIG. 8 is a flow chart illustrating processing of the camera of FIG. 1 when a mode change-over switch is in an off position.

FIG. 8 illustrates details of the processing routine at step P101 of the flow chart shown in FIG. 7, which is executed when the mode change-over switch S3 is at the OFF position at step P100. Referring to FIG. 8, the CPU 30 first resets ports and first to fourth timers (timer 1 to timer 4) thereof at step P131. Then, the CPU 30 judges at step P132 whether or not the display portion 5d of the display section 5 of the camera for displaying that the protecting function is operative is in an on-state, and if the display portion 5d is on, then such display is extinguished at step P133. Then, the CPU 30 judges at step P134 whether or not the completion display (oblique line in the display portion 5b, see FIG. 19b, 19e or 19h) which represents that the number of frames of recorded picture images reaches a maximum number of recordable frames is in an on-state, and if such display is on, then the display is extinguished at step P135. Then, the CPU 30 judges at step P136 whether or not the display at the display portion 5b which represents that an IC card 41 is loaded in position in the camera body 1 is in an on-state, and if the display is on, then the display is extinguished at step P137. Subsequently, a display of a date at the display section 5c is extinguished at step P138, and then a display at the display section 5a for the frame counter which represents a number of frames of recorded picture images is extinguished at step P139, whereafter a signal PWC to be transmitted to the power source 38 is changed to "H" to interrupt the power source circuit at step P140. After then, the control sequence returns to the main routine.

Figure 9:
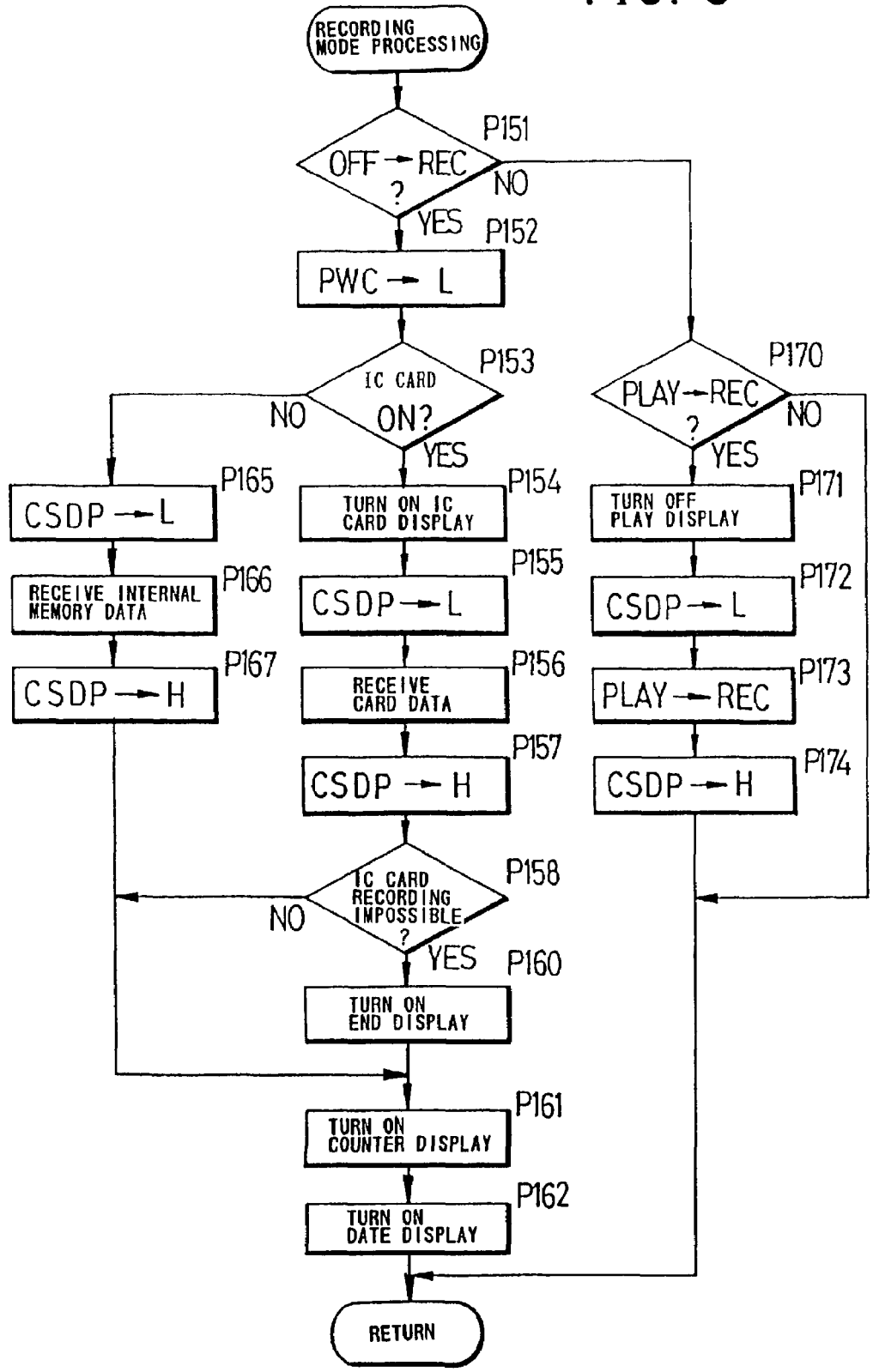
FIG. 9 is a flow chart illustrating processing of the camera of FIG. 1 in a recording mode.

FIG. 9 illustrates details of the recording mode processing routine at step P103 of the flow chart shown in FIG. 7, which is executed when the mode change-over switch S3 is in the recording mode (REC) position. Referring to FIG. 9, the CPU 30 first judges, at step P151, whether or not the mode change-over switch S3 has been changed over from the OFF position to the REC position, and in case the mode change-over switch S3 has been changed over from the OFF position to the REC position, a signal PWC is changed to a low ("L") level to turn the power source 38 on at step P152. Then, it is judged at step P153 whether or not an IC card 41 is loaded in position in the camera, and if an IC card 41 is loaded in position, then the IC card display portion 5b of the display section is turned on at step P154, and then a signal CSDP is changed to "L" at step P155. Then, card data representative of a recorded condition (a number of recorded frames and so forth) of the IC card 41 are received from the signal processing CPU 51 at step P156, and then, after completion of reception of such card data, the signal CSDP is changed back to "H" to complete the communication at step P157. Subsequently, it is judged at step P158 whether or not the recording section of the IC card 41 is full of data so that further recording is impossible. If further recording is impossible, then the display of completion (oblique line in the display portion 5b) is turned on at step 160 and then the frame counter display at the display portion 5a indicative of a number of recordable frames is turned on at step P161, whereafter the date display at the display section 5c is turned on at step P162. After then, the control sequence returns to the main routine. On the other hand, in case it is judged at step P158 that the IC card 41 still has an unrecorded area and hence is capable of being recorded, then the step 160 is bypassed and the control sequence directly advances from step P158 to step P161.

In case it is judged at step P153 that an IC card 41 is not yet loaded in position, then the signal CSDP is changed to "L" at step P165, and then memory data representative of a recorded condition (a number of recorded frames and so forth) of the internal memory 40 are received from the signal processing CPU 51 at step P166. Then, after completion of such transmission of data, the signal CSDP is changed back to "H" to stop the communication at step P167, whereafter the control sequence advances to step P161.

In case it is judged at step P151 that the mode change-over switch S3 has not been changed over from the OFF position to the REC position, it is subsequently judged at step P170 whether or not the mode change-over switch S3 has been changed over from the PLAY position to the REC position. If the mode change-over switch S3 has been changed over from the PLAY position to the REC position, then the display of "PLAY" at the display portion 5e of the display section 5 is extinguished at step P171, and then the signal CSDP is changed to "L" at step P172. After then, a signal indicating that the mode change-over switch S3 has been changed over from the PLAY position to the REC position is outputted to the signal processing section 31 at step P173, and then the signal CSDP is changed back to "H" to complete the communication at step P174, whereafter the control sequence returns to the main routine.

Figure 10A:
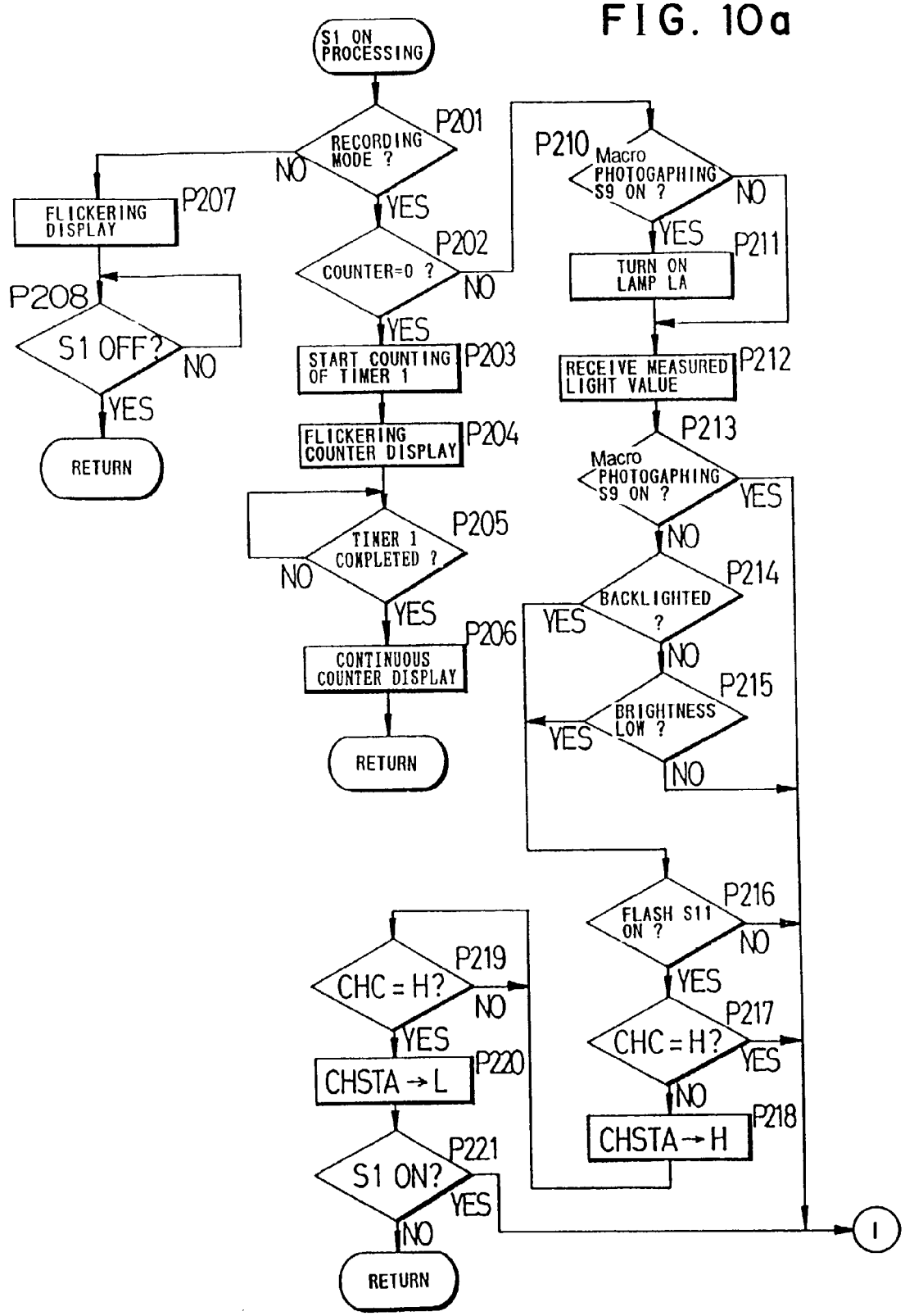

FIGS. 10a to 10f show a processing routine at step P105 of the flow chart shown in FIG. 7, which is executed when the switch S1, which is turned on by depression of the release button 4 to the first position is turned on. Referring first to FIG. 10a, after the routine shown is entered, the CPU 30 first judges at step P201 whether or not the camera is in a recording mode (REC). In case the camera is not in a recording mode, then a current display of the display section 5 is caused, at step P207, to flicker in order to indicate that photographing is impossible, and then the CPU 30 waits at step P208 until the switch S1 is turned off. After then, the control sequence returns to the main routine.

In case it is judged at step P201 that the camera is in a recording mode, it is subsequently judged at step P202 whether or not the frame counter indicative of a number of frames of recorded picture images is equal to 0, and if the frame counter is equal to 0, then since this means that further picture image recording is impossible, the first timer (timer 1) is set to a predetermined value K1 and starts its counting operation at step P203, and then the counter display at the display portion 5a is caused to flicker at step P204. After counting of the first timer is completed at step P205, the timer display is changed from a flickering condition to a continuously lit condition at step P206, whereafter the control sequence returns to the main routine.

In case it is judged at step P202 that the frame counter is not equal to 0, since this means that photographing is possible, the CPU 30 advances to processing at step P210 et seq. First, it is judged at step P210 whether or not the macro photographing switch S9 is on, and if the macro photographing switch S9 is on, then the macro photographing lamp LA is lit at step P211. On the contrary if the macro photographing switch S9 is not on, then the step 211 is skipped. Subsequently, a brightness of a subject obtained by light measurement by the light measuring circuit 36 and converted from an analog value into a digital value is received at step P212. Then, it is judged at step P213 again whether or not the macro photographing switch S9 is on, and if the macro photographing switch S9 is on, then the control sequence advances to step P230 of the flow chart shown in FIG. 10b. On the contrary if the macro photographing switch S9 is not on, then it is judged at step P214 whether or not the subject is in a backlighted condition, and then if the subject is not in a backlighted condition, then it is judged at step P215 whether or not the subject is low in brightness. If the subject is not low in brightness, then the control sequence advances to step P230. On the other hand, if it is judged at step P214 or P215 that the subject is in a backlighted condition or low in brightness, then it is judged at step P216 whether or not the flash photographing switch S11 is on. In case the flash photographing switch S11 is on, it is subsequently judged at step P217 whether or not the signal CHC which represents completion of charging of the main capacitor 63 of the flash apparatus 37 is "H", and if the signal CHC is "H", then the control sequence advances to step P230, but on the contrary if the signal CHC is not "H", then the signal CHSTA which commands starting of charging of the main capacitor 63 is changed, at step P218, to "H" to cause the flash apparatus 37 to start charging of the main capacitor 63. Then, after it is waited at step P219 that such charging is completed, the signal CHSTA is changed, at step P220, back to "L" to stop charging of the main capacitor 63. After then, it is judged at step P221 whether or not the switch S1 is on, and if the switch S1 is on, then the control sequence advances to step P230, but on the contrary if the switch S1 is not on, then the control sequence returns to the main routine.

Figure 10B:
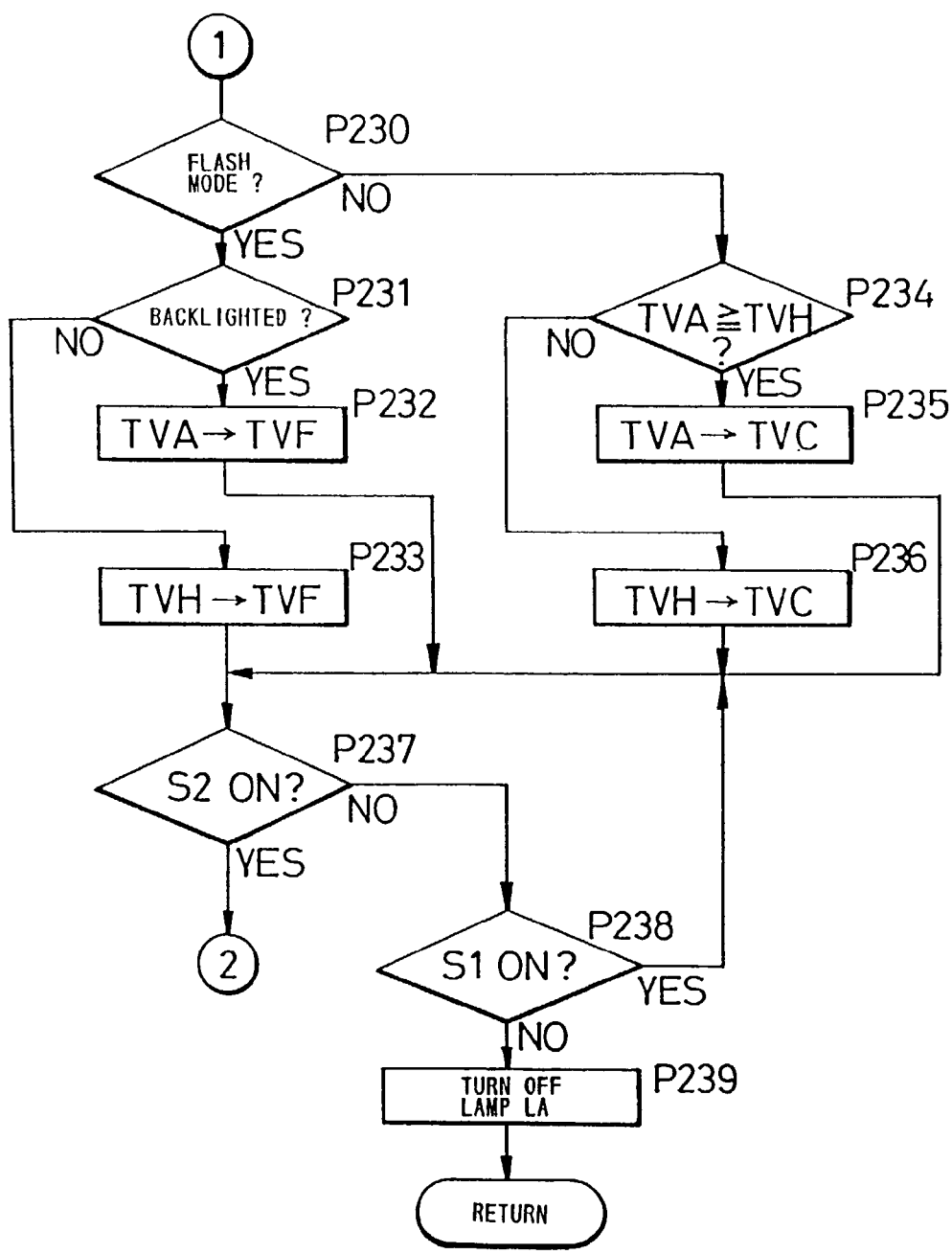

Referring now to FIG. 10b, it is judged at step P230 whether or not the camera is in a flashlight emitting mode. In the case of a flashlight emitting mode, it is subsequently judged at step P231 whether or not the subject is in a backlighted condition, and if the subject is in a backlighted condition, then a shutter speed TVA which depends upon a brightness of the subject is employed as a shutter speed TVF for flash control at step P232, but on the contrary if the subject is not in a backlighted condition, then another shutter speed TVH which depends upon a limit to hand shaking is employed as a shutter speed TVF for flash control at step P233. In case it is judged at step P230 that the camera is not in a flash mode, a relative magnitude between the shutter speed TVA which depends upon a brightness of the subject and the shutter speed TVH which depends upon a limit to hand shaping is checked at step P234, and in case TVA≧TVH, the shutter speed TVA is determined as a shutter speed TVC for exposure control at step P235, but on the contrary in case TVA<TVH, the shutter speed TVH is determined as a shutter speed TVC for exposure control at step P236.

At step P237 to which the control sequence advances from step P232, P233 and P236, it is judged whether or not the switch S2, which is turned on upon depression of the release switch 4 to the second position, is on, and if the switch S2 is not on, then the switch S1 is checked at step P238. Then, if the switch S1 is on, the control sequence returns to step P237, but on the contrary if the switch S1 is not on, then the macro photographing lamp LA is turned off at step P239, whereafter the control sequence returns to the main routine.

Figure 10C:
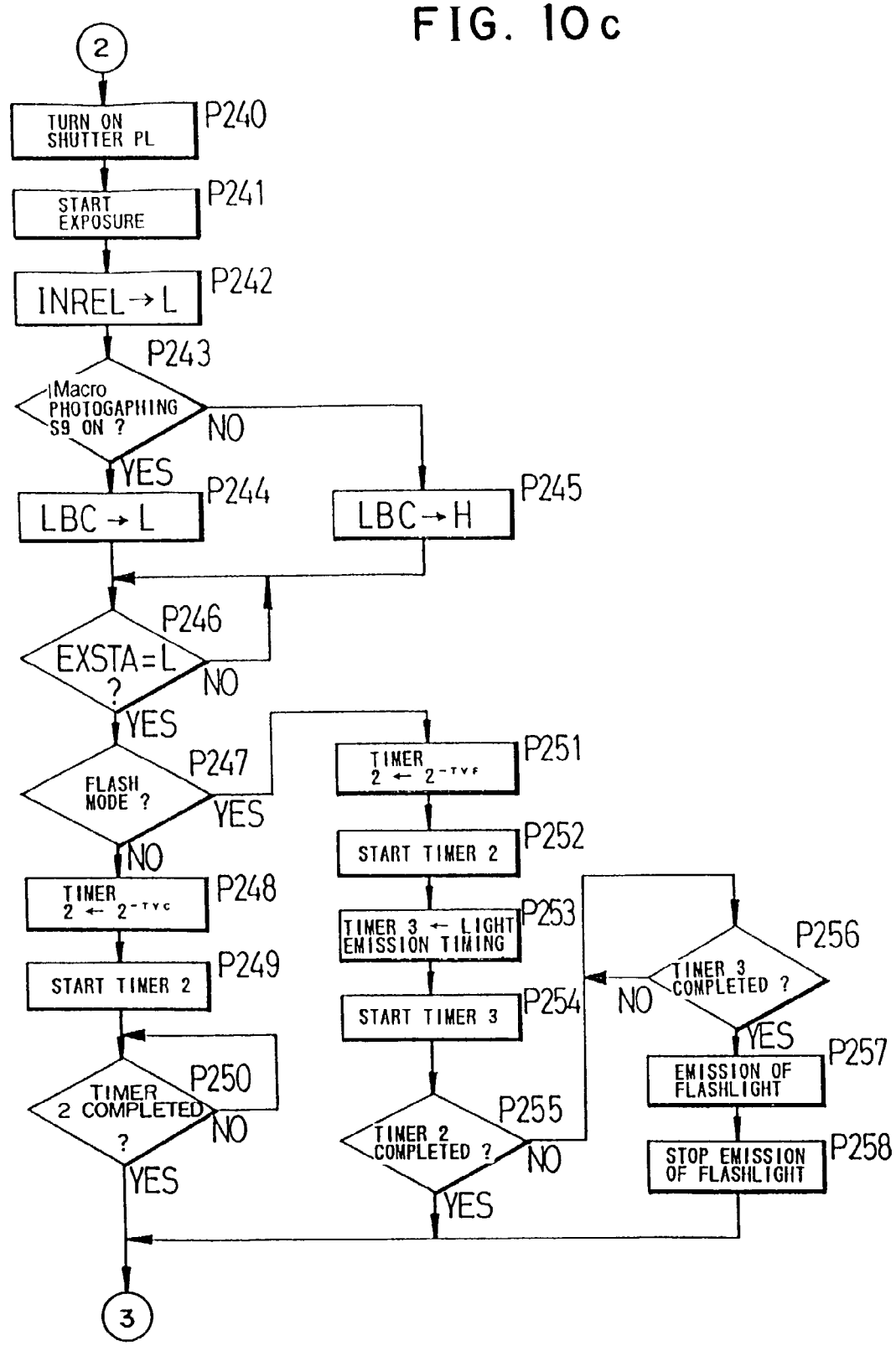

In case it is judged at step P237 that the switch S2 is on, the control sequence advances to step P240 of the flow chart shown in FIG. 10c. Referring now to FIG. 10c, at step P240, the shutter operating plunger PL is energized, and then an exposure operation is started at step P241. Thus, the release starting signal INREL is changed to "L", at step P242, to give a notice of starting of a releasing operation to the clock generating circuit 35 and the signal processing section 31. Subsequently, it is judged at step P243 whether or not the macro photographing switch S9 is on, and in case the macro photographing switch S9 is on, the signal LBC is changed to "L", at step P244, to change over correction in signal processing by the signal processing section 31 to WB, γ correction for photographing with a lamp, but on the contrary in case the macro photographing switch S9 is not on, the signal LBC is changed to "H", at step P245, to change over such correction to WB, γ correction for normal photographing. After then, it is waited at step P246 that the exposure starting signal EXSTA to be outputted from the clock generating circuit 35 is changed to "L", and then it is judged at step P247 whether or not the camera is in a flashlight photographing mode. When the camera is not in a flashlight photographing mode, that is, when normal photographing is to be performed, a value $2^{-TUC}$ is placed into the second timer (timer 2) in accordance with the shutter speed TVC for normal photographing determined as described hereinabove at step P248, and then counting of the second timer is started at step P249. The exposure operation is ended by completion of counting of the second timer at step P250, whereafter the control sequence advances to step P260 of the flow chart shown in FIG. 10d.

In case it is judged at step P247 that the camera is in a flashlight photographing mode, a value $2^{-TUF}$ is placed into the second timer, at step P251, in accordance with the shutter speed TVF for flashlight photographing determined as described hereinabove, and then counting of the second timer is started at step P252. Then, a value defining a timing of emission of flashlight of the flash apparatus 37 is placed into the third timer (timer 3) at step P253, and then counting of the timer 3 is started at step P254. In case counting of the second timer comes to an end before counting of the third timer comes to an end (for example, when the subject becomes bright suddenly) (at steps P255 and P256), the control sequence advances directly to step P260 and consequently the exposure operation is ended without emission of flashlight. On the other hand, in case counting of the third timer comes to an end before counting of the second timer comes to an end (at steps P255 and P256), the CPU 30 causes the flash apparatus 37 to emit flashlight at step P257, and after light adjustment control of such flashlight, the CPU 30 causes the flash apparatus 37 to stop its emission of flashlight, at step P258, thereby completing the exposure operation, whereafter the control sequence advances to step P260.

Figure 10D:
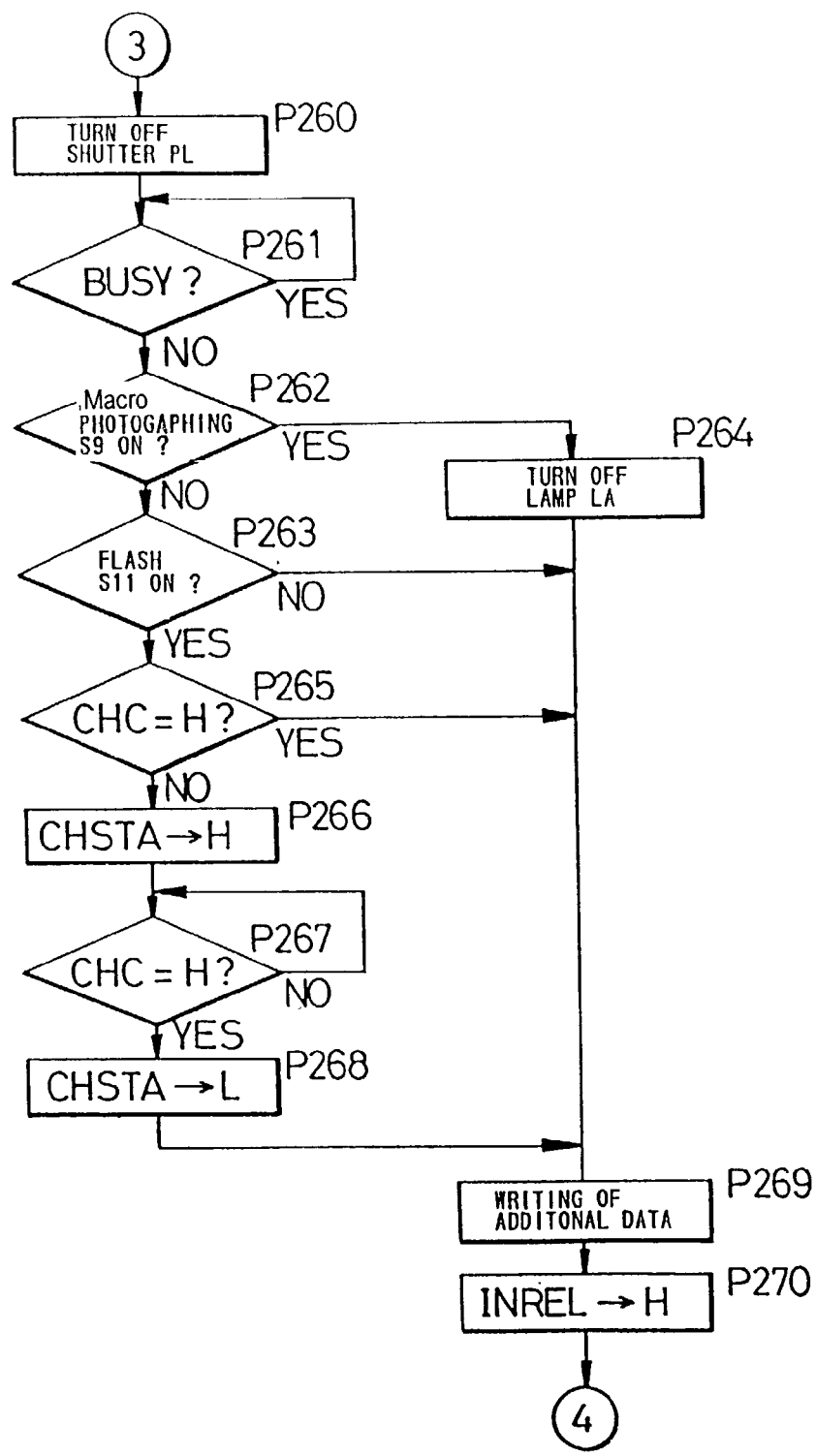

Referring now to FIG. 10d, at step P260, the shutter operating plunger PL is deenergized, and then it is waited at step P261 that signal processing in the signal processing section 31 comes to an end. Then, it is judged at step P262 whether or not the macro photographing switch S9 is on, and in case the macro photographing switch S9 is on, the lamp LA is deenergized at step P264, whereafter the control sequence advances to step P269. On the contrary in case the macro photographing switch S9 is off at step P262, it is judged subsequently at step P263 whether or not the flashlight photographing switch S11 is on. If the switch S11 is off, the control sequence advances directly to step P269, but on the contrary if the switch S11 is on, then it is judged at step P265 whether or not the signal CHC indicative of completion of charging of the main capacitor 63 of the flash apparatus 37 is "H", and in case the signal CHC is "H", the control sequence advances directly to step P269, but in case the signal CHC is not "H", the signal CHSTA for instructing starting of charging of the main capacitor 63 is subsequently changed to "H", at step P266, to cause the flash apparatus 37 to start charging of the main capacitor 63. Then, after completion of such charging is waited at step P267, the signal CHSTA is changed back to "L" to stop the charging operation at step P268, whereafter the control sequence advances to step P269.

Figure 10E:
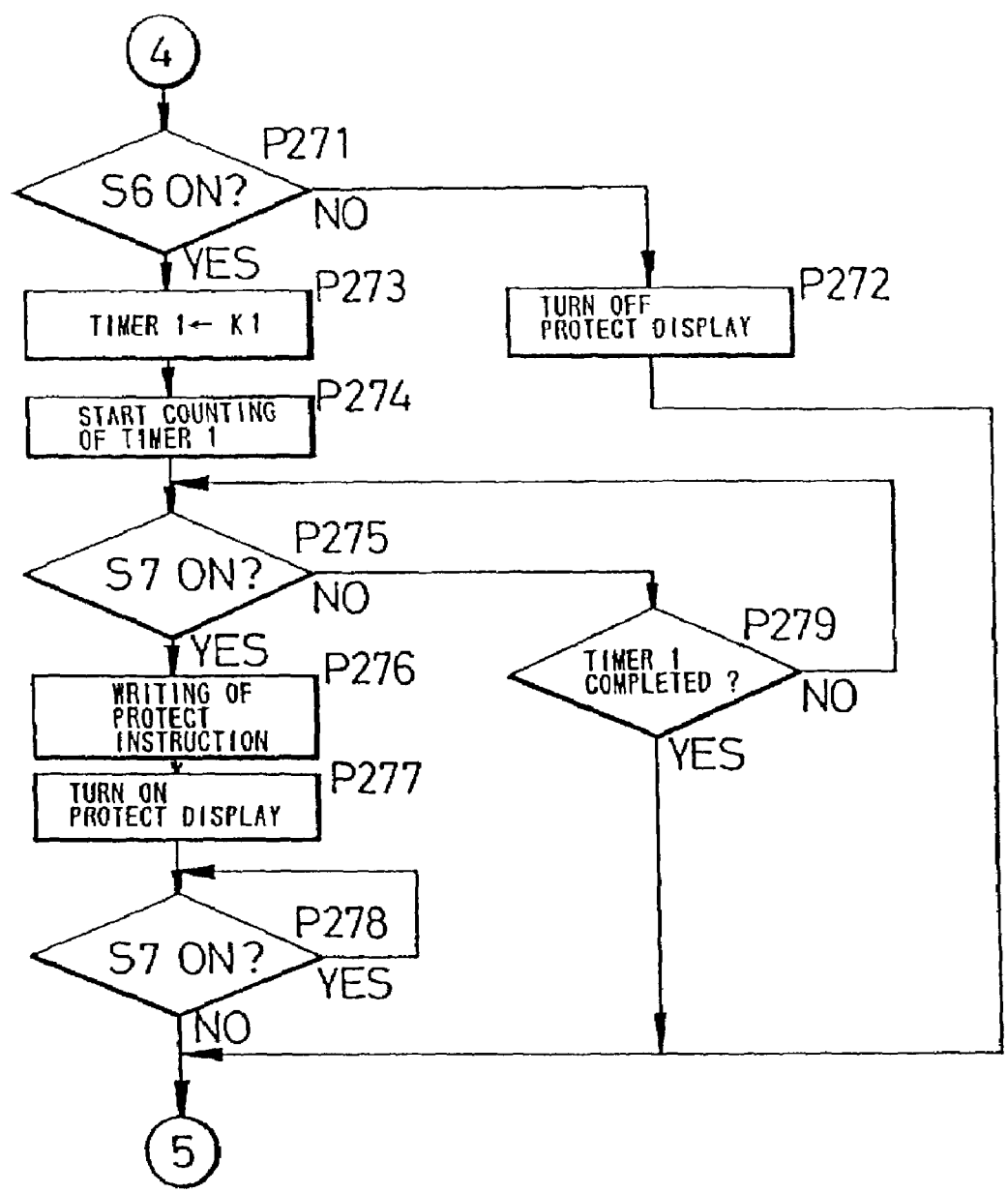

At step P269, additional data such as date data are recorded into both of the internal memory 40 and the IC card 41 by way of the data bus DB2 at step P269, and then the signal INREL which indicates completion of an exposure operation is changed to "H" at step P270, whereafter the control sequence advances to step P271 of the flow chart shown in FIG. 10e.

Figure 10F:
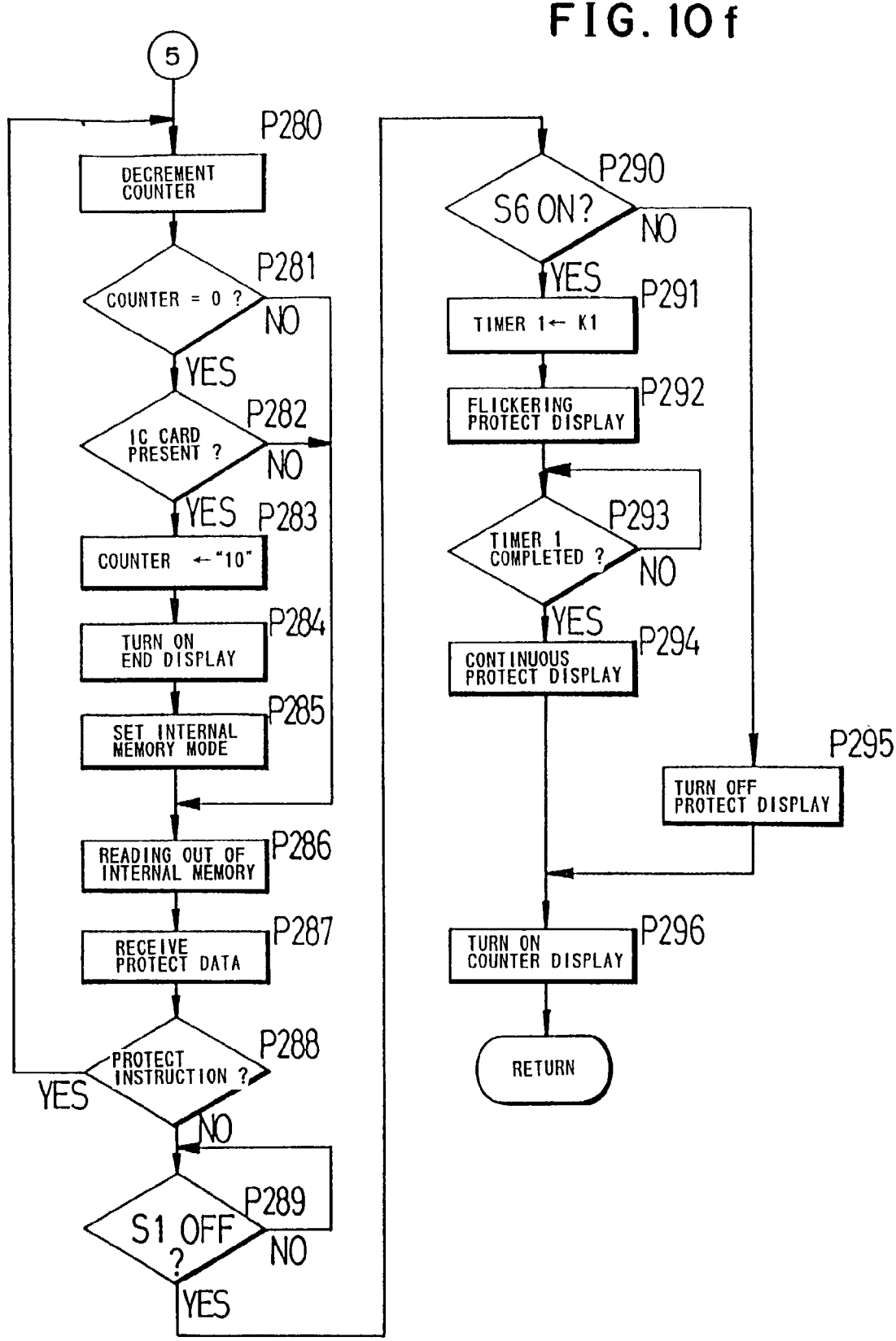

Referring now to FIG. 10e, at step P271, it is judged whether or not the protect switch S6 is set at the ON position, and if the protect switch S6 is not at the ON position, then the protect display at the display portion 5d of the display section is extinguished at step P272, whereafter the control sequence advances to step P280 of the flow chart shown in FIG. 10f. On the contrary if the protect switch S6 is at the ON position at step P271, the predetermined value K1 is placed into the first timer at step P273, and counting of the first timer is started at step P274. Then, it is judged at step P275 whether or not the protect/erasure operating switch S7 has been turned on during counting of the first timer, and if the switch S7 has been turned on, then it is determined that a frame for which a video image has been recorded immediately before then should be protected, and therefore, a protect instruction is recorded into the internal memory 40 or the IC card 41 by way of the data bus DB1 at step P276, whereafter the protect display at the display portion 5d of the display section is turned on at step P277. After then, it is waited at step P278 that the protect/erasure operating switch S7 is turned off, whereafter the control sequence advances to step P280. On the other hand, in case it is judged at step P275 that the switch S7 is not on, it is subsequently judged at step P279 whether or not counting of the first timer is completed, and if counting of the first timer is not completed, then the control sequence returns to step P275, but on the contrary if counting of the first timer is completed, then the control sequence advances to step P280. Thus, if the protect/erasure operating switch S7 is not depressed during counting of the first timer, then it is determined that a frame for which a video image has been photographed immediately before then should not be protected. In this case, the control sequence advances to step P280 after completion of counting of the first timer at step P279.

Referring now to FIG. 10f, the frame number counter is decremented by one at step P280, and then it is judged at step P281 whether or not the count value of the frame counter is equal to zero, and in case the count value is equal to zero, it is further Judged at step P282 whether or not an IC card 41 is loaded in position in the camera. When the frame counter is not equal to zero at step P281 or no IC card is loaded in position at step P282, the control sequence advances to step P286. But when the frame counter is equal to zero and an IC card 41 is loaded in position, since no further recording is possible with the IC card 41, the count value of the frame counter is set to 10 (equal to the picture image recording capacity of the internal memory 40) at step P283, and then the display of completion of recording of an IC card (oblique line of the display portion 5b of the display section 5) is turned on at step P284 and then an internal memory mode is set at step P285. When an internal memory mode is in a set condition, recording or reproduction is executed only with the internal memory 40 of the camera. Then, picture image data corresponding to a frame number of the frame counter are read out from the internal memory 40 by way of the address bus ADB1 at step P286, and data indicative of whether or not the frame is protected are received at step P287. Then, it is judged at step P288 whether or not the thus received protect data includes a protect instruction, that is, whether or not a protect instruction is already written for the frame, and in case a protect instruction is already written for the frame, no picture image must be recorded into the frame, and therefore, the control sequence returns to step P280 to subsequently execute processing for a next frame.

In case it is judged at step P288 that a protect instruction is not written for the frame as yet, it is waited subsequently at step P289 that the switch S1, which is turned on by depression of the release button 4 to the first position, is turned off. After the switch S1 is turned off, it is subsequently judged at step P290 whether or not the protect switch S6 is on. If the switch S6 is on, then the predetermined value K1 is placed into the first timer and counting of the first timer is started at step P291. After then, the protect display at the display portion 5d of the display section 5 is caused to flicker at step P292, and then the CPU 30 waits, at step P293, for a predetermined period of time defined by the value K1. After lapse of such predetermined period of time, the protect display at the display portion 5d is put into a continuous displaying condition at step P294 to give a notice of completion of a protecting operation to the user of the camera, whereafter the control sequence advances to step P296. On the other hand, in case it is judged at step P290 that the protect switch S6 is at the OFF position, the protect display at the display portion 5d is turned off at step P295, whereafter the control sequence advances to step P296. At step P296, a number of photographable frames is displayed at the counter display portion 5a of the display section 5. After then, the control sequence returns to the main routine.

Figure 11:
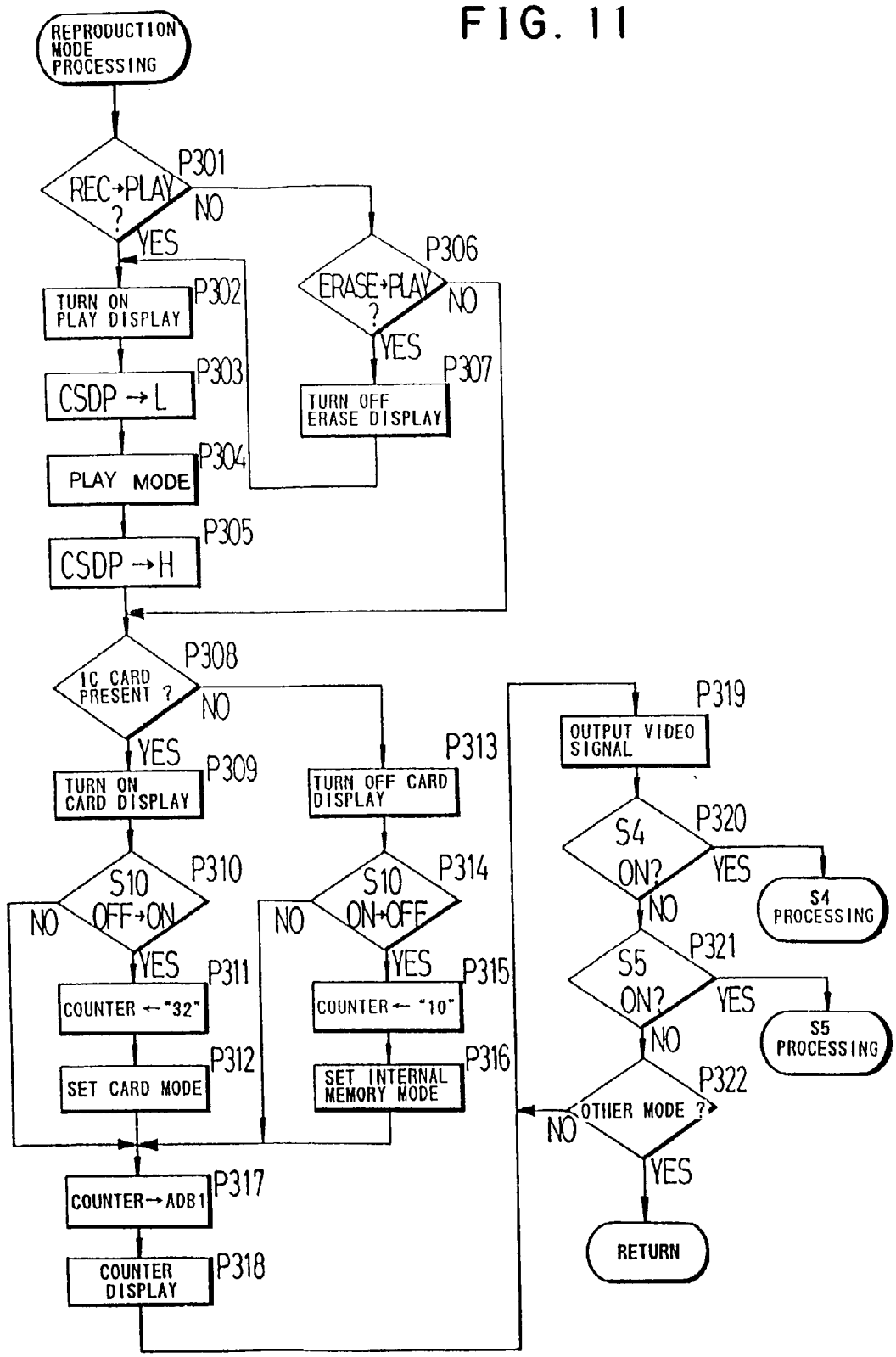
FIG. 11 is a flow chart illustrating processing of the camera of FIG. 1 in a reproduction mode.

FIG. 11 shows the reproduction mode processing routine at step P107 of the flow chart shown in FIG. 7, which is entered when the function change-over switch S3 is at the reproduction mode (PLAY) position. Referring to FIG. 11, after the present routine is entered, it is judged first at step P301 whether or not the function change-over switch S3 has been changed over from the REC position to the PLAY position, and in case the function change-over switch S3 has been changed over from the REC position to the PLAY position, the display of "PLAY" at the display portion 5e of the display section 5 is turned on at step P302, and then the signal CSDP is changed to "L", at step P303. Then, a notice that the camera has been changed over to a PLAY mode is given to the signal processing section 31 at step P304, and then the signal CSDP is changed back to "H" at step P305 to complete the communication. On the other hand, in case it is judged at step P301 that the switch S3 has not been changed over from the REC position to the PLAY position, it is subsequently judged at step P306 whether or not the mode change-over switch S3 has been changed over from the ERASE position to the PLAY position, and in case the mode change-over switch S3 has been changed over from the ERASE position to the PLAY position, the ERASE display at the display section 5f of the display portion 5 is turned off, whereafter the control sequence advances to step P302. On the contrary if the mode change-over switch S3 has not been changed over from the ERASE position to the PLAY position, the control sequence jumps to step P308.

At step P308, it is judged whether or not an IC card 41 is loaded in position in the camera. In case an IC card 41 is loaded in position, the card display at the display portion 5b of the display section is turned on at step P309, and then it is judged at step P310 whether or not the IC card 41 has been just loaded in position in a reproduction mode, and in case the IC card 41 has been just loaded in position, a reproducible frame number which is equal to "32" in the present embodiment is placed into the frame counter at step P311, whereafter an IC card mode is set at step P312. When an IC card mode is in a set condition, recording or reproduction is executed only with an IC card 41 loaded in position in the camera. After then, the control sequence advances to step P317. On the other hand, in case it is judged at step P310 that the IC card 41 was loaded in position precedently, the control sequence advances directly to step P317 skipping the steps P311 and P312. In the meantime, in case it is judged at step P308 that an IC card 41 is not loaded in position, the card display at the display portion 5b of the display section 5 is turned off at step P313, and then it is judged at step P314 whether or not an IC card 41 has just been removed from the camera. If an IC card 41 has just been removed, then a reproducible frame number which is equal to "10" in the present embodiment is placed into the frame counter at step P315, and then an internal memory mode is set at step P316, whereafter the control sequence advances to step P317. On the other hand, in case it is judged at step P314 that an IC card was removed already, the control sequence advances directly to step P317 skipping the steps P315 and P316.

At step P317, the count value of the frame counter is outputted by way of the address bus ADB1. Then, the count value is displayed at the display portion 5a of the display section 5 at step P318. Then, picture image data are read out from an address of the IC card 41 or the internal memory 40 corresponding to the count value of the frame counter and are outputted as a video signal at step P319. After then, the access switch S4 (UP) is checked at step P320, and if the access switch S4 (UP) is depressed, then the control sequence advances to the routine of S4 PROCESSING which will be hereinafter described. If the access switch S4 (UP) is not depressed, the other access switch S5 (DOWN) is checked at step P321, and if the access switch S5 (DOWN) is depressed, the control sequence advances to the routine of S5 PROCESSING which will be hereinafter described. If the access switch S5 (DOWN) is not depressed, then the other mode selection switches are checked at step P322, and if any one of the other mode selection switches is depressed, then the control sequence returns to the main routine. But if none of the other mode selection switches is depressed, then the control sequence returns to step P319 to continue outputting of a video signal.

Figure 12B:
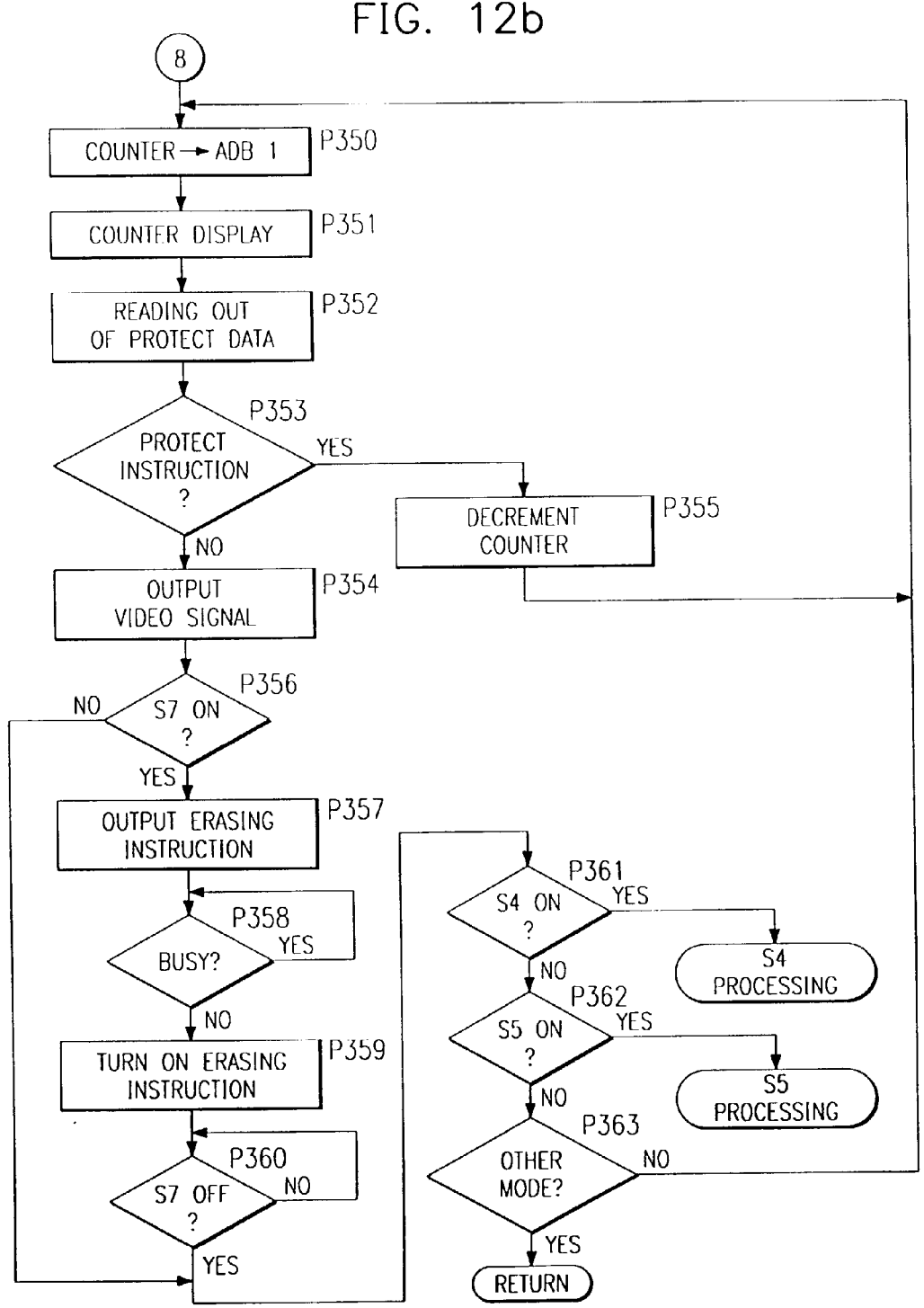
Figure 12C:
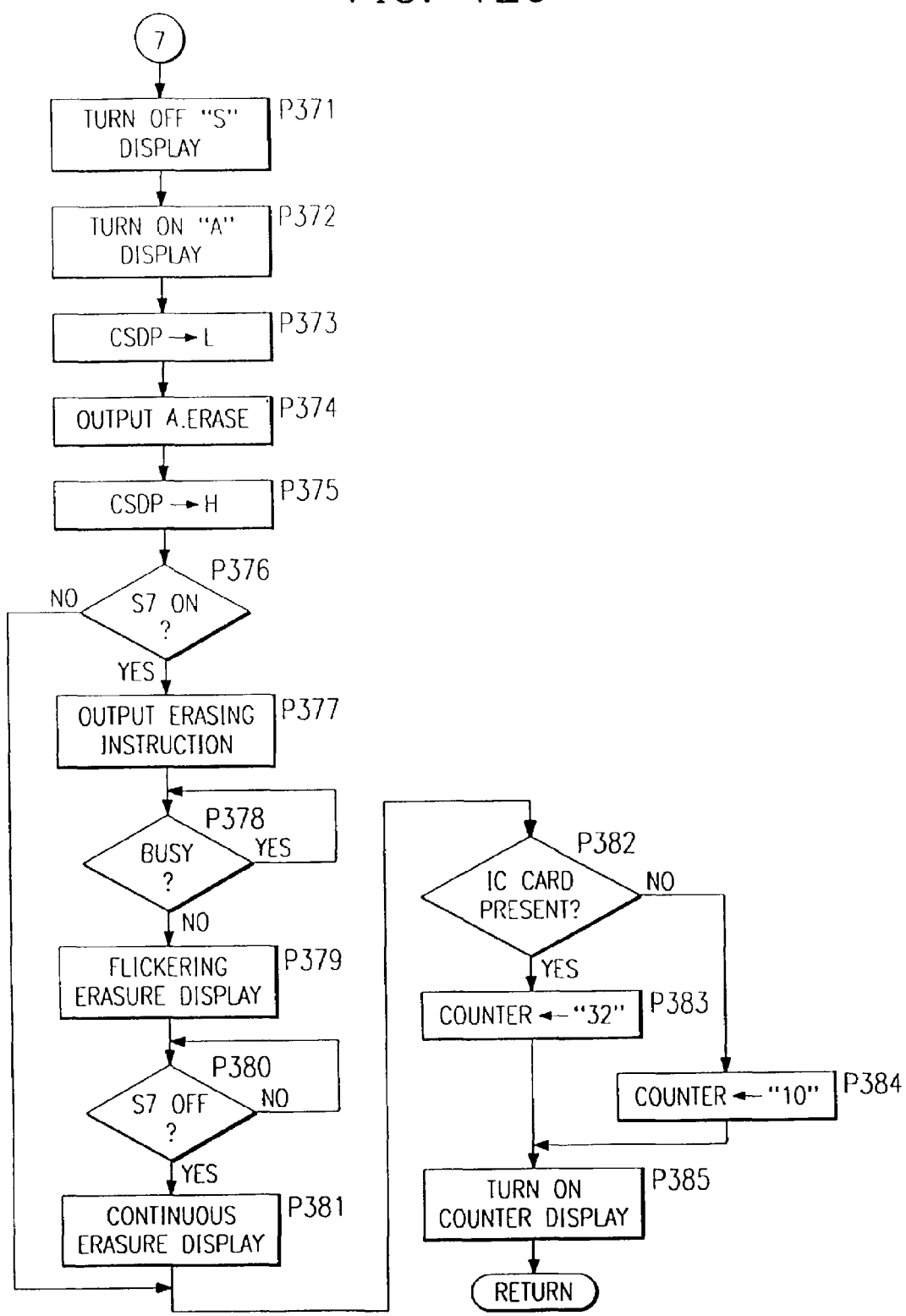

FIGS. 12a to 12c show an erasure mode processing routine at step P109 of the flow chart shown in FIG. 7, which is entered when the mode change-over switch S3 is at the erasure mode (ERASE) position. Referring first to FIG. 12a, after the present routine is entered, it is judged first at step P331 whether or not the mode change-over switch S3 is set to the ERASE-SINGL mode position. If the mode change-over switch 33 is set to the ERASE-SINGL mode position, that is, in case a single frame is to be erased, the control sequence advances to step P332, but on the contrary if the mode change-over switch 33 is not set to the ERASE-SINGL mode position, which means that the mode change-over switch 33 is set to the ERASE-ALL mode position and accordingly all frames should be erased, the control sequence advances to step P371 of the flow chart shown in FIG. 12c.

At step P332, it is judged whether or not the mode change-over switch S3 has been changed over from the PLAY mode position to the ERASE-SINGL mode position, and in the former case, the PLAY display at the display portion 5e of the display section 5 is turned off subsequently at step P333 and then the control sequence advances to step P336, but in the latter case, it is subsequently judged at step P334 whether or not the mode change-over switch S3 has been changed over from the ERASE-ALL mode position to the ERASE-SINGL mode position, and if the mode change-over switch S3 has not been changed over from the ERASE-ALL mode position to the ERASE-SINGL mode position, then the control sequence advances to step P340. On the contrary, if the mode change-over switch S3 has not been changed over from the ERASE-ALL mode position to the ERASE-SINGL mode position, the display of "A" representing all frames is turned off at step P335, whereafter the control sequence advances to step P336.

At step P336, the display of "S" representing a single frame is turned on. Then, the signal CSDP is changed to "L" at step P337, and a notice that the camera is in a single frame erasing mode is given to the signal processing CPU 51 at step P338, whereafter the signal CSDP is changed back to "H" at step P339 to complete the communication.

Then, it is judged at step P340 whether or not an IC card 41 is loaded in position in the camera. After then, an IC card mode or an internal memory mode is set in accordance with such judgment at steps P341 to P348. Details of the processing at such steps P340 to P348 are the same as those at steps P308 to P316 of the PLAY PROCESSING routine shown in FIG. 11, respectively, and accordingly, description thereof is omitted herein to avoid redundancy.

After an IC card mode or an internal memory mode is set in this manner, the control sequence advances to step P350 of the flow chart shown in FIG. 12b. Referring now to FIG. 12b, at step P350, a count value of the frame counter is outputted over the address bus ADB1, and then the count value is displayed at step P351. After then, protect data of a picture image to be reproduced are read out at step P352. Then, presence or absence in the protect data of a protect instruction for the picture image to be reproduced is determined at step P353, and in case no protect instruction is determined, that is, in case the picture image to be reproduced is not protected, a video signal is outputted at step P354, whereafter the control sequence advances to step P356, but on the contrary if a protect instruction is determined, then the frame counter is decremented by one at step P353, whereafter the control sequence returns to step P350 to execute processing for a next frame. As a result of such processing at steps P350 to P355, reproduction of a picture image for which a protect instruction is recorded is inhibited, and consequently, such picture image will not be erased in error.

At step P356, it is judged whether or not the protect/erasure operating switch S7 is on. If the switch S7 is on, then an erasing instruction is outputted to the signal processing CPU 51 at step P357, and after it is waited at step P358 that erasing processing of the recorded picture image by the signal processing CPU 51 is completed, the erasure display at the display portion 5f of the display section 5 is turned on at step P359. After then, it is waited at step P360 that the protect/erasure operating switch S7 is turned off, whereafter the control sequence advances to step P361. Also when it is judged at step P356 that the switch S7 is not on, the control sequence advances but directly to step P361.

At step P361, the access switch S4 (UP) is checked, and if the access switch S4 (UP) is depressed, then the control sequence advances to the S4 PROCESSING routine, but otherwise, the other access switch S5 (DOWN) is checked at step P362. If the access switch S5 (DOWN) is depressed, then the control sequence advances to the S5 PROCESSING routine, but otherwise, the control sequence advances to step P363, at which the other mode selection switches are checked. If any one of the other mode selection switches is depressed, then the control sequence returns to the main routine. But when none of the other mode selection switches is depressed, the control sequence returns to step P350.

In case it is judged at step P331 of the flow chart shown in FIG. 12a that the mode change-over switch S3 is set not to the ERASE-SINGL mode position but to the ERASE-ALL mode position so that not a single frame but all frames should be erased, the control sequence advances to step P371 shown in FIG. 12c as described hereinabove. Thus, referring now to FIG. 12c, the display of "S" denoting a single frame at the display portion 5f of the display section 51 is turned off at step P371. Then, the display of "A" denoting all frames is turned on at step P372. After then, the signal CSDP is changed to "L" at step P373, and a notice that the camera is in an all frame erasing mode is given to the signal processing CPU 51 at step P374, whereafter the signal CSDP is changed back to "H" at step P375 to complete the communication. Subsequently, it is judged at step P376 whether or not the protect/erasure operating switch S7 is on, and if the switch S7 is not on, then the control sequence advances directly to step P382, but on the contrary if the switch S7 is on, then an erasing instruction is outputted to the signal processing CPU 51 at step P377. Then, it is waited at step P378 that a notice of completion of erasing processing is received from the signal processing CPU 51, and then the erasure display at the display portion 5f of the display section 5 is caused to flicker at step P379. Then, it is waited at step P380 that the switch S7 is turned off, and then the erasure display at the display portion 5f of the display section 5 is changed into a continuous display at step P381. After then, presence or absence of an IC card 41 is determined at step P382, and in case an IC card 41 is loaded in position in the camera, the value "32" is placed into the frame counter at step P383, but on the contrary if no IC card is loaded in position, then the value "10" is placed into the frame counter at step P384. In either case, the count value is displayed at the display portion 5a of the display section 5 at step P385, and after then, the control sequence returns to the main routine.

Figure 13A:
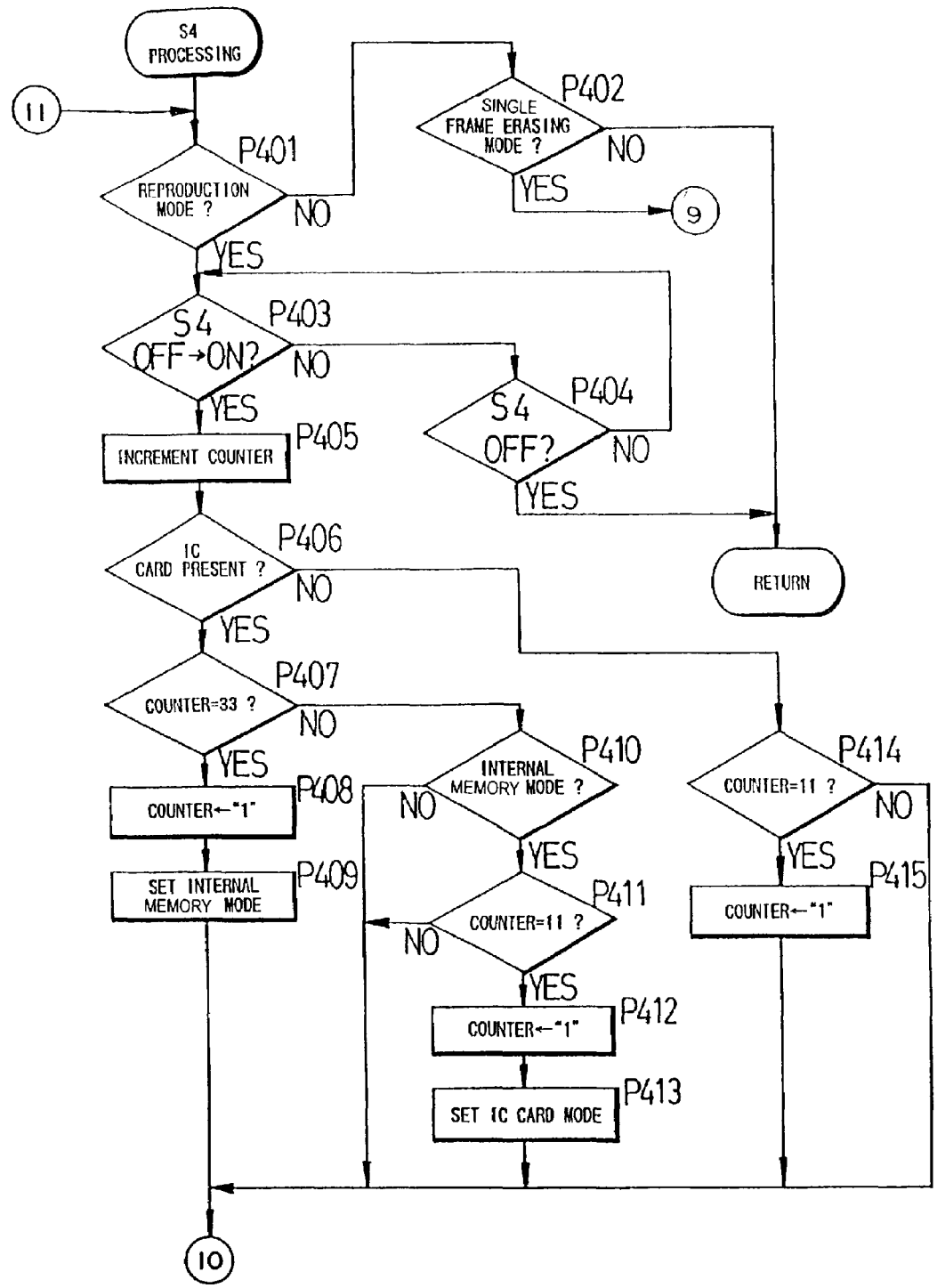
FIGS. 13a to 13d are flow charts illustrating processing of the camera of FIG. 1 which is executed when an access switch is operated.

FIGS. 13a to 13d show details of the routine of S4 PROCESSING at step P111 of the flow chart shown in FIG. 7 which is entered in response to operation of the access switch S4 (UP) to execute forward feeding of picture image frames for reproduction of a recorded picture image or forward feeding of picture image frames for erasure of a picture image frame by frame. Referring first to FIG. 13a, after the present routine is entered, it is first Judged at step P401 whether or not the mode change-over switch S3 is at the reproduction mode (PLAY) position. If the switch S3 is not at the reproduction mode position, then it is judged at step P402 whether or not the mode change-over switch S3 is at the ERASE-SINGL mode position for erasing a single frame, and if the mode change-over switch S3 is at the ERASE-SINGL mode position, then the control sequence advances to step P441 of the flow chart shown in FIG. 13c, but if the mode change-over switch S3 is not at the ERASE-SINGL mode position, then the control sequence returns to the main routine.

In case it is judged at step P401 that the mode change-over switch S3 is at the reproduction mode (PLAY) position, it is subsequently judged at step P403 whether or not the access switch S4 has changed from an off-state to an on-state, and if the access switch S4 does not present such change, then it is judged at step P404 whether or not the access switch S4 is in an off-state. If the access switch S4 is off, then the control sequence returns to the main routine, but otherwise if the access switch S4 is on, then the control sequence returns to step P403. Consequently, each time the access switch S4 is changed from an off-state to an on-state, the control sequence advances to step P405. At step P405, the frame counter is incremented by one. Then, it is judged at step P406 whether or not an IC card 41 is loaded in position in the camera. In case an IC card 41 is loaded in position, it is judged subsequently at step P407 whether or not the count value of the frame counter is equal to "33". If the count value is equal to "33", then since this signifies that reproduction of all frames recorded in the IC card 41 has been completed, the count value is re-set to "1" at step P408, and then an internal memory mode is set, at step P409, for reproduction of a picture image recorded in the internal memory 40, whereafter the control sequence advances to step P416 of the flow chart shown in FIG. 13b. On the other hand, in case it is judged at step P407 that the count value of the frame counter is not equal to "33", it is judged subsequently at step P410 whether or not an internal memory mode is set, and in case an internal memory mode is set, it is judged subsequently at step P411 whether or not the count value of the frame counter is equal to "11". If the count value is equal to "11", then since this means that reproduction of all frames recorded in the internal memory 40 has been completed, the count value is re-set to "1" at step P412, and then an IC card mode is set, at step P413, for reproduction of a picture image recorded in the IC card 41. After then, the control sequence advances to step P416 of the flow chart shown in FIG. 13b. Also when the judgment at step P410 or P411 is in the negative, the control sequence advances to step P416. In the meantime, in case it is judged at step P406 that no IC card is loaded in position in the camera, it is judged subsequently at step P414 whether or not the count value of the frame counter is equal to "11". If the count value is equal to "11", the count value is re-set to "1", and then the control sequence advances to step P416, but otherwise if the count value is not equal to "11", the control sequence advances directly to step P416.

Figure 13B:
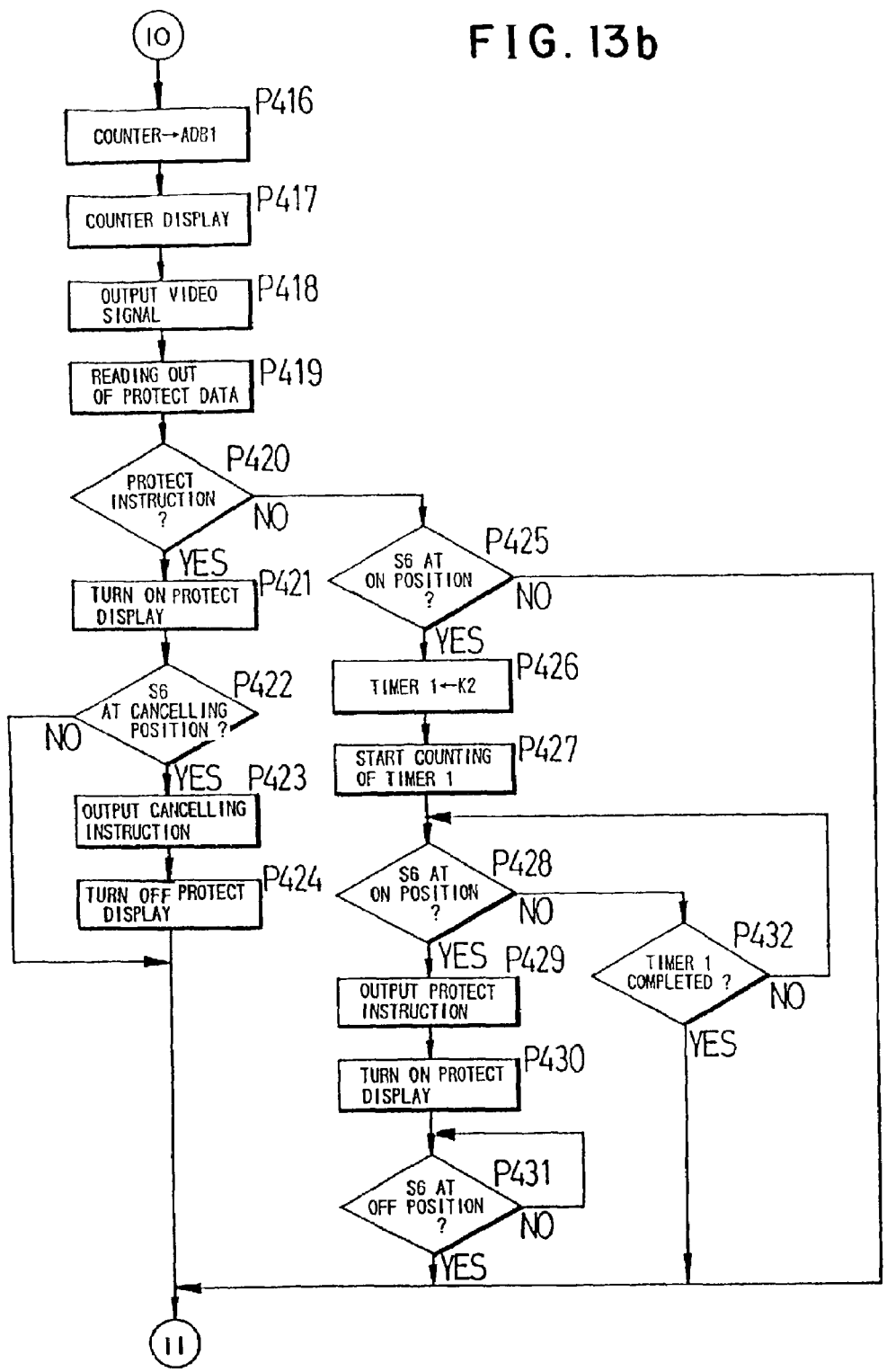

Referring now to FIG. 13b, at step P416, the count value of the frame counter is outputted over the address bus ADB1 to access the IC card 41 or the internal memory 40. Then, the count value is displayed at the display portion 5a of the display section 5 at step P417, and then picture image data of a frame at a corresponding address are read out from the IC card 41 or the internal memory 40 and outputted as a video signal at step P418. After then, protect data of the frame being reproduced are read out at step P419, and then it is judged at step P420 whether or not the picture image being reproduced is in a protected condition. If the judgment proves that the picture image is protected, the protect display at the display portion 5d of the display section 5 is tuned on at step P421, and then it is judged at step P422 whether or not the protect switch S6 is at the cancelling (REMOVE) position for cancellation of protection. In case the protect switch S6 is at the cancelling position, a cancelling instruction is outputted to the signal processing section 31 at step P423, and then the protect display at the display portion 5d is turned off at step P424, whereafter the control sequence returns to step P401 of the flow chart of FIG. 13a described hereinabove. In case the switch S6 is not at the cancelling position at step P422, the control sequence returns directly to step P401.

In case it is judged at step P420 that the display image being reproduced is not protected, it is judged subsequently at step P425 whether or not the protect switch S6 is at its ON position, and if the protect switch S6 is not at the ON position, then the control sequence returns to step P401. On the contrary if the protect switch S6 is at the ON position, then a predetermined value K2 is placed into the first timer (timer 1) at step P426 and then counting of the timer 1 is started at step P427. Then, during counting of the first timer, it is judged whether or not the protect/erasure operating switch S6 has been changed to an on state. In particular, it is judged at step P428 whether or not the protect/erasure operating switch S6 is on, and then if the switch S6 is not on, then it is judged at step P432 whether or not counting of the first timer is completed. If counting of the first timer is completed, then the control sequence returns to step P401, but otherwise if counting of the first timer is not completed, the control sequence returns to step P428. If the protect/erasure operating switch S6 is changed to an on position at step P428, then a protect instruction is outputted over the data bus DB2 and written into the IC card 41 or the internal memory 40 at step P429, and then the protect display at the display portion 5d of the display section 5 is turned on at step P430. Then, it is waited at step P431 that the switch S6 is turned off, whereafter the control sequence returns to step P401.

It is to be noted that, while in the embodiment described above a timing at which the protect switch S6 should be operated is defined by the time K2 set on the first timer (timer 1) and a picture image is put into a protected condition only when the switch S6 is operated at the timing, such timing at which a picture image should be put into a protected condition may otherwise be defined, for example, when a picture image for an object is changed over to a next picture image.

Figure 13C:
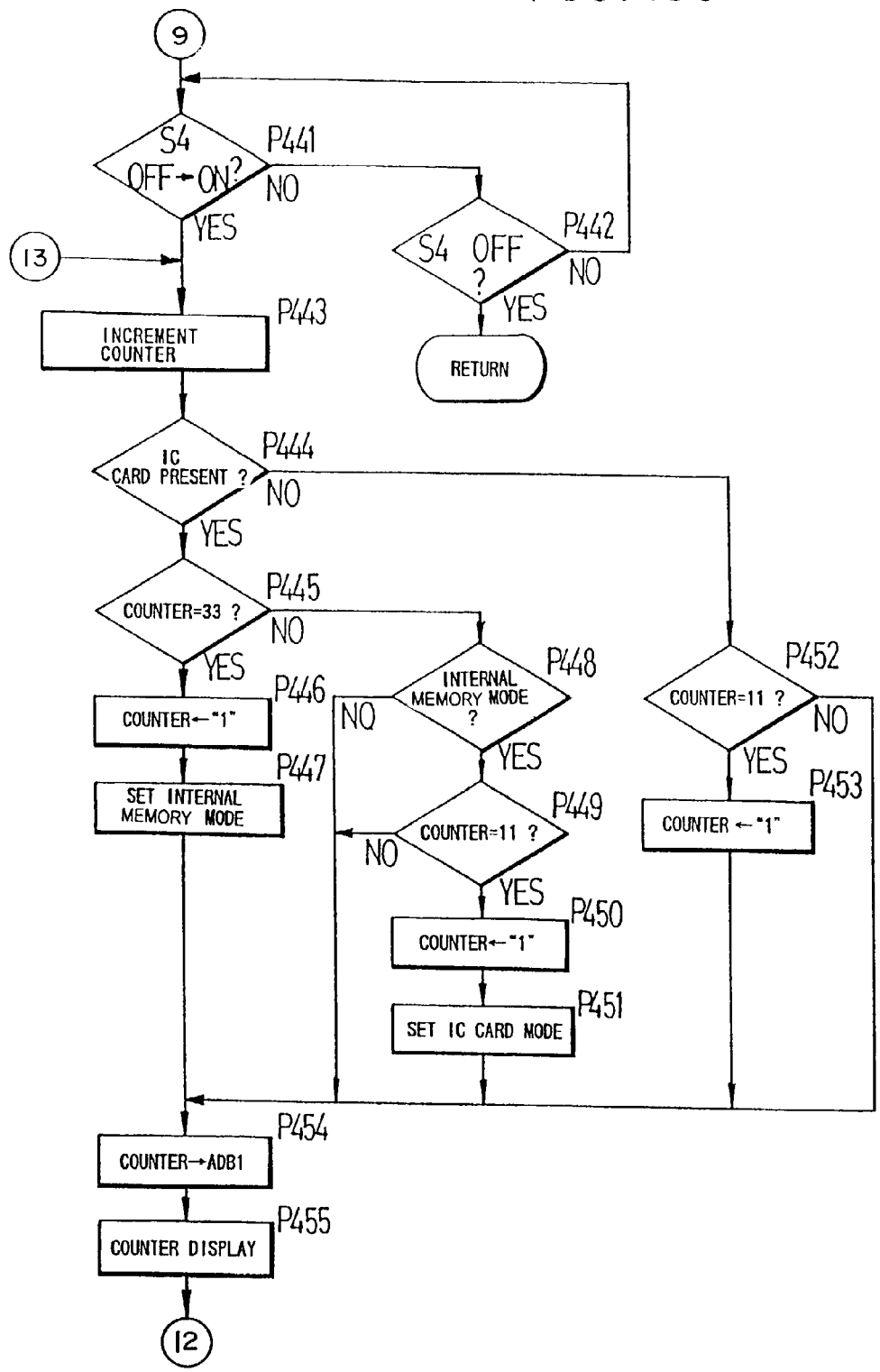

In case it is judged at step P402 of the flow chart shown in FIG. 13a that the mode change-over switch S3 is at the ERASE-SINGL mode position, the control sequence advances to step P441 of the flow chart shown in FIG. 13c as described hereinabove. Here, processing at steps P441 to P455 of the flow chart shown in FIG. 13c is similar to the processing at steps P403 to P417 (FIGS. 13a and 13b), and accordingly, description thereof is omitted herein to avoid redundancy. Thus, after a count value of the frame counter is displayed at step P455, the control sequence advances to step P456 of the flow chart shown in FIG. 13d.

Figure 13D:
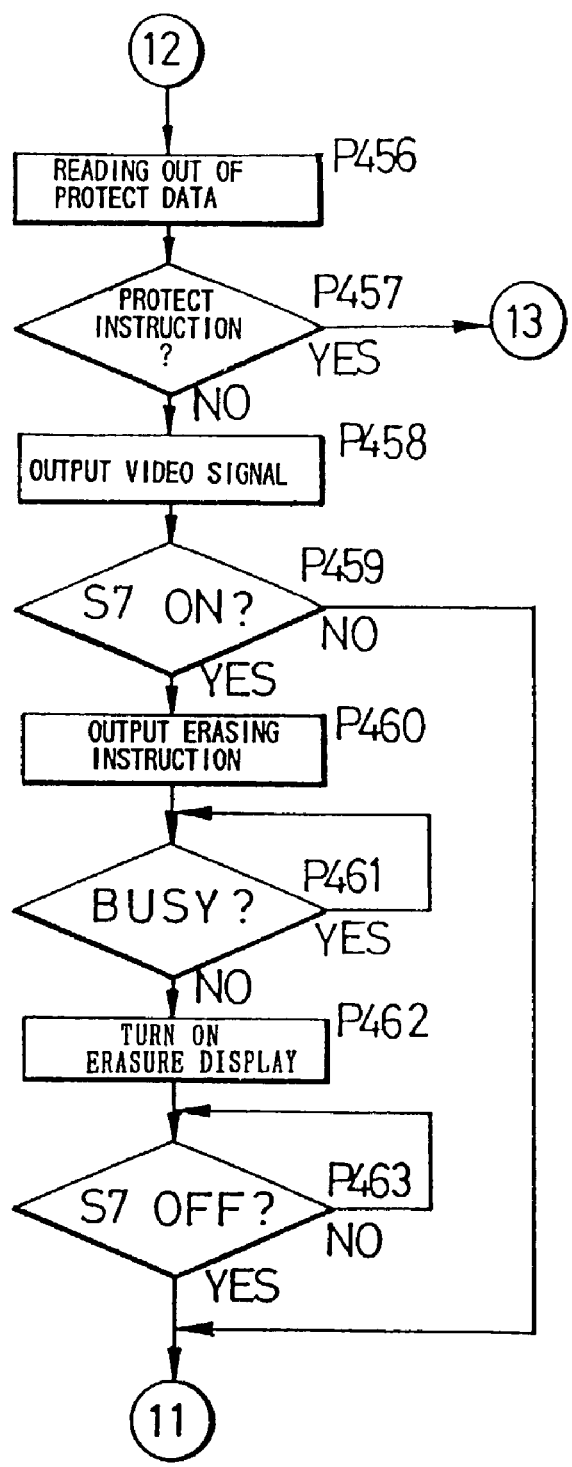

Referring now to FIG. 13d, at step P456, protect data of a picture image to be reproduced are read out. Then, it is judged at step P457 whether or not the picture image to be reproduced is in a protected condition, and if the picture image is not in a protected condition, a video signal is outputted at step P458, whereafter the control sequence advances to step P459, but on the contrary if the picture image is in a protected condition, then the control sequence returns to step P443 of the flow chart shown in FIG. 13c in order to subsequently execute processing for a next frame. As a result of such processing as described above, reproduction of a picture image in a protected condition is inhibited, and such picture image will not be erased in error.

At step P459, it is judged whether or not the protect/erasure operating switch S7 has been changed to an on-state, and in case the switch S7 is on, then an erasing instruction is outputted to the signal processing CPU 51 at step P460, and then the erasure display at the display portion 5f of the display section 5 is turned on at step P462 after it is waited at step P461 that a signal of completion of erasing processing of the recorded picture image is received from the signal processing CPU 51. Then, after it is waited at step P463 that the switch S7 is changed over back to an off-state, the control sequence returns to step P401. Also when it is judged at step P459 that the switch S7 is not on, the control sequence returns to step P401.

Figure 14A:
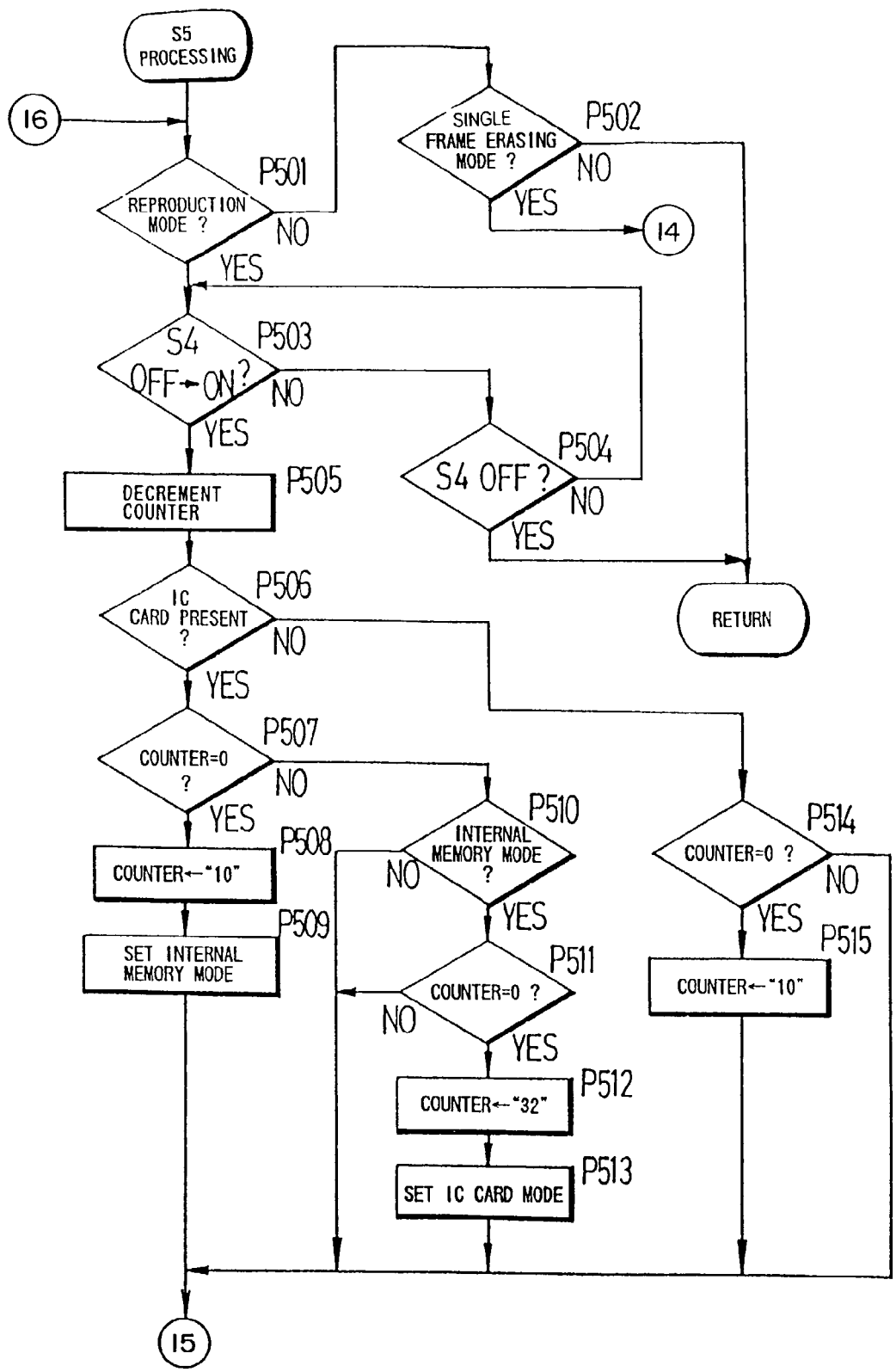
FIGS. 14a to 14d are flow charts illustrating processing of the camera of FIG. 1 which is executed when another access switch is operated.

FIGS. 14a to 14d show details of processing at step P113 of the flow chart shown in FIG. 7 which is entered in response to operation of the access switch S5 (DOWN) to execute reverse feeding of picture image frames for reproduction of a recorded picture image or reverse feeding of picture image frames for erasure of a picture image frame by frame. Referring first to FIG. 14a, after the present routine is entered, it is first judged at step P501 whether or not the function change-over switch S3 is at the reproduction mode (PLAY) position. If the switch S3 is not at the reproduction mode position, then it is judged at step P502 whether or not the function change-over switch S3 is at the ERASE-SINGL mode position for erasing a single frame, and if the function change-over switch S3 is at the ERASE-SINGL mode position, then the control sequence advances to step P541 of the flow chart shown in FIG. 14c, but if the function change-over switch S3 is not at the ERASE-SINGL mode position, then the control sequence returns to the main routine.

In case it is judged at step P501 that the mode change-over switch S3 is at the reproduction mode position, it is subsequently judged at step P503 whether or not the access switch S5 has changed from an off-state to an on-state, and if the access switch S5 does not present such change, then it is judged at step P504 whether or not the access switch S5 is in an off-state. If the access switch S5 is off, then the control sequence returns to the main routine, but otherwise if the access switch S5 is on, then the control sequence returns to step P503. Consequently, each time the access switch S5 is changed from an off-state to an on-state, the control sequence advances to step P505. At step P505, the frame counter is decremented by one. Then, it is judged at step P506 whether or not an IC card 41 is loaded in position in the camera. In case an IC card 41 is loaded in position, it is judged subsequently at step P507 whether the count value of the frame counter has been reduced to "0". If the count value is equal to "0", then since this signifies that reproduction of all frames recorded in the IC card 41 has been completed, the count value is set to "10" at step P508, and then an internal memory mode is set, at step P509, for reproduction of a picture image recorded in the internal memory 40, whereafter the control sequence advances to step P516 of the flow chart shown in FIG. 14b. On the other hand, in case it is judged at step P507 that the count value of the frame counter is not equal to "0", it is judged subsequently at step P510 whether or not an internal memory mode is set, and in case an internal memory mode is set, it is judged subsequently at step P511 whether or not the count value of the frame counter is equal to "0". If the count value is equal to "0", then since this means that reproduction of all frames recorded in the internal memory 40 has been completed, the count value is set to "32" at step P512, and then an IC card mode is set, at step P513, for reproduction of a picture image recorded in the IC card 41. After then, the control sequence advances to step P516 of the flow chart shown in FIG. 14b. Also when the judgment at step P510 or P511 is in the negative, the control sequence advances to step P516. In the meantime, in case it is judged at step P506 that no IC card is loaded in position in the camera, it is judged subsequently at step P514 whether or not the count value of the frame counter is equal to "0". If the count value is equal to "0", then the count value is set to "10" at step P515, and then the control sequence advances to step P516, but otherwise if the count value is not equal to "0", the control sequence advances directly to step P516.

Figure 14B:
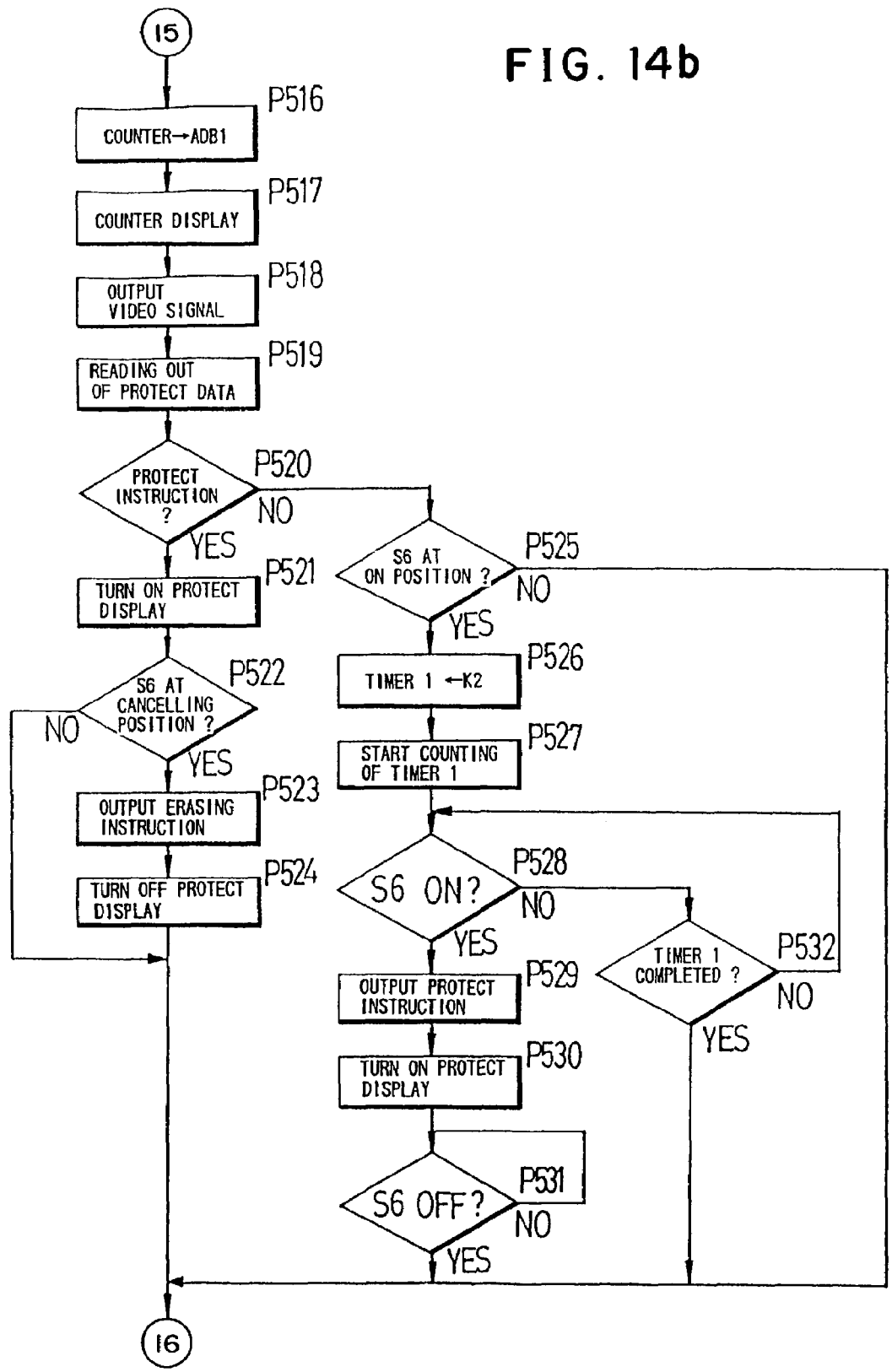

Processing of the flow chart shown in FIG. 14b which includes steps P516 to P531 is the same as the processing of the flow chart shown in FIG. 13b which includes the steps P416 to P431, and accordingly, description thereof will be omitted herein to avoid redundancy.

Figure 14C:
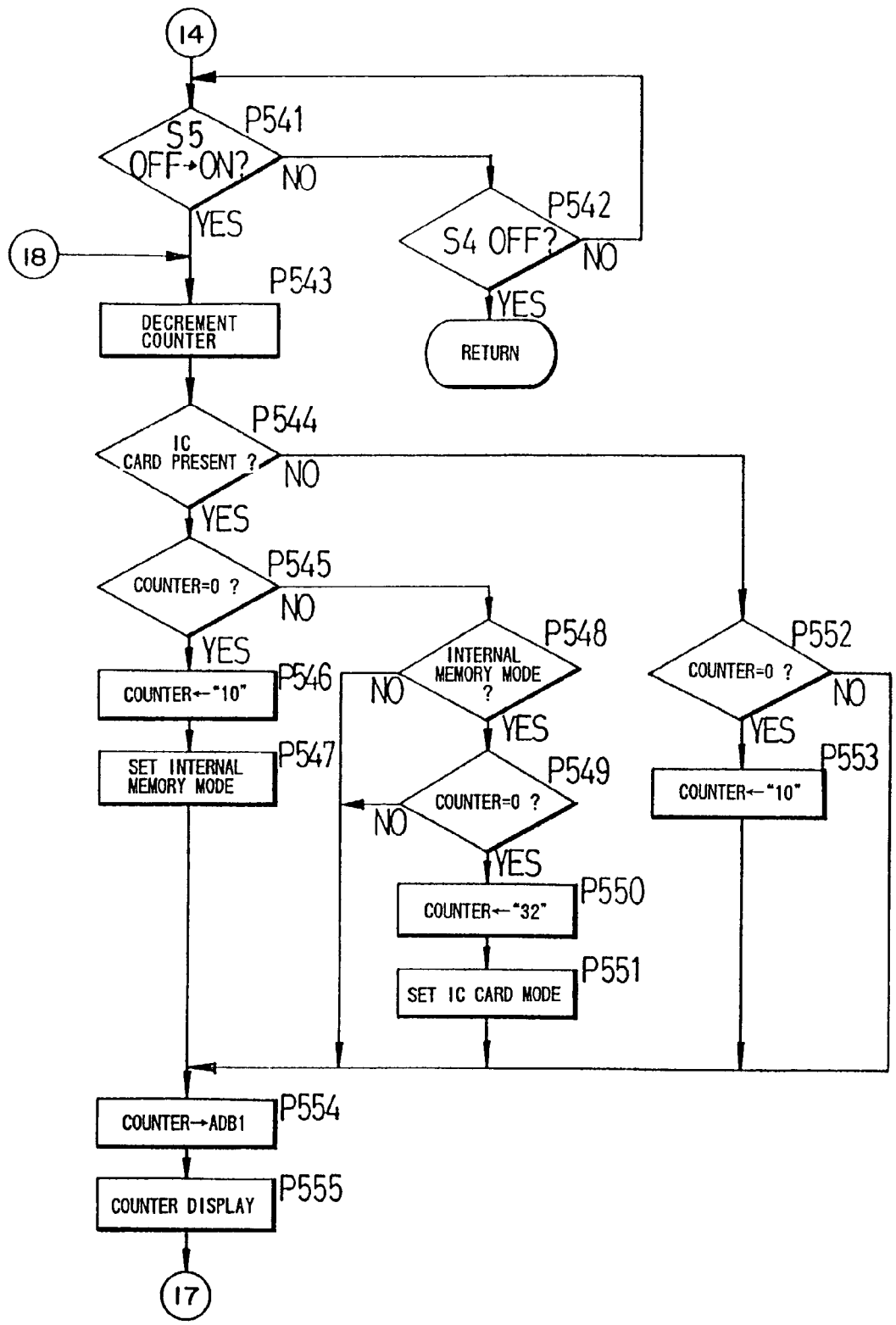
Figure 14D:
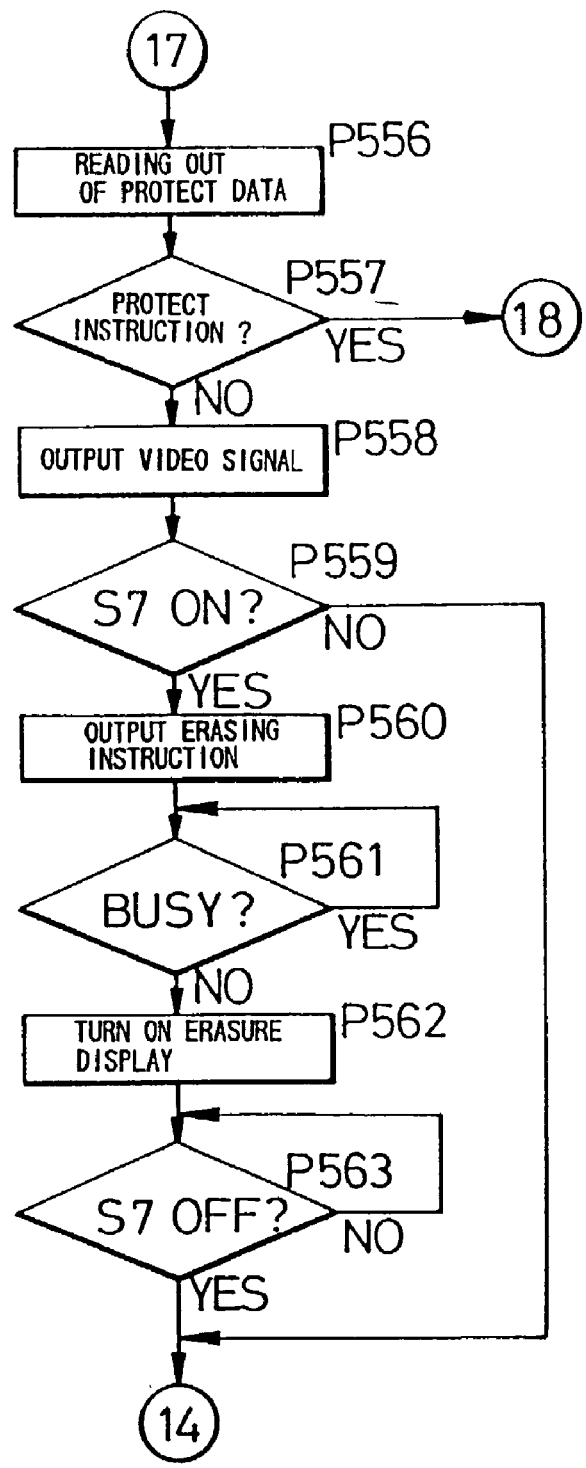

In case it is judged at step P502 of the flow chart shown in FIG. 14a that the mode change-over switch S3 is at the ERASE-SINGL mode position, the control sequence advances to step P541 of the flow chart shown in FIG. 14c as described hereinabove. Here, processing at steps P541 to P555 of the flow chart shown in FIG. 14c is the same as the processing at steps P503 to P517 (FIGS. 14a and 14b). Further, processing at steps P556 to P563 of the flow chart shown in FIG. 14d is the same as the processing at steps P456 to P463 of the flow chart shown in FIG. 13d. Accordingly, description of the processing of the flow charts shown in FIGS. 14c and 14d is omitted herein to avoid redundancy.

Figure 15A:
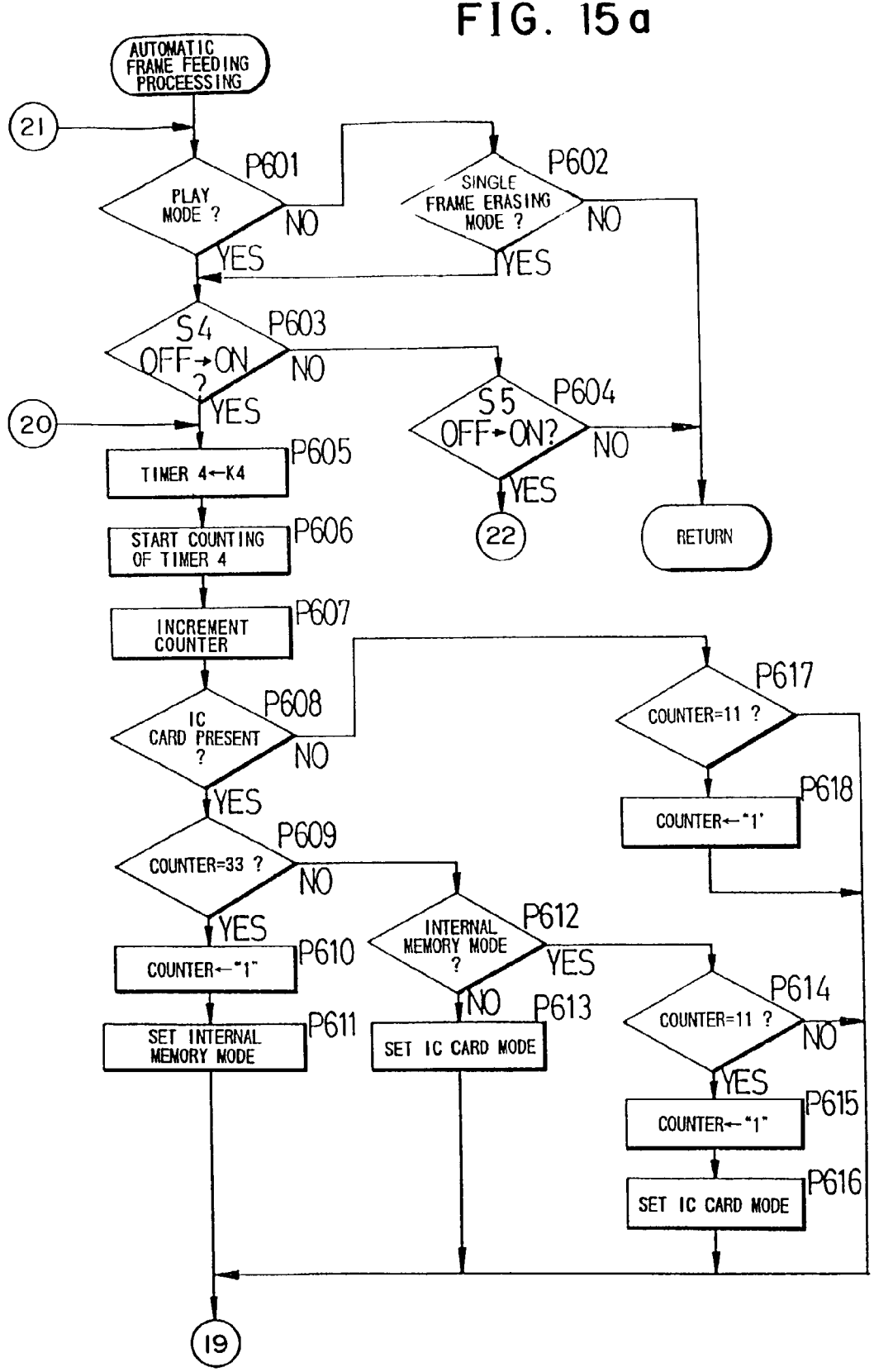
FIGS. 15a to 15c are flow charts illustrating automatic frame feeding processing of the camera of FIG. 1 which is executed when a frame feeding switch is depressed.
Figure 15B:
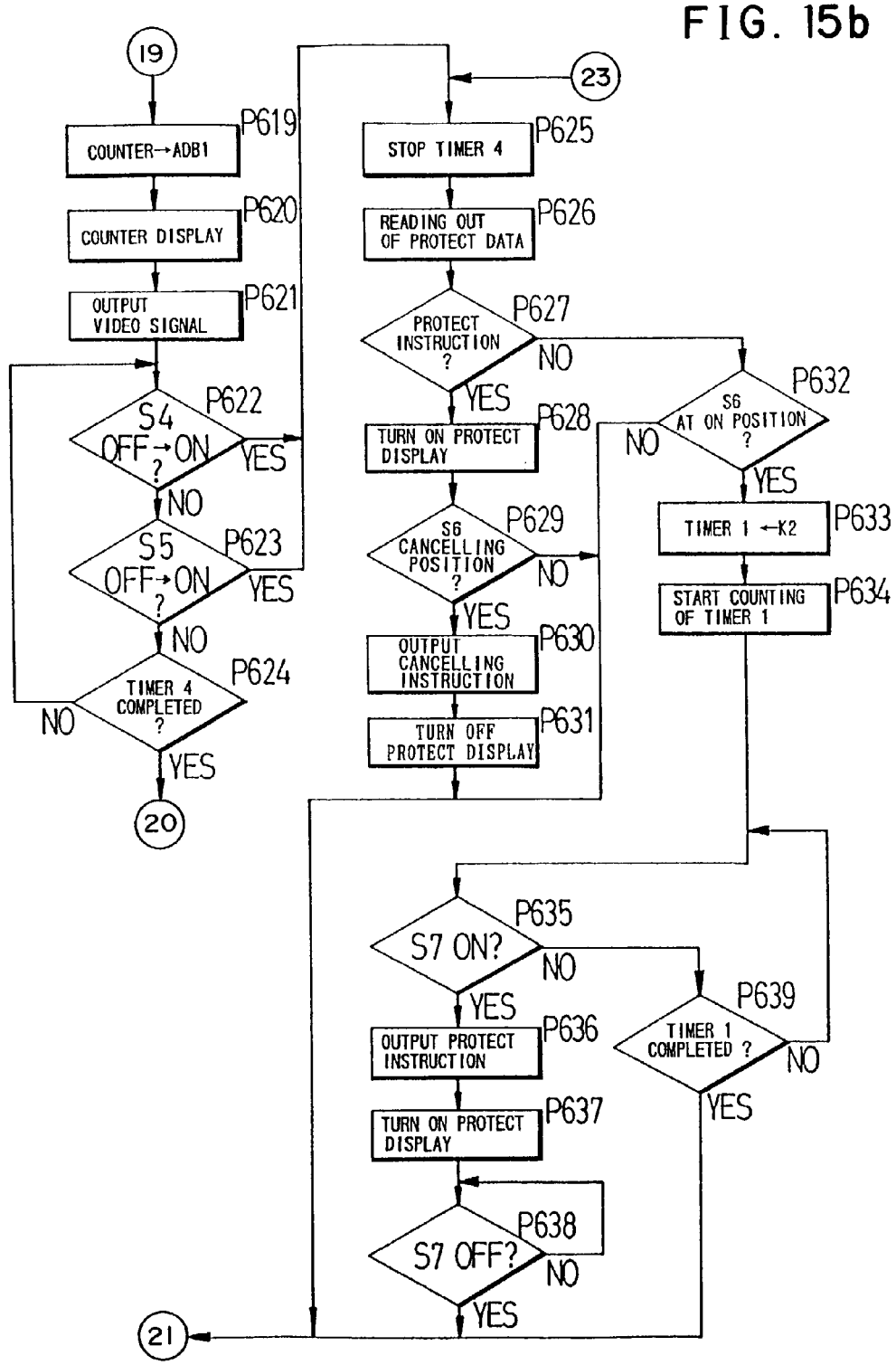
Figure 15C:
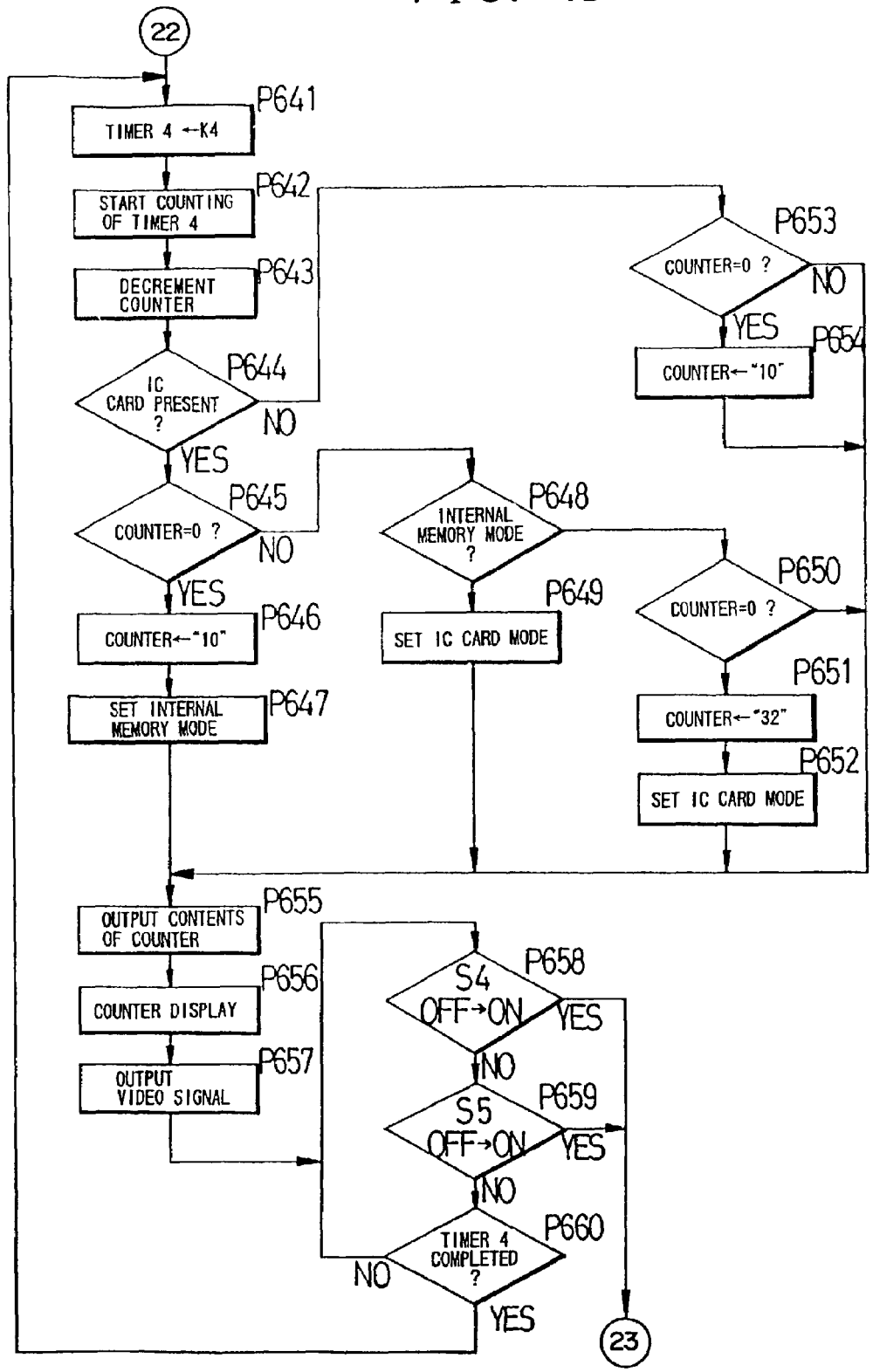

FIGS. 15a to 15c show details of the automatic frame feeding processing at step P115 of the flow chart shown in FIG. 7 which is entered in response to operation of the frame feeding change-over switch S8 to execute automatic feeding of picture image frames for reproduction of a recorded picture image. Referring first to FIG. 15a, after the present routine is entered in response to operation of the switch 8 to select automatic frame feeding, it is first judged at step P601 whether or not the function change-over switch S3 is at the picture image reproduction (PLAY) mode position, and if the function change-over switch S3 is not at the picture image reproduction (PLAY) mode position, then it is judged at step P602 whether or not the function change-over switch S3 is at the single frame erasing (ERASE-SINGL) mode position. Thus, only when the function change-over switch S3 is either at the picture image reproduction mode position or at the single frame erasing mode position, the control sequence advances to step P603, but in any other case, the control sequence returns to the main routine.

At step P603, it is judged whether or not the access switch S4 has been changed from its off position to its on position. In case the access switch S4 does not present such change, the other access switch S5 is checked similarly at step P604. If the access switch S5 does not present a similar change, then the control sequence returns to the main routine, but otherwise if the access switch S5 presents a similar change, then the control sequence advances to step P641 of the flow chart shown in FIG. 15c. On the other hand, in case it is judged at step P603 that the access switch S4 presents such change as described above, a predetermined value K4 is placed into the fourth timer (timer 4) at step P605 and counting of the fourth timer is started at step P606. Then, the frame counter is incremented by one at step P607, and then the control sequence advances to step P608.

Processing at steps P608 to P621 (FIG. 15b) for setting, depending upon whether or not reproduction of all frames recorded in an IC card or reproduction of all frames recorded in the internal memory 40 is completed, an internal memory card mode or an IC card mode and for reproducing a picture image and outputting a video signal of the picture image is the same as the processing at steps P406 to P418 of the flow charts shown in FIGS. 13a and 13b. Accordingly, description of the processing at the steps P608 to P621 will be omitted herein to avoid redundancy.

Referring now to FIG. 15b, after a video signal is outputted at step P621 similarly as at step P418 described hereinabove, it is judged at steps P622, P623 and P624 whether or not the access switch S4 or S5 has changed from the off position to the on position before completion of counting of the fourth timer. In case counting of the fourth timer is completed before the access switch S4 or S5 is changed from the off position to the on position, the control sequence returns to step P605 of the flow chart of FIG. 15a to start counting of the fourth timer again in order to execute reproduction of a next picture image. On the other hand, in case the switch S4 or S5 is changed from the off position to the on position before completion of counting of the fourth timer, the counting operation of the fourth timer is stopped subsequently at step P625, and then protect data of the picture image to be reproduced are read out at step P626.

Processing at steps P626 to P639 for reading protect data of a picture image to be reproduced and recording of a protect instruction and cancellation of such protect in response to operation of the protect/erasure operating switch S6 is the same as the processing at steps P419 to P432 of the flow chart shown in FIG. 13b described hereinabove for the processing in response to operation of the access switch S4. Accordingly, description of such processing is omitted herein to avoid redundancy.

In case it is judged at step P604 of the flow chart of FIG. 15a that the access switch S5 has been changed from the off position to the on position, the control sequence advances to step P641 of the flow chart shown in FIG. 15c as described hereinabove. Thus, referring now to FIG. 15c, at step P641, the predetermined value K4 is placed into the fourth timer. Then, counting of the fourth timer is started at step P642, and then the frame counter is decremented by one at step P643, whereafter the control sequence advances to step P644.

Processing at steps beginning with step P644 and ending with step P657 for setting, depending upon whether or not reproduction of all frames recorded in an IC card or reproduction of all frames recorded in the internal memory 40 is completed, an internal memory mode or an IC card mode and for reproducing a picture image and outputting a video signal of the picture image is the same as the processing at steps P506 to P518 of the flow charts shown in FIGS. 14a and 14b for processing in response to operation of the access switch S5. Accordingly, description of the processing at the steps P 644 to P657 is omitted herein to avoid redundancy.

After a video signal is outputted at step P657 similarly as at step P518 described hereinabove, it is judged at steps P658. P659 and P660 whether or not the access switch S4 or S5 has been changed from the off position to the on position before completion of counting of the fourth timer. In case counting of the fourth timer is completed before the access switch S4 or S5 is changed from the off position to the on position, the control sequence returns to step P641 to start counting of the fourth timer again in order to execute reproduction of a next picture image. On the other hand, in case the switch S4 or S5 is changed from the off position to the on position before completion of counting of the fourth timer, the control sequence returns to step P625 to subsequently execute recording or cancelling processing of protect data similarly as described hereinabove.

Figure 16:
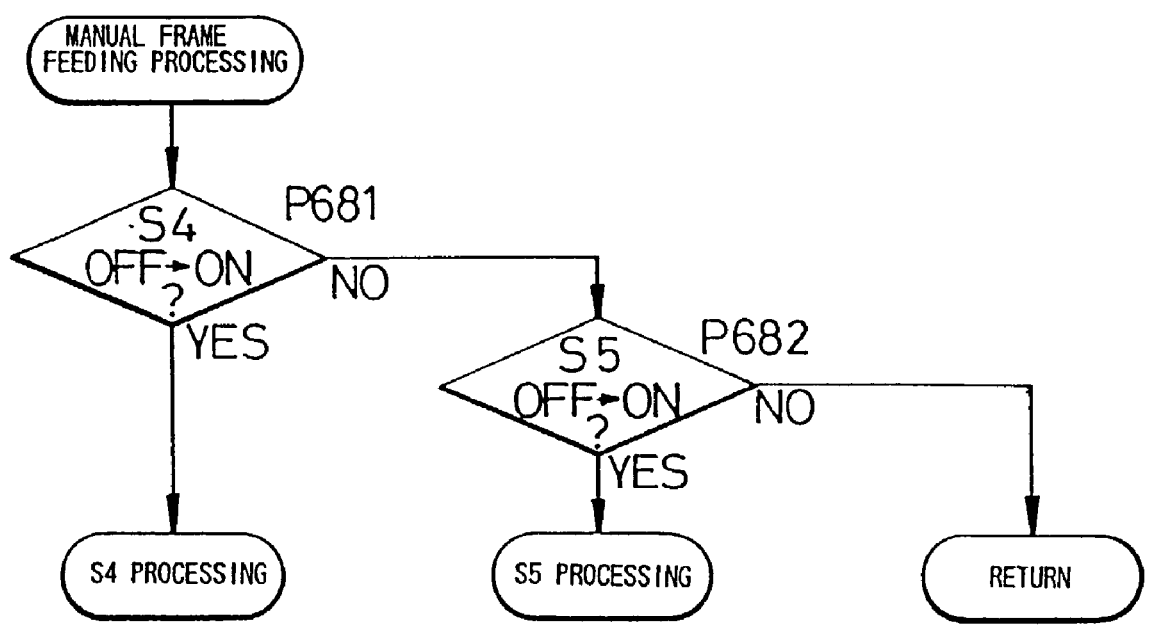
FIG. 16 is a flow chart illustrating manual frame feeding of the camera of FIG. 1 which is executed when a manual frame feeding switch is operated.

FIG. 16 illustrates the MANUAL FRAME FEEDING PROCESSING routine at step P117 of the flow chart shown in FIG. 7, which is executed in response to operation of the frame feeding change-over switch S8 to effect manual frame feeding for reproduction of a picture image. As apparently seen from the flow chart, when the switch S8 is in the MANUAL position, each time the access switch S4 changes from its off position to its on position, the S4 PROCESSING routine shown in FIGS. 13a to 13d and described hereinabove is executed, and each time the other access switch S5 is changed from its off position to its on position, the above described routine of S5 PROCESSING shown in FIGS. 14a to 14d is executed.

Figure 17:
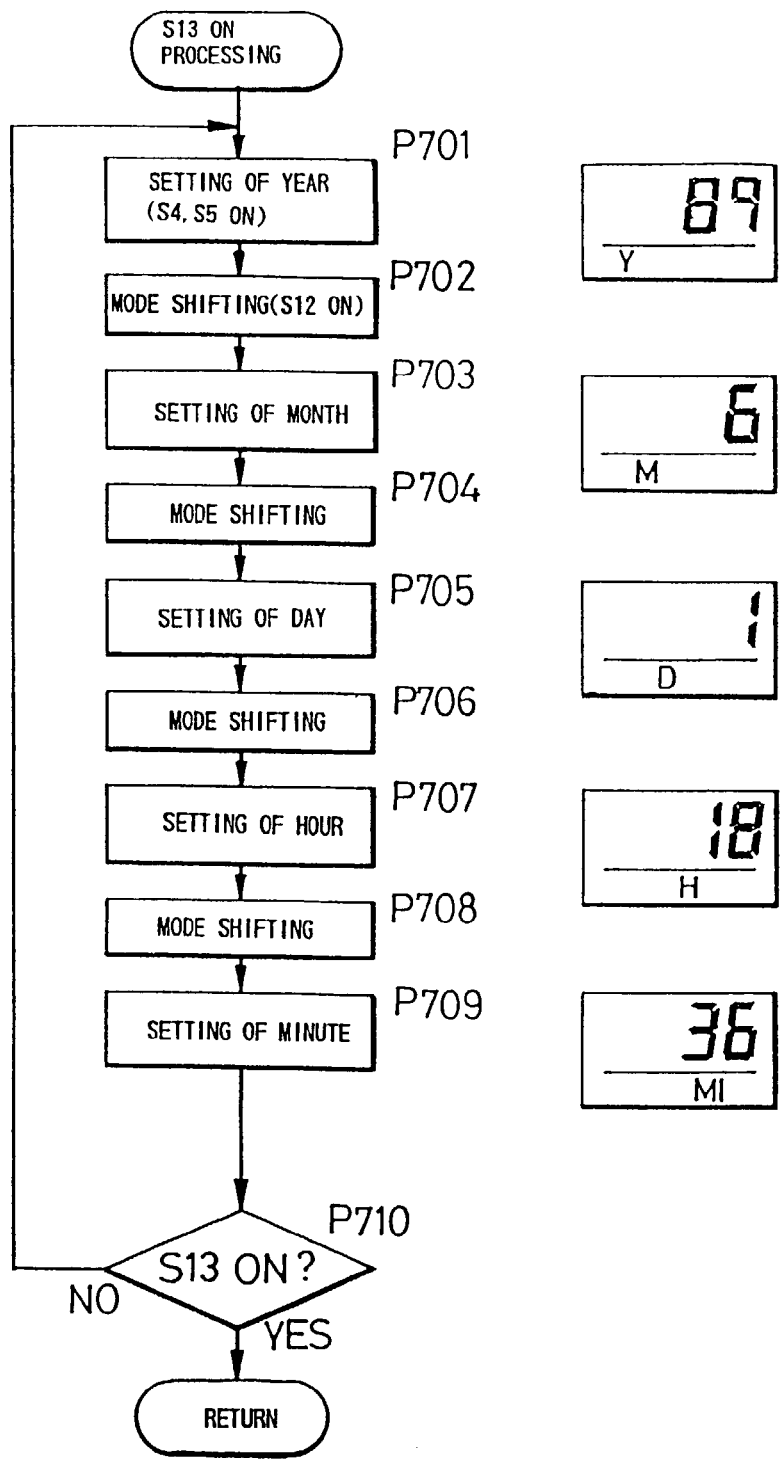
FIG. 17 is a flow chart illustrating data setting processing of the camera of FIG. 1 which is executed when a date setting switch is depressed.

FIG. 17 illustrates the date setting processing (S13 ON PROCESSING) routine at step P119 of the flow chart shown in FIG. 7. Referring to FIG. 17, when it is judged at step P118 of the flow chart shown in FIG. 7 that the date setting switch S13 is turned on, the CPU 30 is put into a "year" setting mode and enters the routine of the flow chart shown. Thus, a desired year will be set at step P701 by operation of the access switch S4 or S5. Then, when the mode shift switch S12 is turned on at step P702, the CPU 30 is changed over into a "month" setting mode. Thus, a desired month will be set by operation of the switch S4 or S5 at step P703. Then, a "day", an "hour" and a "minute" will be set successively in a similar manner by operation of the shift switch S12 and the access switch S4 or S5 at steps P704 to P709. After then, it is judged at step P710 whether or not the date setting switch S13 is on, and in case the switch S13 is not on, the control sequence returns to step P701 to enable subsequent re-setting of a date. Otherwise if the switch S13 is on, the date setting processing is completed and the control sequence returns to the main routine. It is to be noted that illustrations on the right-hand side in FIG. 17 denote examples of displaying conditions of the display section 5 at the corresponding steps.

While a condition of the switch S13 is checked after completion of setting of a minute in the routine shown in FIG. 17, it may otherwise be checked after setting of data in each setting mode so that an initial displaying condition may be restored when the switch S13 is on.

Figure 18A:
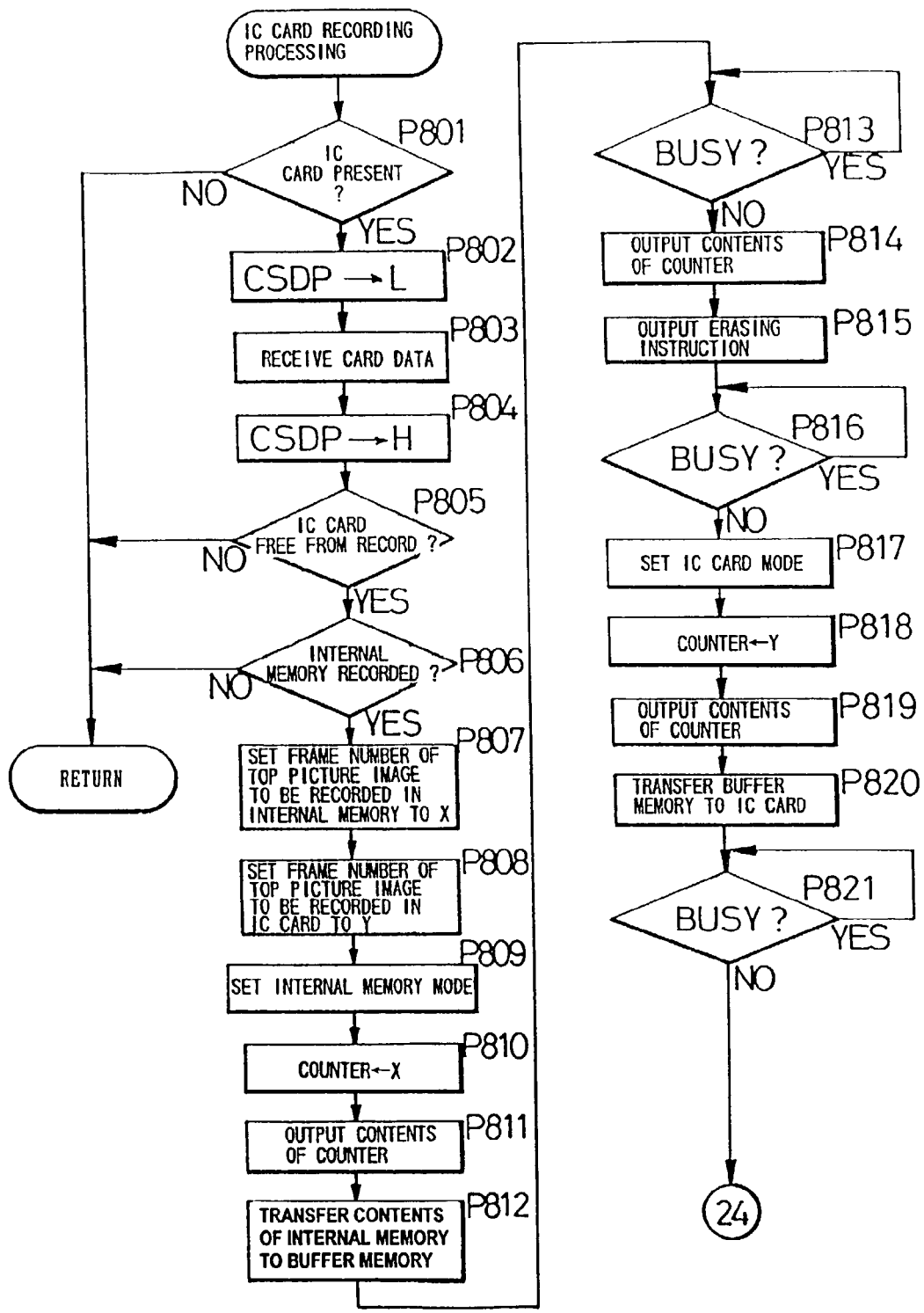
FIGS. 18a and 18b are flow charts illustrating processing of the camera of FIG. 1 for transferring a picture image recorded in an internal memory to an IC card.
Figure 18B:
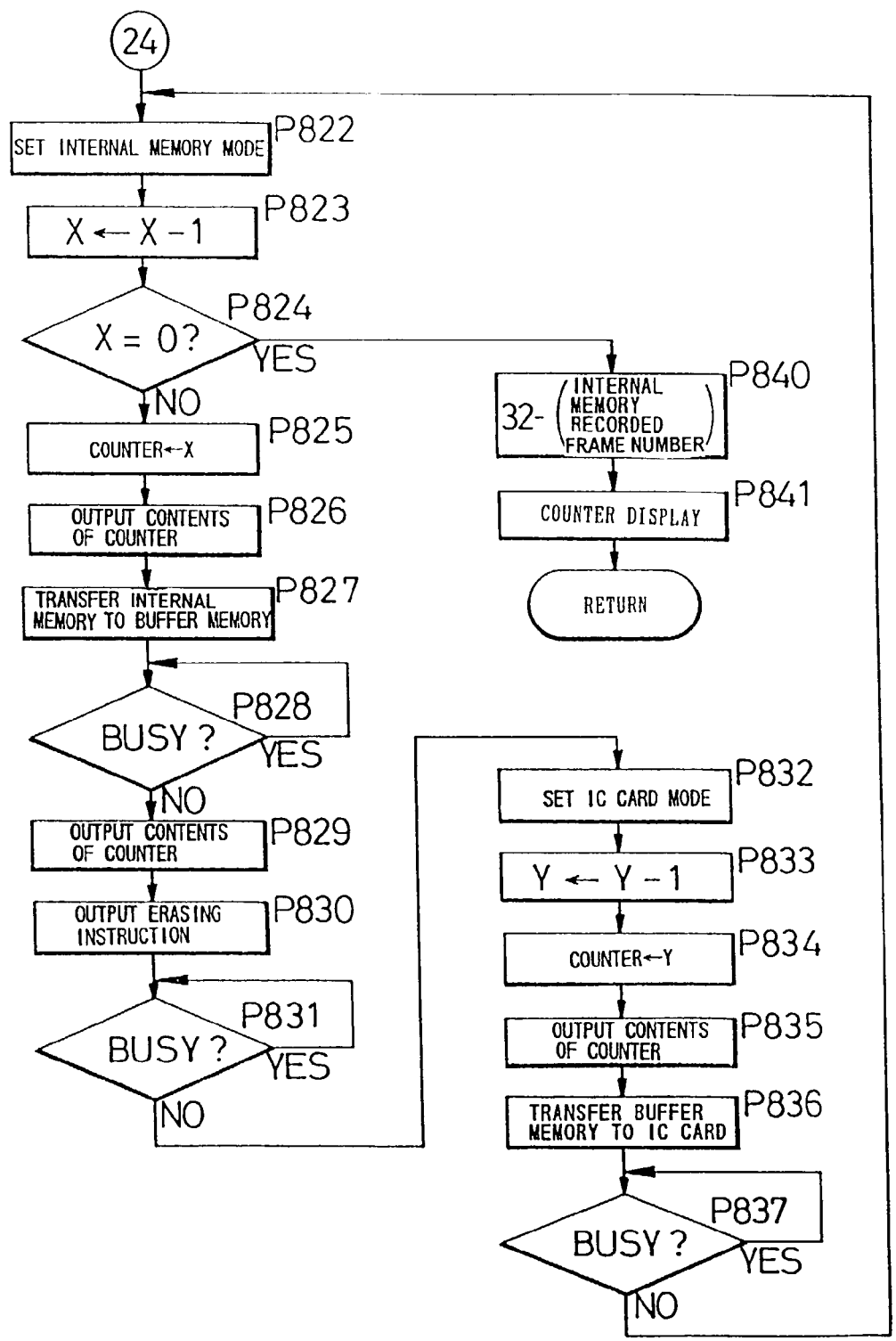

FIGS. 18a and 18b illustrate processing of transferring, when an IC card is loaded in position into the camera, a picture image recorded in the internal memory to the IC card. Referring first to FIG. 18a, it is first judged at step P801 whether or not an IC card 41 is loaded in position in the camera, and in case an IC card 41 is loaded in position, the signal CSDP is changed to "L" at step P802, and a condition of the memory of the IC card 41 is received from the signal processing CPU 51 at step P803, whereafter the signal CSDP is changed back to "H" to stop the communication at step P804. Then, it is judged at step P805 whether or not the IC card 41 remains in a non-recorded condition, and if the IC card 41 is in a non-recorded condition, then it is judged at step P806 whether or not the internal memory 40 has a recorded picture image therein. Thus, when the IC card 41 is in a non-recorded condition but the internal memory 40 has a recorded picture image therein, the control sequence advances to step P807. However, otherwise when the IC card 41 is in a recorded condition at step P805 or the internal memory 40 has no recorded picture image therein at step P806, the control sequence returns to the main routine. Also when no IC card is loaded in position in the camera at step P801, the control sequence returns to the main routine At step P807, a serial number of a frame for a first or top one of picture images of the internal memory 40 is set to X ("10" in the present embodiment), and then at step P808, a serial number of a top one of recordable frames of the IC card 41 is set to Y ("32" in the present embodiment) at step P808. Then, the camera is changed to an internal memory mode at step P809, and then the frame counter is set to X at step P810. Then, the count value X is outputted at step P811, and picture image data are received from a frame of the internal memory 41 corresponding to the count value X and then stored into the buffer memory 55 at step P812. Since such processing is controlled, in the present embodiment, by the signal processing CPU 51, it is waited at step P813 that the processing of the signal processing CPU 51 is completed, and then the count value X is outputted again at step P814, whereafter an erasing instruction is outputted at step P815 so that the picture image data for the corresponding frame of the internal memory 40 may be erased. After it is waited at step P816 that such erasing processing is completed, an IC card mode is set at step P817, and then the count value of the frame counter is set to Y at step P818, whereafter the count value Y is outputted to the signal processing CPU 51 at step P819. Thus, the picture image data stored in the buffer memory are stored into the frame of the IC card 41 corresponding to the count value Y of the frame counter at step P820. After it is waited at step P821 that completion of the recording processing of the signal processing CPU 51 is waited, the control sequence advances to step P822 of the flow chart shown in FIG. 18b.

Referring now to FIG. 18b, at step P822, an internal memory mode is set again. Then, the count value X of the frame counter which represents a serial number of a frame of the internal memory 41 to be processed is decremented by one at step P823 to make preparations for processing of a next frame. Then, it is judged at step P824 whether or not the serial frame number is equal to 0, and if the serial frame number is not equal to 0, since this means that there is a frame to be processed, the new serial frame number X is placed into the frame counter at step P825, and then the new count value X of the frame counter is outputted at step P826. Thus, picture image data are read out from the frame of the internal memory corresponding to the count value X of the frame counter and stored into the buffer memory at step P827. Then, after it is waited at step P828 that such processing is completed, the count value X of the frame counter is outputted again at step P829 and then an erasing instruction is outputted at step P830 so that the picture image data of the corresponding frame of the internal memory may be erased. After completion of such erasing processing is waited subsequently at step P831, an IC card mode is set at step P832, and then the value Y is decremented by one at step P833, whereafter the new value Y thus obtained is placed in the frame counter at step P834. After then, the count value of the frame counter, that is, the value Y, is outputted at step P835 and the picture image data stored in the buffer memory 55 are recorded, at step P836, into the frame of the IC card 41 corresponding to the count value of the frame counter. Then, after completion of such processing is waited at step P837, the control sequence returns to step P822 to start processing for a next frame.

In case it is judged at step P824 that the value X is equal to 0, that is, processing of all picture image data recorded in the internal memory 40 is completed, a number of frames recorded in the internal memory 41 is subtracted from a number (32 here) of recordable frames of the IC card 41 at step P840, and a value obtained by such subtraction is displayed at the display portion 5a of the display section 5 at step P841 to indicate that recording into the IC card 41 is possible beginning with a frame of the number. After then, the control sequence returns to the main routine.

It is to be noted that, while picture images which are recorded in the internal memory 40 and are to be transferred can be transferred, in the embodiment described above, only to an IC card which remains in a non-recorded condition, such picture images may otherwise be recorded into a non-recorded area of an IC card which has picture image data recorded in a portion thereof.

Further, while picture images of all frames recorded in the internal memory 40 are transferred to an IC card in the embodiment described above, picture images only of protected frames may otherwise be regarded as picture images to be maintained and thus transferred to an IC card. Processing for such modified operation is illustrated in FIG. 18c which shows several steps which should be included in place of the steps P810 and P811 or P825 and P826 of the flow chart shown in FIG. 18a or 18b.

Figure 18C:
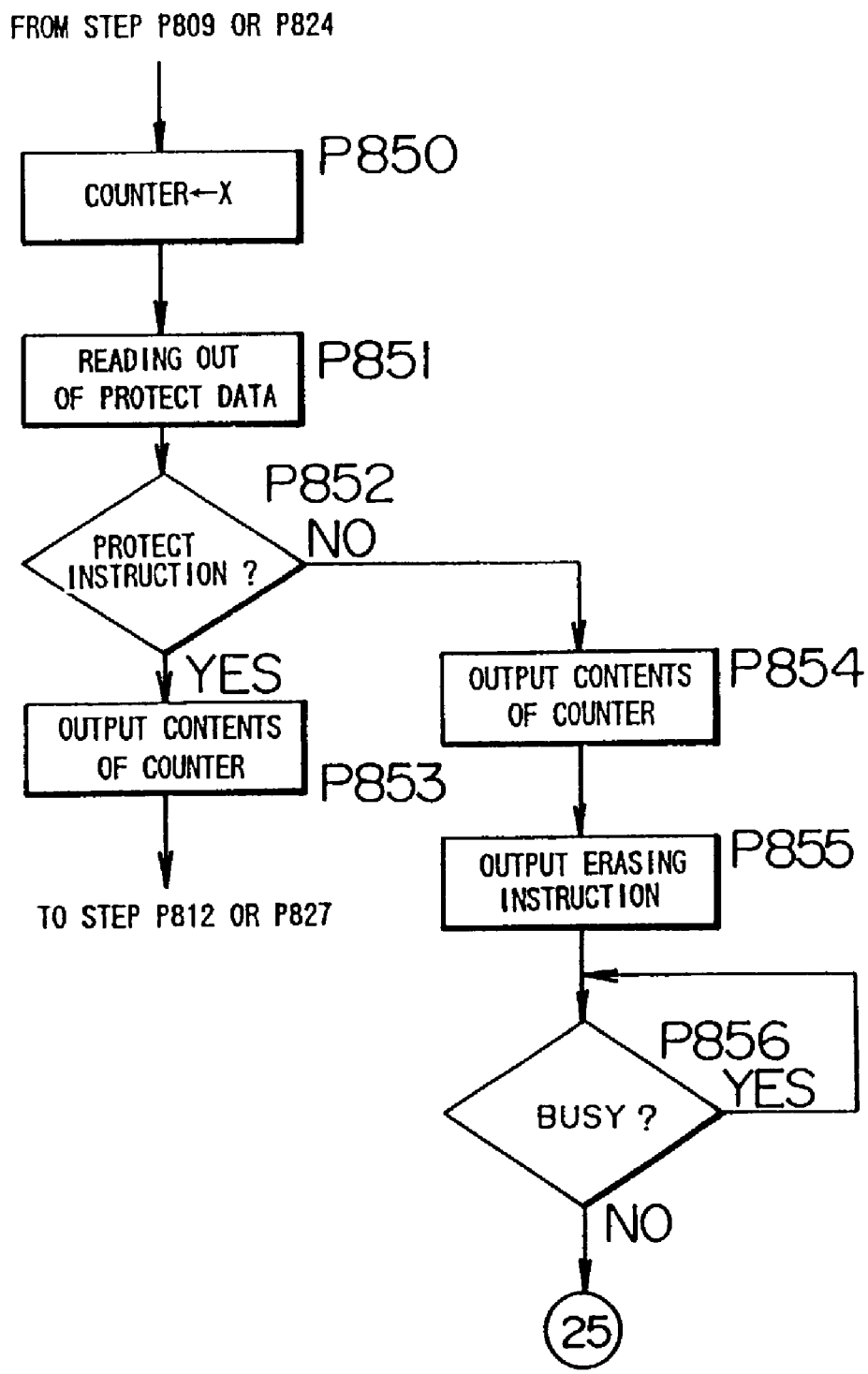
FIG. 18c is a flow chart showing a partial modification to the flow charts of FIGS. 18a and 18b.

Referring to FIG. 18c, according to the modified flow chart, the value X is placed into the frame counter at step P850 similarly as at step P810 or P825, and then protect data are read out, at step P851, from the frame of the internal memory corresponding to the count value X of the frame counter. Then, it is judged at step P852 in accordance with the protect data thus read whether or not the picture image of the frame to be processed is in a protected condition, and in case the picture image is protected, the count value of the frame counter is outputted again at step P853 similarly as at step P812 or P827. Consequently, at step P812 or P827 of the flow chart shown in FIG. 18a or 18b subsequent to step P853, the stored contents of the internal memory 40 for the frame corresponding to the outputted count value are transferred to the buffer memory 55. After then, erasing from the internal memory and writing into the IC card 41 of the picture image data of the frame will be executed similarly as described hereinabove. On the other hand, in case it is judged at step P852 that the picture image of the frame to be processed is not in a protected condition, since the picture image need not be maintained, it is erased without being transferred to the IC card 41. In particular, the count value of the frame counter is outputted at step P854, and then an erasing instruction is outputted at step P855 so that the picture image may be erased from the internal memory 40. Then, after completion of such erasing processing is waited at step P856, the control sequence returns to step P823 of the flow chart shown in FIG. 18b.

It is to be noted that, while a digital picture image signal is recorded into an IC card which is used as a record medium in the embodiment described above, the present invention can be applied to a still video camera wherein an analog picture image signal is recorded into a magnetic disk.

Having now fully described the invention, it will be apparent to one of ordinary skill in the art that many changes and modifications can be made thereto without departing from the spirit and scope of the invention as set forth herein.

What is claimed is:

1. An image taking apparatus having functions of recording and erasing image data, comprising:
   an image pickup device;
   an image recorder for recording image data obtained by the image pickup device into a predetermined portion of a recording medium;
   a manually operable member;
   a protect signal recorder operable in response to an operation of said manually operable member for recording into the recording medium a protect signal representative of inhibition of erasure of the image data recorded at the predetermined portion of the recording medium;
   an erase instructor for instructing erasure of the image data;
   a reproducer for reproducing the image data; and a controller for inhibiting reproduction of at least one image based on the image data at a portion of the recording medium corresponding to the protect signal recorded in the recording medium in a condition wherein erasure of the image data is instructed.

2. An image taking apparatus as claimed in claim 1, further comprising a protect cancelier for canceling the protect signal so as to enable the erasure of the image data.

3. An image taking apparatus as claimed in claim 1, wherein the recording medium is built in the image taking apparatus.

4. An image taking apparatus as claimed in claim 1, wherein the recording medium is removably loaded in the image taking apparatus.

5. An image taking apparatus as claimed in claim 1, wherein said controller inhibits re-recording of the image data into a portion of the recording medium corresponding to a protect signal recorded in the recording medium.

6. An image taking apparatus as claimed in claim 1, wherein said protect signal recorder records a protect signal when said manually operable member is operated during a predetermined time after counting of time is started in response to starting of recording of the image data into the recording medium.

7. An image taking apparatus as claimed in claim 1, wherein said protect signal recorder records a protect signal when said manually operable member is operated during a predetermined time after counting of time is started in response to starting of reproduction of the image data from the recording medium by said reproducer.

8. An image taking apparatus as claimed in claim 1, further comprising a selector for selecting a protect mode or a non-protect mode, and said protect signal recorder records the protect signal when the protect mode is selected by said selector.

9. An image taking apparatus as claimed in claim 1, wherein a reproduction of the image data being protected is possible in a condition in which erasure of an image data is not instructed.

10. An image taking apparatus comprising:
an image pickup device;
a mode definition member for defining a first mode and at least a second mode;
an image recorder for recording image data obtained by said image pickup device into a recording medium;
a manually operable member;
a protect signal recorder, operable in response to an operation of said manually operable member when the image taking apparatus is in said first mode, for recording into a predetermined portion of the recording medium corresponding to the image data recorded on the recording medium a protect signal to inhibit erasure of the image data;
a controller for inhibiting erasure of the image data recorded on said recording medium when the image data recorded on said recording medium corresponds to a recorded protect signal;
a reproducer for reproducing at least one image based on the image data recorded on said recording medium; and
an indicator on which information representing whether the image data from which the at least one image is reproduced by the reproducer is inhibited from erasure is indicated when said apparatus is set in said second mode.

11. An image taking apparatus comprising:
an image pickup device;
a mode selector for selecting an operational mode of said apparatus, wherein said operational modecomprises one of at least a protection mode, a reproduction mode and an erase mode;
an image recorder for recording image data for a plurality of images obtained by said image pickup device into a recording medium;
a protect signal recorder for recording into the recording medium a protect signal when said apparatus is in said protection mode, wherein each recorded protect signal corresponds to image data for one of the plurality of images;
a controller for inhibiting erasure of recorded image data for each of the plurality of images having a corresponding recorded protect signal;
a reproducer for reproducing at least one of the plurality of images using the image data recorded on the recording medium when said apparatus is in said reproduction mode; and
an indicator, in correspondence with said reproducer, for indicating whether the image data corresponding to the at least one image reproduced by the reproducer has a corresponding protect signal that inhibits erasure.

12. An image taking apparatus which manages image data recorded in a recording medium, said apparatus comprising:
a protect signal recorder for recording a protect signal that inhibits erasure of corresponding recorded image data, wherein the protect signal is a signal for setting the image data corresponding to a single image from a first state where the image data is erasable to a second state where the image data corresponding to the single image is inhibited from erasure;
a controller for outputting a display signal in response to the recording of the protect signal; and
a display, responsive to the display signal, for displaying that a protect signal is recorded.

13. An image taking apparatus as claimed in claim 12, wherein the apparatus further comprises:
an image pickup device; and
an image recorder for recording image data obtained by the image pickup device into the recording medium.

14. An image taking apparatus which manages image data and protect signals recorded in a recording medium, each of said protect signals being representative of inhibition of erasure of corresponding image data, said apparatus comprising:
a display;
a detector for detecting whether a protect signal is recorded with respect to a portion of the image data corresponding to an image and for outputting a detection signal upon detecting the protect signal; and
a display controller, responsive to said detection signal, for displaying on the display a frame number of the image corresponding to said detection signal and a mark representing whether the image is protected from erasure.

15. An image taking apparatus which manages image data and protect signals recorded in a recording medium, each of said protect signals being representative of inhibition of erasure of the image data corresponding to an image, said apparatus comprising:
a manually operable member;
a mode setting member for setting the apparatus in a protect mode and a protect cancellation mode;

a recorder, in response to the manually operable member, for recording a protect signal into the recording medium only when the apparatus is in the protect mode; and a protect signal cancelier for canceling the protect signal only when the mode setting member is set to said protect cancellation mode.

16. An image taking apparatus which manages image data and protect signals recorded in a recording medium, each protect signal inhibiting erasure of the image data corresponding to an image, said apparatus comprising:

a selector for selecting either a first mode or a second mode;

a first eraser, operated in the first mode, for erasing only the image data corresponding to a single image, the first eraser erasing the image data corresponding to the single image when the single image does not have a corresponding protect signal and the first eraser being inhibited from erasing the image data corresponding to the single image when the single image does have a corresponding protect signal, wherein the protect signal is a signal for setting the image data corresponding to the single image from an erasable state to the image data corresponding to the single image being inhibited from the erasable state; and a second eraser, operated in the second mode, for erasing all image data from said recording medium regardless of protect signals in said recording medium.

17. An image taking apparatus as claimed in claim 16, wherein the recording medium is removable from the image taking apparatus.

18. An image taking apparatus having functions of recording and erasing image data, comprising:

an image pickup device;

an image recorder for recording the image data obtained by said image pickup device into a predetermined portion of a recording medium;

a protect signal recorder for recording into the recording medium a protect signal representative of inhibition of erasure of the image data recorded at the predetermined portion of the recording medium; and an image reproducer, wherein said protect signal recorder records a protect signal when recording of a protect signal is instructed within a predetermined time after starting of reproduction of an image from the image data from the recording medium by said image reproducer.

19. A method of recording and erasing image data, comprising the steps of:

generating the image data;

recording the image data into a predetermined portion of a recording medium;

recording a protect signal into the recording medium, wherein said protect signal represents inhibition of erasure of the image data corresponding to at least one image recorded at the predetermined portion of the recording medium;

reproducing the at least one image based on the image data recorded in the recording medium; and inhibiting reproduction of the at least one image at the predetermined portion of the recording medium corresponding to the protect signal recorded in the recording medium in a condition wherein erasure of the image data is instructed.

20. A method as claimed in claim 19, further comprising a step of canceling the protect signal so as to enable the erasure of the image data.

21. A method as claimed in claim 19, wherein the recording medium is built in a camera.

22. A method as claimed in claim 19, wherein the recording medium is removably loaded in a camera.

23. A method as claimed in claim 19, further comprising a step of inhibiting re-recording of other image data into the predetermined portion of the recording medium corresponding to the protect signal recorded in the recording medium.

24. A method as claimed in claim 19, wherein said protect signal recording step records the protect signal when a manually operable member is operated during a predetermined time after counting of time is started in response to recording of the image data into the recording medium.

25. A method as claimed in claim 19, wherein said protect signal recording step records the protect signal when a manually operable member is operated during a predetermined time period after starting of reproduction of the at least one image base on the image data from the recording medium.

26. A method as claimed in claim 19, wherein said protect signal recording step records the protect signal when a protect mode is selected by a selector for selecting the protect mode or a non-protect mode.

27. A method of recording and erasing image data, comprising the steps of:

generating image data;

selecting a first mode or a second mode;

recording the image data into a recording medium;

recording into a predetermined portion of the recording medium a protect signal to inhibit erasure of corresponding image data recorded on the recording medium when said first mode is selected;

reproducing at least one image based on the image data recorded in the recording medium; and generating indication information representing whether the image data from which the at least one image is reproduced is inhibited from erasure when said second mode is selected.

28. A method of recording and erasing image data, comprising the steps of:

generating the image data;

setting an operational mode of an apparatus, wherein said operational mode comprises one of at least a protection mode, a reproduction mode and an erase mode;

recording the image data into a recording medium;

recording into the recording medium a protect signal when said apparatus is in said protection mode, wherein each recorded protect signal corresponds to at least one image in the image data;

inhibiting erasure of the image data having a corresponding recorded protect signal;

reproducing the at least one image when said apparatus is in said reproduction mode; and indicating whether the image data from which the at least one image is reproduced has a corresponding protect signal that inhibits erasure.

29. A method of managing image data recorded in a recording medium, comprising the steps of:

recording a protect signal that inhibits erasure of corresponding recorded image data, wherein the protect signal is a signal for setting the corresponding recorded image data from a first state where the corresponding recorded image data is erasable to a second state where the corresponding recorded image data is inhibited from erasure;

outputting a display signal in response to the recording of the protect signal; and displaying that a protect signal is recorded in response to the display signal.

30. A method of managing of image data and protect signals recorded in a recording medium, each of said protect signals being representative of inhibition of erasure of corresponding image data, comprising the steps of:
   detecting whether an protect signal is recorded with respect to selected image data;
   outputting a detection signal upon detecting an protect signal; and
   responsive to said detection signal, displaying on a display a frame number of the selected image data corresponding to said detection signal and a mark representing whether the selected image data is protected from erasure.

31. A method of managing image data and protect signals recorded in a recording medium, each of said protect signals being representative of inhibition of erasure of corresponding image data, comprising the steps of:
   setting either a protect mode or protect cancellation mode;
   recording the protect signal into the recording medium only when the protect mode is set; and
   canceling the protect signal only when said protect cancellation mode is set.

32. A method of managing image data and protect signals recorded in a recording medium, each of said protect signals being representative of inhibition of erasure of corresponding image data, comprising the steps of:
   selecting either a first mode or a second mode;
   erasing only a portion of the image data representing a single image when the portion of the image data representing a single image does not have a corresponding protect signal in the first mode, wherein the protect signal is a signal for setting the portion of the image data representing a single image from a first state where the portion of the image data representing a single image is erasable to a second state where the image data representing a single image is inhibited from erasure;
   inhibiting from erasing the portion of the image data representing a single image when the portion of the image data representing a single image does have a corresponding protect signal in the first mode; and
   erasing all image data from said recording medium regardless of protect signals in said recording medium in the second mode.

33. A method of recording and erasing image data, comprising the steps of:
   recording the image data obtained by an image pickup device into a predetermined portion of a recording medium;
   reproducing at least one image based on the image data recorded in the recording medium; and
   recording into the recording medium a protect signal representative of inhibition of erasure of the image data recorded at the predetermined portion of the recording medium when recording of the protect signal is instructed within a predetermined time after starting of reproduction of the at least one image based on the image data from the recording medium.

34. An image taking apparatus having functions of recording and erasing of image data, comprising:
   an image recorder for recording image data into a predetermined portion of a recording medium;
   a selector for selecting a protect mode in which erasure of the image data is inhibited;
   a manually operating member;
   a protect signal recorder for recording a protect signal for inhibiting of erasure of the image data recorded on the predetermined portion of the recording medium in response to the operation of the manually operating member when the protect mode is selected by said selector;
   an eraser for erasing the image data in response to the operation of the manually operating member when the protect mode is not selected;
   a controller for inhibiting erasure of the image data having a corresponding recorded protect signal; and
   a display for displaying that the protect signal is recorded.

35. An image taking apparatus as claimed in claim 34, wherein said protect signal is erasable.

36. An image taking apparatus as claimed in claim 34, wherein the display further displays information representing a frame number of the image data corresponding to the protect signal.

37. A method of recording and erasing image data, comprising:
   recording the image data into a predetermined portion of a recording medium;
   selecting a protect mode in which erasure of the image data is inhibited;
   recording a protect signal for inhibiting of erasure of the image data recorded on the predetermined portion of the recording medium in response to an operation of a manually operating member when the protect mode is selected;
   erasing the recorded image data in response to the operation of the manually operating member when the protect mode is not selected;
   inhibiting erasure of the image data when the image data has a corresponding recorded protect signal; and
   displaying that the protect signal is recorded on a display.

* * * * *

UNITED STATES PATENT AND TRADEMARK OFFICE
CERTIFICATE OF CORRECTION

PATENT NO. : 7,187,406 B2 Page 1 of 1
APPLICATION NO. : 10/229353
DATED : March 6, 2007
INVENTOR(S) : Nobuyuki Taniguchi et al.

It is certified that error appears in the above-identified patent and that said Letters Patent is hereby corrected as shown below:

Title Page:
Item (30) insert -- Foreign Application Priority Data
     July 18, 1990 (JP)..............2-188115
     July 18, 1990 (JP)..............2-188116
     July 18, 1990 (JP)..............2-188117
     July 18, 1990 (JP)..............2-188118 --.

Column 29:
Line 7, delete "cancelier" and insert -- canceller --.

Column 30:
Line 2, delete "modecomprises" and insert -- mode comprises --.

Column 31:
Line 5, delete "cancelier" and insert -- canceller --.

Signed and Sealed this

Eighth Day of May, 2007

JON W. DUDAS
*Director of the United States Patent and Trademark Office*